US011756445B2

(12) United States Patent
Harris et al.

(10) Patent No.: US 11,756,445 B2
(45) Date of Patent: Sep. 12, 2023

(54) ASSESSMENT-BASED ASSIGNMENT OF REMEDIATION AND ENHANCEMENT ACTIVITIES

(71) Applicant: Pearson Education, Inc., New York, NY (US)

(72) Inventors: Nathan Harris, London (GB); Eleonora Pessina, London (GB)

(73) Assignee: PEARSON EDUCATION, INC., New York, NY (US)

( * ) Notice: Subject to any disclaimer, the term of this patent is extended or adjusted under 35 U.S.C. 154(b) by 495 days.

(21) Appl. No.: 16/009,540

(22) Filed: Jun. 15, 2018

(65) Prior Publication Data

US 2019/0385471 A1  Dec. 19, 2019

(51) Int. Cl.
*G09B 7/00* (2006.01)
*G06F 16/903* (2019.01)

(52) U.S. Cl.
CPC ......... *G09B 7/00* (2013.01); *G06F 16/90335* (2019.01)

(58) Field of Classification Search
CPC ............. G09B 7/00; G09B 7/077; G09B 7/08
See application file for complete search history.

(56) References Cited

U.S. PATENT DOCUMENTS

| 5,310,349 A * | 5/1994 | Daniels ................... G09B 7/00 345/156 |
| 6,554,618 B1 * | 4/2003 | Lockwood ............... G09B 7/00 434/118 |
| 8,838,015 B2 * | 9/2014 | Packard ................... G09B 7/00 434/322 |
| 2004/0009461 A1 | 1/2004 | Snyder et al. |
| 2005/0026131 A1 * | 2/2005 | Elzinga ................... G09B 5/00 434/365 |

(Continued)

FOREIGN PATENT DOCUMENTS

WO   WO-2015080756 A1 *  6/2015  ............... G09B 5/06

OTHER PUBLICATIONS

John de Jong; "Developing Global Scale of English Learning Objectives aligned to the Common European Framework"; https://www.pearson.com/content/dam/one-dot-com/one-dot-com/english/TeacherResources/GSE/GSE-WhitePaper-Developing-LOs.pdf (Year: 2016).*

(Continued)

*Primary Examiner* — Peter R Egloff
(74) *Attorney, Agent, or Firm* — QUARLES & BRADY LLP

(57) ABSTRACT

A system and method is configured to determine an initial assessment score for an initial curriculum activity for a learner. A query identifying, within a data logic or at least one database record, a lower threshold value is executed. Responsive to determining that the initial assessment score is less than the lower threshold value, a query is executed identifying a remediation curriculum activity associated with the initial curriculum activity and a first graphical user interface is encoded including an identification of the learner and a first user interface element configured to cause the server hardware computing device to modify a lesson plan of the learner to include the remediation curriculum activity. The first graphical user interface is transmitted to a client hardware computing device for display.

19 Claims, 49 Drawing Sheets

(56) References Cited

U.S. PATENT DOCUMENTS

| | | | |
|---|---|---|---|
| 2005/0196742 A1* | 9/2005 | Harber | G09B 7/00 434/362 |
| 2005/0287510 A1* | 12/2005 | Sumrall | G09B 7/02 434/353 |
| 2006/0127871 A1* | 6/2006 | Grayson | G09B 7/02 434/350 |
| 2007/0196807 A1* | 8/2007 | Packard | G09B 7/00 434/350 |
| 2007/0207448 A1* | 9/2007 | Glaser | G09B 23/28 434/262 |
| 2008/0057480 A1* | 3/2008 | Packard | G09B 23/02 434/188 |
| 2008/0241812 A1* | 10/2008 | Ashmore | G09B 5/00 434/365 |
| 2008/0254430 A1 | 10/2008 | Woolf et al. | |
| 2010/0041007 A1* | 2/2010 | Wang | G09B 7/00 434/322 |
| 2010/0047759 A1* | 2/2010 | Ma | G09B 7/02 434/362 |
| 2010/0159438 A1* | 6/2010 | German | G06F 16/24578 707/E17.046 |
| 2010/0316986 A1* | 12/2010 | de la Chica | G09B 7/00 434/362 |
| 2011/0010306 A1* | 1/2011 | Gonzalez | G06Q 10/10 705/326 |
| 2011/0039244 A1 | 2/2011 | Packard et al. | |
| 2011/0039249 A1* | 2/2011 | Packard | G09B 7/08 434/362 |
| 2011/0117534 A1* | 5/2011 | Berger | G09B 5/08 434/350 |
| 2011/0151422 A1* | 6/2011 | Sumrall | G09B 7/02 434/322 |
| 2011/0195389 A1* | 8/2011 | DeYoung | G09B 7/08 434/350 |
| 2012/0196261 A1 | 8/2012 | Kim et al. | |
| 2012/0276516 A1* | 11/2012 | Teskey | G09B 7/00 434/362 |
| 2013/0052618 A1* | 2/2013 | Clapp, III | A61B 1/00142 434/219 |
| 2013/0224697 A1* | 8/2013 | McCallum | G09B 7/04 434/178 |
| 2014/0024008 A1* | 1/2014 | Sathy | G09B 7/08 434/362 |
| 2014/0193795 A1* | 7/2014 | Tavolacci | G09B 7/02 434/362 |
| 2014/0335497 A1* | 11/2014 | Gal | G09B 5/08 434/323 |
| 2014/0377732 A1* | 12/2014 | Freedman | G09B 5/10 434/322 |
| 2015/0235561 A1* | 8/2015 | Lynch | G06Q 10/063116 434/362 |
| 2015/0269852 A1* | 9/2015 | Cecil | G09B 15/023 434/308 |
| 2016/0148515 A1* | 5/2016 | Augusto | G09B 5/00 434/365 |
| 2016/0189557 A1* | 6/2016 | Mansfield | G09B 7/00 434/350 |
| 2016/0300503 A1* | 10/2016 | Diezmann | G09B 7/08 |
| 2017/0048269 A1* | 2/2017 | York | H04L 67/10 |
| 2017/0263150 A1* | 9/2017 | Gordon | G09B 5/06 |
| 2017/0294134 A1* | 10/2017 | Angel | G09B 7/06 |
| 2017/0309202 A1* | 10/2017 | Chen | G09B 7/00 |
| 2018/0114458 A1* | 4/2018 | Galen | G09B 7/04 |
| 2018/0151083 A1* | 5/2018 | Yoo | G09B 7/00 |
| 2019/0088155 A1* | 3/2019 | Liu | G09B 7/06 |
| 2019/0163755 A1* | 5/2019 | Moll | G06F 16/24575 |
| 2019/0378426 A1* | 12/2019 | Wu | G09B 5/02 |

OTHER PUBLICATIONS

DIBEL Benchmark Goals; 2010; https://dibels.uoregon.edu/docs/DIBELSNextFormerBenchmarkGoals.pdf (Year: 2010).*

* cited by examiner

FIG. 4A

| File Edit Tools |

GSE Assessment

Part 3: Meeting Someone on the Street: (Reading Comprehension, Speaking Interaction)

Question 4 - Multiple Choice: If you are meet someone on the street, and they say "Hello, how are you," what is an appropriate response?

"I'm fine, thank you, how are you?" ▽
Response 2
Response 3
Response 4
None of the Above Submit and Move to Next Question >>

FIG. 5

File Edit Tools

Instructor Dashboard - MSB Elementary School | Courses ▽ | SIGN OUT
Hello Miss Frye Assignments  Lesson Material  Textbooks  Discussions  Feedback  Placement Rpt  Lesson Rpt
<- Back to Dashboard GSE Score Key       No Test Scores = Advisory notes

Placement     Diagnostics     <10 ---10---29---35---42---50---58---66---75---84--->84

Progress   | Global Scale of English scores ▽ |

| Student | Test Score | Status | Date Submitted | Time on Test |
|---------|------------|--------|----------------|--------------|
| Liz | 67 | Submitted | 25 May 2016 | 00:00 |
| Arnold | 58 | Re-Test | 25 May 2016 | 00:00 |
| Carlos | 77 | Pending | 25 May 2016 | 00:00 |
| Ralph | 18 | Not Submitted | 25 May 2016 | 00:00 |

<div align="right">Give Feedback</div>

Help    Terms of Use    Cookie Policy    Privacy Policy

FIG. 11D

File  Edit  Tools

Learner Dashboard - MSB Elementary School  | Courses ▽ |  SIGN OUT
Hello Liz Assignments  Lesson Material  Textbooks  Discussions  Reports  Certificates
<- Back to Dashboard

Lesson Material: 1.1 Kids in My Class

| Reading Document: | Misc. Document: | Misc. Document: |
| 1.1.1 Big English | 1.1.2 Activity 1 | 1.1.3 Activity 2 |
| Unit 1: Kids in My Class | Song | Vocabulary |

| Misc. Document: | Misc. Document: | Reading Document: |
| 1.1.4 Activity 3 | 1.1.5 Activity 4 | 1.1.7 About GSE |
| Story | Video: Dramatic | |

| Reading Document: | Video: |
| 1.1.8 Learning Objectives | 1.1.9 VR: I Like to Eat |

Help   Terms of Use   Cookie Policy   Privacy Policy

FIG. 12C

File Edit Tools

Learner Dashboard - MSB Elementary School  Courses ▽   SIGN OUT
Hello Liz

Assignments Lesson Material Textbooks Discussions Reports Certificates
<- Back to Dashboard

Lesson Material: UNIT 1: Kids in My Class
1. Listen and read. Then sing.

Who's That Girl?
It's the first day of school,
We're back in our classes.
Everybody looks different -
And I have new glasses!

Who's that girl
Standing over there?
She's taller than me
And has dark curly hair.

*In my class are the kids I know.*
*We all change. We all grow*

Help    Terms of Use    Cookie Policy    Privacy Policy

FIG. 12D

| File Edit Tools ⇦ ⇨ |

Learner Dashboard - MSB Elementary School    Courses ▽    SIGN OUT
Hello Liz Assignments Lesson Material Textbooks Discussions Reports Certificates
<- Back to Dashboard

Lesson Material: UNIT 1: Kids in My Class
2. Listen. Number the following from 1-6.

Trish is tall and has long light brown hair. She plays the flute

Daren is short. He has straight black hair. He's shy.

Sylvia has brown hair. She carries a bright pink backpack.

Natalie has wavy blonde hair. She's smart and likes to read.

Bryan has dark brown hair and glasses. He's serious.

Larry has light brown hair. He's friendly and funny.

Help    Terms of Use    Cookie Policy    Privacy Policy

FIG. 12E

```
File Edit Tools       ⇦ ⇨

Learner Dashboard - MSB Elementary School   [ Courses  ▽ ]        SIGN OUT
Hello Liz Assignments  Lesson Material  Textbooks  Discussions  Reports  Certificates
<- Back to Dashboard Lesson Material: UNIT 1: Kids in My Class
3. Circle T for true F for false. Then check your answers with a partner.

True    False

1. Sylvia has brown hair.        T       F
2. Natalie wears glasses.        T       F
3. Larry is shy.                 T       F
4. Bryan is serious.             T       F
5. Trish plays the saxophone.    T       F
6. Darren is tall.               T       F

[ Check Your Answers ]      [    Reset    ]

Help   Terms of Use   Cookie Policy   Privacy Policy
```

FIG. 12F

File Edit Tools

Instructor Dashboard - MSB Elementary School | Courses ▽ | SIGN OUT
Hello Miss Frye Assignments  Lesson Material  Textbooks  Discussions  Feedback  Placement Rpt  Lesson Rpt
<- Back to Dashboard
Speakout preint 2102                      Change View:  | Assignments & Tests ▽ |

Data  Diagnostics
ASSIGNMENTS | Last Attempt ▽ |   TESTS | Last Attempt ▽ |

| Student | Score | Attempts | Time | Completed | Score | Attempts | Time | Completed |
|---------|-------|----------|------|-----------|-------|----------|------|-----------|
| Liz     | --    | 0        | 00:00| 0/1       | 75%   | 0        | 20:00| 0/1       |
| Arnold  | --    | 0        | 00:00| 0/1       | 56%   | 3        | 15:00| 1/4       |
| Carlos  | --    | 0        | 00:00| 0/1       | 28%   | 3        | 17:00| 1/4       |
| Ralph   | --    | 0        | 00:00| 0/1       | 75%   | 3        | 33:00| 1/4       |

| Export Multiple Gradebooks |     <u>Give Feedback</u>

Help   Terms of Use   Cookie Policy   Privacy Policy

FIG. 13A

File Edit Tools

Instructor Dashboard - MSB Elementary School | Courses ▽ | SIGN OUT
Hello Miss Frye

Assignments Lesson Material Textbooks Discussions Reports Certificates
<- Back to Dashboard

Assignments: UNIT 1: Kids in My Class - New Assignment

| Reading Document:<br>1.1.1 Big English<br>Unit 1: Kids in My Class | Misc. Document:<br>1.1.2 Activity 1<br>Song | Misc. Document:<br>1.1.3 Activity 2<br>Vocabulary |
| --- | --- | --- |
| Misc. Document:<br>1.1.4 Activity 3<br>Story | Misc. Document:<br>1.1.5 Activity 4<br>Video: Dramatic | Reading Document:<br>1.1.7 About GSE |
| Reading Document:<br>1.1.8 Learning Objectives | Video:<br>1.1.9 VR: I Like to Eat | Misc. Document:<br>1.1 Reading Remedial<br>Activity 2: Read |

Help    Terms of Use    Cookie Policy    Privacy Policy

FIG. 14A

```
File  Edit  Tools                ⇐ ⇒

Instructor Dashboard - MSB Elementary School | Courses  ▽ |      SIGN OUT
Hello Miss Frye Assignments  Lesson Material  Textbooks  Discussions  Reports  Certificates
<- Back to Dashboard Assignments: UNIT 1: Kids in My Class - New Assignment - Assignment Details
Assignment Name:   [ Remedial Reading Activity ]

Isntructions for Learners (500 Characters Max)
[                                                          ]

Start Date:   [                    ]
End Date:     [                    ]

Select Learners:  [ Liz    ▽ ]

Help   Terms of Use   Cookie Policy   Privacy Policy
```

FIG. 14B

File  Edit  Tools

Parent App Dashboard - Vocabulary  | English ▽ |

Liz             *Class 4*

A:
Accord - hear pronunciation
*Concurrence of opinion*
The committee worked in accord on the bill, and it eventually passed.

Affect - hear pronunciation
*Have an influence upon*
The central bank will start distributing low interest loans in early March to individuals and small and medium sized companies affected by the flooding.

Appeal - hear pronunciation
*Be attractive to*
To get traditional women's accessories to appeal to men, some designers are giving them manly names and styles.

B:
Bent - hear pronunciation
*Fixed in your purpose*
The business oriented constituency of the ...

Help   Terms of Use   Cookie Policy   Privacy Policy

FIG. 15E

MyEnglishLab

ENGLISH˅ HELP SIGN OUT
SIGNED IN AS TEACHER 02, BEHAT 02

≡ ASSIGNMENTS | ☐ COURSE | ☑ GRADEBOOK | 🗨 MESSAGES | ⚙ SETTINGS

HOME – GRADEBOOK – COURSE 02 – DATA — 1708

GRADEBOOK
🔍 SEARCH FOR STUDENTS

CHANGE COURSE: *NOT OWNED
[COURSE_02*]

COURSE_02

(67%) OVERALL    (67%) GRAMMAR

NEXT GENERATION GRAMMAR 2

- ⇩ STARTER UNIT
- ⇩ UNIT 1
- ⇩ UNIT 2
- ⇩ UNIT 3
- ⇩ UNIT 4
- ⇩ UNIT 5
- ⇩ UNIT 6
- ⇩ UNIT 7
- ⇩ UNIT 8
- ⇩ UNIT 9

1702

Remediation: 1 student(s) in Course_02 performed below the expected threshold for Exercise 1 from STARTER UNIT>Grammar – To be. View exercise — 1714

To support these students with their learning, would you like to assign a remediation exercise?

[DO NOT ASSIGN] [ASSIGN (1)] — 1710

1706

Stretch: 1 student(s) in Course_02 performed above the expected threshold for Exercise 3 from STARTER UNIT>Grammar – Have got. View exercise — 1764

To take their learning to the next level, would you like to assign a stretch exercise?

[DO NOT ASSIGN] [ASSIGN (1)] — 1760

1758

SELECT A UNIT TO VIEW LEARNING OBJECTIVES FO[R]

DATA | DIAGNOSTICS

CHANGE VIEW: ASSIGNME[NTS] — 1756

| STUDENT ⇕ | ASSIGNMENTS | | TESTS | | |
|---|---|---|---|---|---|---|
| | SCORE ⇕ | GRADE ⇕ | COMPLETED ⇕ | LAST ATTEMPT ▾ | SCORE | GRADE | COMPLETED | LAST ATTEMPT ▾ |
| STUDENT 04, BEHAT 04 | 40% | D | 2/2 | ... | | | 0/0 | |
| STUDENT 05, BEHAT 05 | 100% | A | 1/3 | ... | | | 0/0 | |
| SUMMARY ⓘ | 60% | B | | ... | | | | |

ASSESSMENT-BASED ASSIGNMENT OF REMEDIATION AND ENHANCEMENT ACTIVITIES

FIELD OF THE INVENTION

This disclosure relates to the field of systems and methods configured to calculate an assessment score for instructors, learners, and schools, automatically generate a learning curriculum for learners according to their calculated assessment score, and generate a Graphical User Interface (GUI) displaying reports of the learners' progress to instructors, administrators, and parents.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory that, when executed, cause the system to: generate: at least one core curriculum activity identified within the system as being associated with a global scale of English (GSE) level; and a preliminary assessment of the at least one core curriculum activity; calculate a preliminary assessment score for the preliminary assessment comprising a comparison of at least one first assessment user input with a first correct assessment response within a data logic or at least one database record within the system; execute a query identifying, within the data logic or the at least one database record, a threshold value; responsive to a determination that the preliminary assessment score is below the threshold value: execute a query identifying a supplemental curriculum content stored within the system and associated with the GSE level; encode, for display on a graphical user interface (GUI) on a client hardware computing device, the preliminary assessment score, the at least one core curriculum activity, and the supplemental curriculum content; generate a second assessment of the supplemental curriculum content; and calculate a second assessment score for the second assessment comprising a comparison of at least one second assessment user input with a second correct assessment response within the data logic or the at least one database record; and responsive to a determination that the preliminary assessment score or the second assessment score is above the threshold value: execute a query identifying a certification stored within the system and associated with the GSE level; and associate the certification in the database with a user that entered the first assessment user input or the second assessment user input.

The above features and advantages of the present invention will be better understood from the following detailed description taken in conjunction with the accompanying drawings.

BRIEF DESCRIPTION OF THE DRAWINGS

FIG. 4A illustrates a non-limiting example GUI for an administrator using the assessment-based measurable progress learning system.

FIG. 5 illustrates a non-limiting example GUI for an assessment within the assessment-based measurable progress learning system.

FIG. 11D illustrates a non-limiting example GUI for an instructor using the assessment-based measurable progress learning system.

FIG. 12C illustrates a non-limiting example GUI for a learner using the assessment-based measurable progress learning system.

FIG. 12D illustrates a non-limiting example GUI for a learner using the assessment-based measurable progress learning system.

FIG. 12E illustrates a non-limiting example GUI for a learner using the assessment-based measurable progress learning system.

FIG. 12F illustrates a non-limiting example GUI for a learner using the assessment-based measurable progress learning system.

FIG. 13A illustrates a non-limiting example GUI for an instructor using the assessment-based measurable progress learning system.

FIG. 14A illustrates a non-limiting example GUI for an instructor using the assessment-based measurable progress learning system.

FIG. 14B illustrates a non-limiting example GUI for an instructor using the assessment-based measurable progress learning system.

FIG. 15E illustrates a non-limiting example GUI for a parent using the assessment-based measurable progress learning system.

FIG. 17A-17I depicts user interfaces enabling an instructor to review learner performance and selectively assign remediation curriculum activities and enhancement curriculum activities to learners based upon performance on an initial curriculum activity.

DETAILED DESCRIPTION

Figure 1:
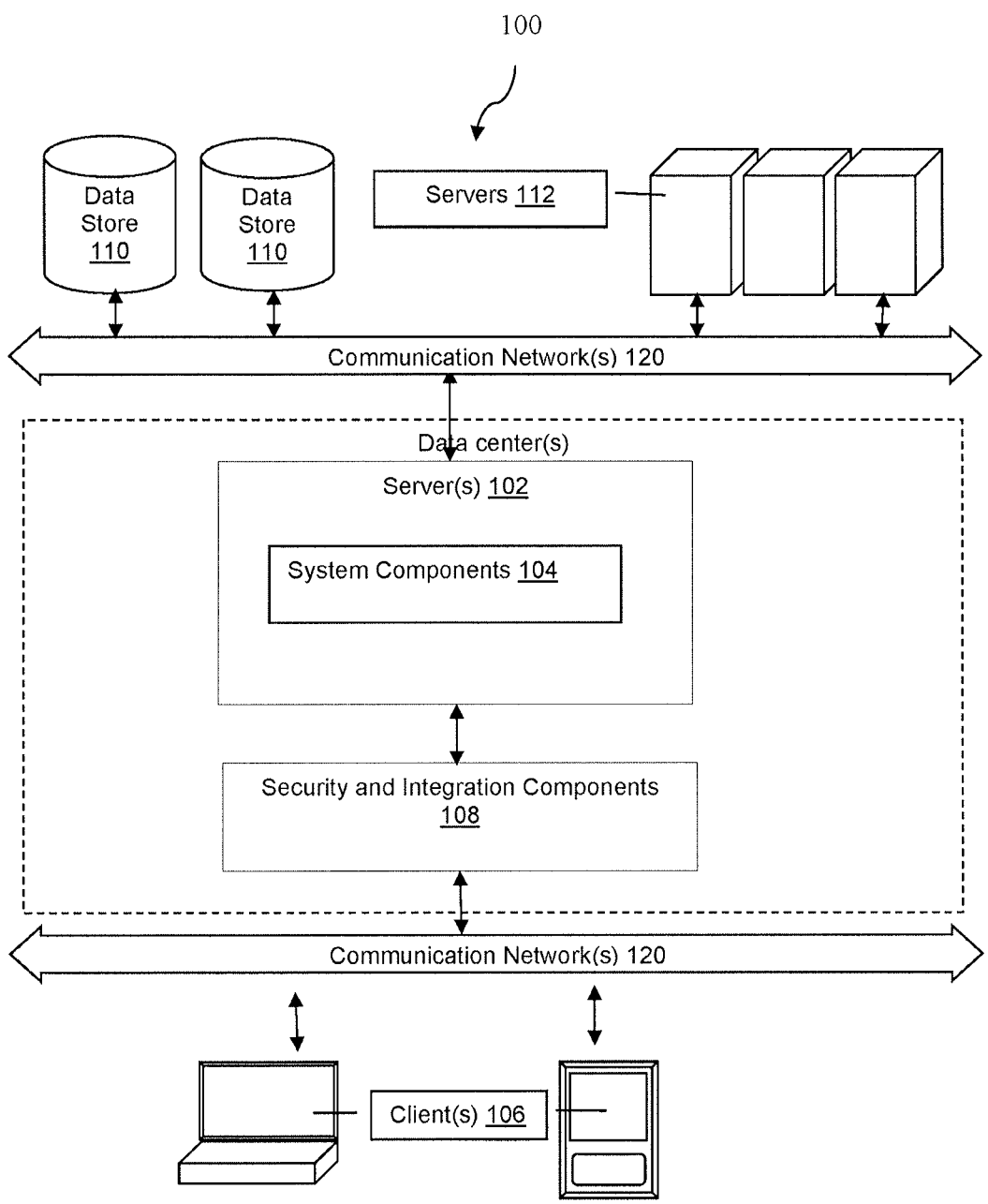
FIG. 1 illustrates a system level block diagram for an assessment-based measurable progress learning system.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

In today's competitive global market, English is a core, and indeed, one of the most important needs within large growth markets with millions of potential students where English is a non-native language (e.g., HispanoAmerica, Brazil, China, Turkey, etc.). In such countries or other geographical regions in which English is not the native language, learning English at the optimal proficiency level can build a better future for nearly anyone.

Learning English as a second language is a priority for, and is being requested within the large growth markets mentioned above by children, adults, schools, and potential employers as a core need for improving lives and the living (i.e., careers) of children, adults, schools, and potential employers. Because of this, parents are investing significant amounts of time and money in order to have their kids learn English, in addition to continuing to develop their native language and encourage their children to continue to improve their core academic competencies. Unfortunately, because English is not their native language, some parents cannot measure the level of proficiency of their children, and are further unable to help them with the homework required to improve their children's English skills, as they do not know the complexities of the English language. Additionally, administrators for learning institutions that teach English are seeking for differentiators to set them apart from their key competitors, but lack a standardized system that would allow them to demonstrate a superior English teaching staff, skills, and curriculum.

To address these issues, the disclosed embodiments combine regular ongoing and summative assessments that determine a specific placement of a learner within a learning (e.g., Global Scale of English, or GSE) framework, and provide each learner with a personalized content curriculum including learning assets generated by a progressive measurable learning system designed to more effectively instruct and personalize learning of the English language at scale. Remedial content is provided as needed in order to achieve desired efficacy outcomes for relevant objectives to be achieved. In some embodiments, this solution may be presented at a Kindergarten through 12th grade level (K-12), in which the users may be dedicating from 2-8 hours per week, thereby satisfying opportunities available in a variety of markets.

Because learners, parents, instructors, and/or administrators (the learning institution owner, director, coordinator, etc.) all play important roles in the learner's success, the disclosed embodiments include an online learning community delivering and developing resources for the learners, the instructors, and the administrators. The disclosed embodiments may therefore include four primary users or key personas, including the learners, the learner's parents, the instructors, and one or more school administrators. The one or more school administrators may be important as directors of the school/institution as key decision makers. Directors, owners, or academic coordinators of institutions may recognize the competitive edge that the disclosed embodiments may represent. The learner's parents may also play a very important role in primary levels of the K-12 infrastructure described above, in that parents have a very real impact on the learning of each student.

Each of these four primary users may be led, via the various systems, methods, and/or user interfaces described in detail below, through a process including at least four steps. First, any of the four primary users may access and complete an intake assessment placement test within the system, which assesses the overall language mastery of the user. This intake assessment placement test is focused on efficacy, and allows the four primary users to determine and understand the standing of a specific school or other institution, the standing of each student within the school/institution, the standing of each teacher within the school/institution, etc. This assessment may further provide for professional and academic development as described in more detail herein. As additional users are guided through the intake assessment placement test, the system is able to gather data, possibly in the form of database data records, and compare the data for students and teachers according to the GSE, which, as described in more detail herein, is based on a robust structure.

Second, using the data and reports produced from the intake assessment placement test, the disclosed system may automatically generate (or one or more of the four primary user may determine) a curriculum for a progressive learning plan for each user (e.g., learners and instructors) according to the intake assessment of the user's overall language mastery. Specifically, this curriculum may create a starting point based on the data and/or reports, and further based, in some disclosed embodiments, on an analysis of the user's mastery of the English language. The curriculum may include any combinations of digital or analog courseware which is engaging to the students, including course materials, course software/widgets, professional development materials, and/or any other interactive course material for the user to complete. Each of the items within this curriculum may include specific learning objectives for the user, and each of these learning objectives, in turn, be mapped to a specific level of the GSE.

Third, as each user completes the curriculum materials which are mapped to the learning objectives within the GSE, the disclosed embodiments receive the data input by the user and build one or more assessment database records for each user indicating their mastery of learning objectives based on their performance in the recommended course materials. Specifically, the disclosed technologies are needed to accomplish a measurable progression of each user, from both a formative and a consolidation point of view. As each user finishes each learning unit, learning objective, and/or course materials, the progression of each user may be measured, the progress assessment being a measurement of mastery of specific learning objectives (e.g., for a specific unit), and not overall language mastery. The measurable progression may be retrofit into the information that the system and the user have produced, in order to focus the student curriculum on a personalization for the learner, in addition to the core curriculum behind the group platforms and capabilities described above. In other words, the system may update the recommended course materials for students based on the progress assessment. Specifically, the system may generate, or one or more of the users described above, may identify remedial personalized content for users, which may be personalized at the level that two different learners in two different classes may have completely different course materials.

Fourth, one or more relevant achievement modules may provide first, grade placements, and second, certifications. The disclosed embodiments may deliver relevant achievement, by passing and advancing from one of the K-12 grades to another, or may offer one or more certifications, either academically, such as in English using the GSE, or professionally. As noted above, each of the steps of this four step process is focused on an efficacy vision with a base of the GSE, which is a strong and powerful tool used as a guideline, and allows for a robust system for measuring and delivering new measurements in efficacy and delivering better learning.

The disclosed system includes: one or more server hardware computing devices (servers), one or more data stores/databases, and one or more client hardware computing devices (clients), all coupled to a network.

In some embodiments, a system administrator or other user may access the system via a client and input software logic and/or one or more data records defining the GSE. As described in detail below, the GSE is a standardized, granular scale from 10 to 90, which measures English language proficiency in each of four functional skills: listening, reading, speaking and writing.

The GSE software logic and/or data records input by the user may include, as non-limiting examples: the logical structure of the GSE; a scoring paradigm; a number of skill categories and/or learning objectives (e.g., listening, understanding, reading, speaking, writing, vocabulary, grammar, etc.), which may include "can do" statements that define specific skills within each of the skill categories, which must be mastered to achieve a certain GSE score or level. The software logic and/or data records may be associated with one another within the system to define the structure of the GSE and tasks required to achieve a specific GSE score or level.

The disclosed embodiments may further store a plurality of curriculum content including, as non-limiting examples: assessments (e.g., quizzes and tests), learning materials (e.g., worksheets or other assignments), multimedia (e.g., video, games, virtual reality interaction, etc.), or other materials, each of which may be associated within the system with one or more elements within the GSE structure defined herein.

Some curriculum content or other learning materials may be designated within the disclosed system as core curriculum content that must be learned and completed by all learners to achieve the desired GSE score, while other learning materials may be designated as supplemental or remedial curriculum content, which are not required for all learners, but may be helpful to learners requiring additional learning or practice in order to complete the learning modules associated with the desired GSE score. Thus, the learning materials may be designated within the system as either core curriculum content, or supplemental/remedial curriculum content.

The disclosed system may store a plurality of advertising materials for the disclosed system (e.g., website or other media advertising such as multimedia ads). In response to these advertising materials, an administrator may create an administrator profile or account, possibly including data records for the administrator's username, password, learning institution details, contact data, faculty or other instructors, learner enrollment, etc. In response to the administrator authenticating to the disclosed system (e.g., via username and password associated with the profile/account), the disclosed system may generate an administrator GUI to be displayed on the administrator's client. Initially, this administrator GUI may include a control panel displaying: instructional and/or training materials for operating the disclosed system; instructor profiles, including details about each of the instructors within the school; instructor training materials; learner profiles including details about each of the learners within the learning institution; etc. The disclosed system may further include tools for assessing and training instructors within the administrator's school, and to assess each learner and create a customized learning curriculum personalized to each learner.

The instructor assessment may include one or more software modules configured to generate a control panel displayed within a GUI on a client, such as the administrator or instructor GUI, and may be configured to assess and score various skills and qualifications for each instructor within the learning organization. For example, the instructor assessment software modules may determine a GSE score for each instructor by accessing and presenting each instructor with a number of questions or other assessment materials stored within the system. The instructor may input their responses and/or other input, and the software modules may compare the input with correct answers stored within the system, and calculate a score according to a total correct input by the instructor. This data, as well as the resulting reporting data described below, may be stored in the database in association with one or more instructor profile data records.

The disclosed system may further define a threshold for one or more instructor skills, qualifications, certifications, etc. If the analysis of the instructor's assessment input shows a percentage of correct assessment input beyond this threshold, the server may update one or more instructor profile or account data records within the system to be associated with a specific skill level, qualification, certification, etc.

However, if the analysis of the instructor's assessment input shows a percentage of correct assessment input below the defined threshold for the one or more instructor skills, qualifications, certifications, etc., the disclosed system may identify the assessment skills and/or topics for which the instructor scored low (e.g., input an incorrect answer), and identify and access one or more stored training or other supplemental resource materials identified within the system for improving the identified skills or topics. These training materials may be stored as software modules and/or data records within the database. Thus, the disclosed embodiments may further include online learning for instructors, providing information for instructors for professional development, possibly via the instructor GUI, described in more detail herein, that allows instructors to personalize and better impact learning for each of their students.

The server may then generate a report, to be displayed on the instructor and/or administrator GUI, based on the instructor's score. If an analysis of the stored instructor profile data records shows that the instructor performed beyond the threshold, the report may include the instructor's qualifications for specific certifications, etc. If the analysis shows that the instructor performed below the threshold, the server may generate means (e.g. links), included in the GUI for accessing the stored training or other supplemental resources. The server may then transmit the GUI, including the reporting data, to the instructor or administrator's client for display. The instructor may then access, complete, and be assessed on these training or other resources, and repeat the process until the instructor reaches or exceeds the desired threshold level. The results of this process may be displayed on the instructor and/or administrator GUI. The instructor GUI may further include access to training resources for the disclosed system and the functionality disclosed herein.

The disclosed embodiments may further include a learner assessment, for each learner within the school, possibly divided by class. For example, the learner assessment may include one or more software modules, possibly accessible via a GUI (e.g., the administrator, instructor and/or learner GUI), and configured to determine and generate a GSE score, and an appropriate associated learning curriculum including learning modules for a desired GSE level or score, for each learner taking the assessment. The learner assessment software modules may determine a GSE score for each learner by accessing and presenting each learner with a number of questions or other assessment materials stored within the system, each of which is associated in the system with a specific area or category (e.g., listening, understanding, reading, speaking, writing, vocabulary, grammar, etc.) and/or learning objective, described in more detail below. The learner may input their responses or other input, and the software modules may compare the input with correct answers stored within the system, and calculate a GSE score according to an amount of correct learner input for each of the areas, categories, learning objectives, etc. This data, as well as the resulting reporting data described below, may be stored within data storage in association with one or more learner profile data records within the database.

Using a GUI (e.g., the administrator, instructor, learner, or parent GUI, described below), an administrator, instructor, learner, or parent may input a desired GSE score to be achieved in a specific time period (e.g., moving from a 3rd grade level score to a 4th grade level score within the next school year). The disclosed system may identify specific areas, categories, and/or learning objectives for which the learner scored low (e.g., input an incorrect answer for the associated assessment materials), and generate a learner curriculum comprising core curriculum content including practice learning modules (e.g., practice exercises, reading comprehension assignments, speaking interaction practice, videos, virtual reality (VR) interactions, quizzes/tests, etc.) identified within the system as being associated with, and for improving, the identified skills or topics, which must be completed in the designated time frame to achieve the desired GSE score. These learning modules may be stored as software modules and/or data records within the database. The server may then generate a report, to be displayed on the learner, instructor, administrator, and/or parent GUI including the learner's GSE score, the desired GSE score to be completed within the time frame, and access (e.g., hyperlinks) to the learner's personalized core curriculum.

As the learner completes each learning module, the server may access and present to the learner, possibly via the learner GUI, an assessment for that learning module. Similar to the assessment above, this assessment may include one or more questions or other material for which the learner provides assessment response input, which the system compares with an identified correct response or input within the software logic or database. The learner may complete the assessment, and the server may compare the learner's completed assessment responses or input with the correct responses within the logic and/or database of the system, to generate an average assessment score for the learner. This data, as well as any resulting reporting data, may be stored within data storage in association with one or more learner profile data records within the database.

Similar to the instructor assessment above, the disclosed system may further define one or more threshold scores for specific skills, areas, categories, and/or learning objectives tested within the assessment for the learning module. If the analysis of the learner's assessment input shows a percentage of correct assessment input far beyond this threshold, the server may update the personalized learner curriculum to eliminate curriculum materials associated in the system with skills, areas, categories, or learning objectives for which the learner has scored well beyond the threshold.

However, if the analysis of the learner's assessment input shows a percentage of correct assessment input below the defined threshold for the one or more specific skills, areas, categories, and/or learning objectives tested within the learning module, the disclosed system may automatically determine that additional curriculum materials are needed. The system may therefore identify and access the supplemental and/or remedial curriculum content associated with, and for improving, the identified low score skills, areas, categories, and/or learning objectives within the learner assessment. This supplemental or remedial curriculum content may be stored as software modules and/or data records within the database.

The server may then generate a report, to be displayed on the learner, instructor, administrator, and/or parent GUI, based on the learner's GSE score. If an analysis of the stored learner profile data records shows that the learner performed beyond the threshold, the report may include an update to the learner's control panel providing access (e.g., links) to the accelerated curriculum materials. If the analysis shows that the learner performed below the threshold, the server may update the learner's control panel providing access to the supplemental or remedial resources. The server may then transmit the GUI, including the reporting data and control panel, to the client(s) for display. The learner may then access the updated control panel, as well as the updated accelerated or remedial resources, and repeat the assessment process. This process may be repeated until the learner reaches the threshold level to advance to their desired GSE level, and ultimately achieve their desired GSE score.

The reporting data may be displayed on learner, instructor, and/or administrator GUIs, providing access to performance reporting data at various levels (e.g., learner, class, instructor, school, etc.). For example, using the instructor GUI, instructors may access and view reporting data on a class, and may drill down through the navigation on the control panel to access individual learner data, and recommend a personalized course for each learner, including the accelerated or supplemental/remedial curriculum content for each learner, which will improve their skills to move to the desired GSE level and/or score. Using the administrator GUI, an administrator may access, view, and/or navigate through the control panel to drill down through reporting data including details at a school, instructor, class, or individual learner level, and may recommend instructor training or learner curriculum updates accordingly.

In addition, a parent GUI/control panel displayed on a parent client (e.g., as a downloaded software app or website) may provide access to any of the learner reporting data described herein (e.g., assessment scores, GSE level/score, core, accelerated, or remedial assignments and assessments in the personalized curriculum, etc.). The parent GUI may also include a translation software module providing instructions for the learner's assignments, supplemental materials, and/or reports, translated into the parent's native language, allowing the parent to understand the learner's progress, and assist them where needed, as well as improve their own English skills.

The disclosed embodiments include a GSE-based system and method which provides a personalized learning system for learners, allowing instructors, administrators, and/or parents to identify weaknesses in a learner's current curriculum, and personalize the curriculum to help the learner achieve their academic goals within a timeline, as described above.

In the example embodiments described in detail herein, the systems and methods may apply the GSE scoring methodology. The GSE is a standardized, granular scale from 10 to 90, which measures English language proficiency in each of four functional skills: listening, reading, speaking and writing. The GSE is also used within the disclosed embodiments to indicate proficiency levels and enable skills for grammar and vocabulary. The GSE is psychometrically aligned with the Common European Framework of Reference (CEFR). Unlike other frameworks, which describe attainment in wide bands, the GSE identifies what a learner can do in a more granular way at each point (i.e., integer value) on the scale. It is therefore possible to much more precisely show whether a learner—or a learning objective, as described below—is situated toward the top or bottom, or somewhere in the middle, of a comparatively wide-banded level (e.g., the six wide levels of the CEFR).

The GSE and the CEFR each include a framework of learning objectives with which the scores on the scale are associated. The GSE and CEFR models describe the development of proficiency as quantitative (i.e., how many tasks someone can perform) and qualitative (i.e., how well they perform them). Hence, the quantitative dimension is expressed in terms of communicative activities, while the qualitative dimension is expressed in terms of communicative competencies. The GSE and CEFR also model and scale communicative strategies, viewed as the link between communicative competencies and communicative activities. According to a user's knowledge and abilities, he or she will employ different strategies when performing a given activity. Each GSE and CEFR learning objective are described in terms of the competency they test, and are associated with one of the six levels of the scale.

The GSE framework extends, and fills gaps in, the framework of the CEFR and modifies the way in which the learning objectives are presented. Much like the CEFR learning objectives, descriptors for GSE learning objectives relate to functional activities (i.e., specific language tasks) in addition to competencies. In particular, the descriptors are typically composed of three consecutive elements: performance, describing the language function itself (e.g., "Can answer the telephone [in English]"); criteria, describing the intrinsic quality of the performance, typically in terms of the range of language used (e.g., "using a limited range of basic vocabulary"); and conditions, describing any extrinsic constraints on the performance (e.g., "with visual support," or "if spoken slowly and clearly"). In order to create a set of learning objectives that can support a more granular scale of measurement, the same task frequently occurs at multiple levels of quality; the quality indicators are included in the learning objective itself (i.e., via the criteria). Sociolinguistic and pragmatic competencies are also included in the wording of the learning objectives themselves, rather than being presented as a separate set.

In the GSE, each integer value, or "score," on the scale is associated with one or more learning objectives in each of the four functional skills. Each integer value/score on the scale is also associated with grammar and vocabulary. Someone who is at a particular point on the GSE possesses a 50% probability of being able to perform the learning objectives at that level. The probability is higher for those learning objectives at a lower level, and the probability is lower for those learning objectives at a higher level. That said, language learning is not necessarily sequential, and a learner might be strong in one area, where he has had a lot of practice or a particular need or motivation, but quite weak in another. For that reason, to say that a learner is 'at' a certain level on the GSE does not mean he has necessarily mastered every GSE learning objective for every skill up to that point. Neither does it mean that he has failed to master any learning objective at a higher GSE score. If an individual is assessed as being at 61 on the scale, it means s/he has a 50% probability of being able to perform learning objectives at that level, a greater probability of being able to perform learning objectives at a lower level, and a lower probability of being able to perform learning objectives at a higher level.

The disclosed embodiments, therefore, may assist a user in: planning, at an appropriate level for their learners, a curriculum and course; planning lessons; creating assessments and learning materials, by understanding what the user's learners should be learning at each GSE/CEFR level; aligning the user's existing materials to the GSE learning objectives; creating admin reports; and giving feedback to learners and parents.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
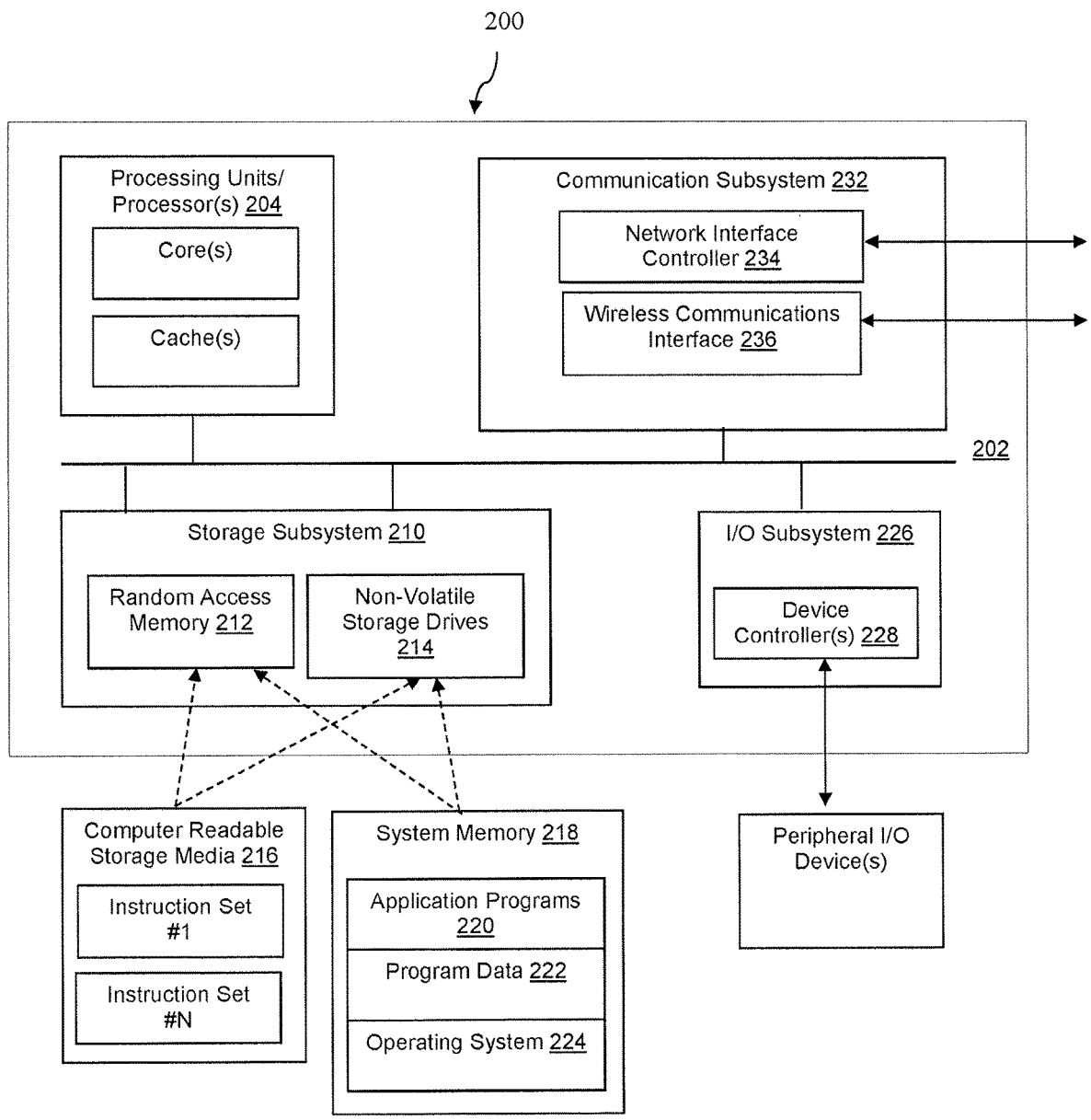
FIG. 2 illustrates a system level block diagram for an assessment-based measurable progress learning system.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3A:
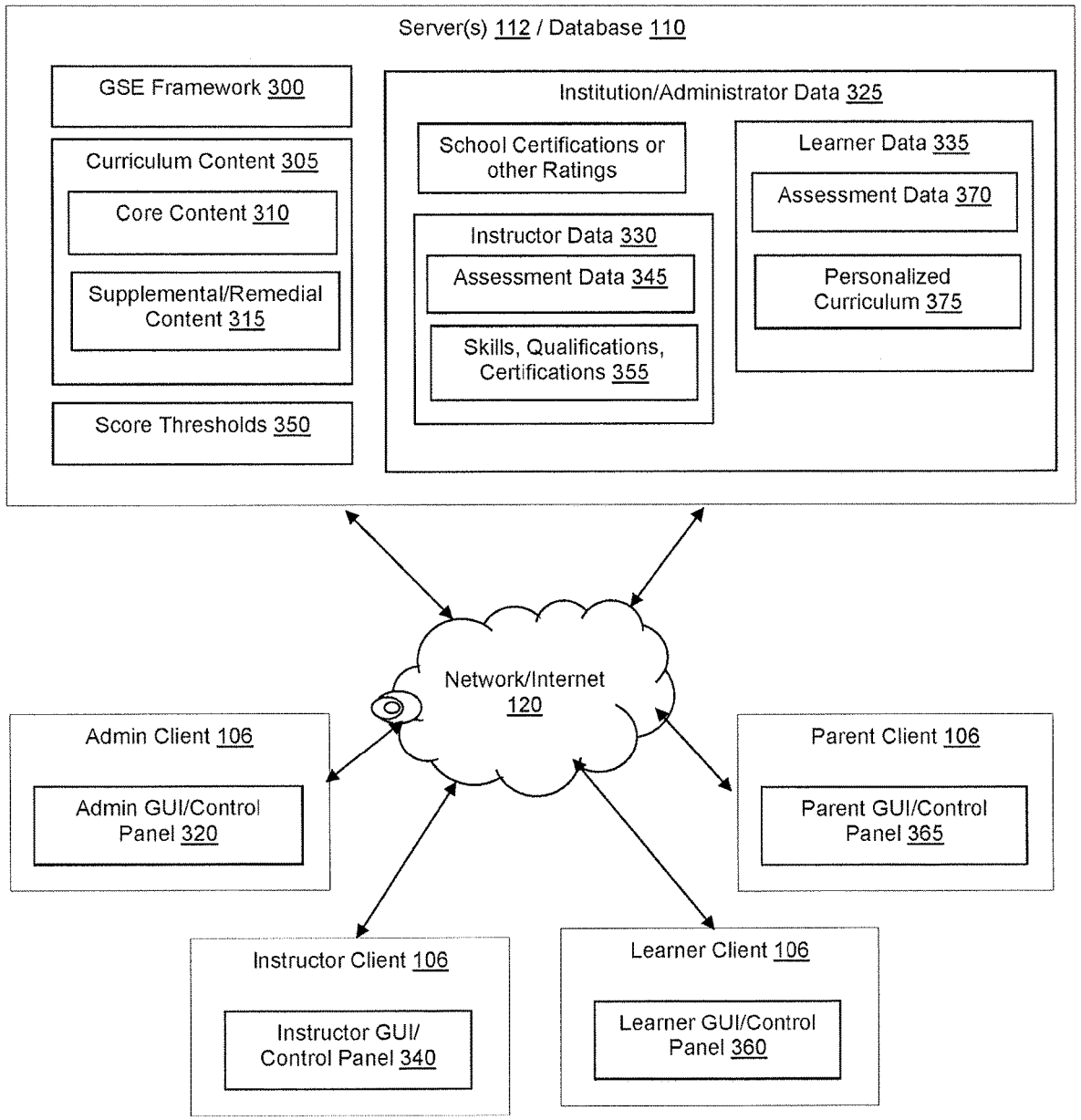
FIG. 3A illustrates a more detailed system level block diagram for an assessment-based measurable progress learning system.
Figure 3B:
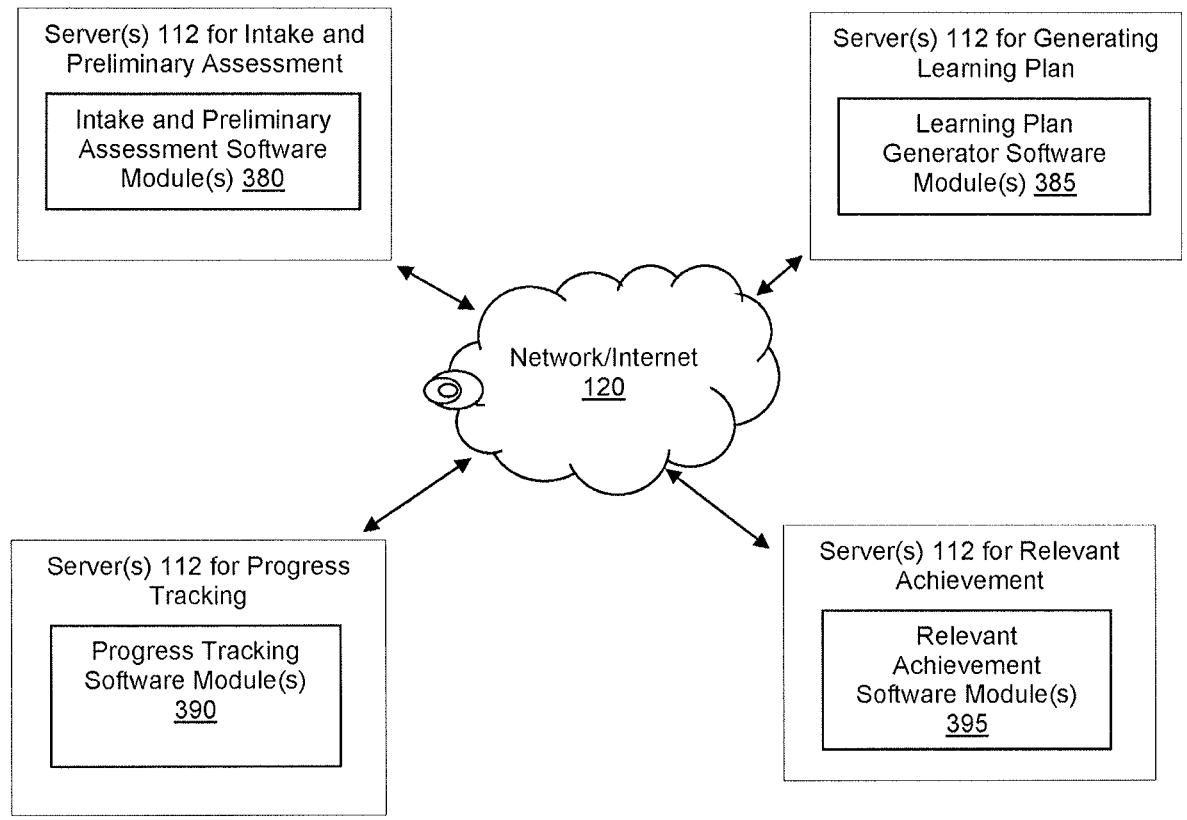
FIG. 3B illustrates a more detailed system level block diagram representing a highly distributed software environment for an assessment-based measurable progress learning system.

The disclosed embodiments may operate using the elements of the non-limiting example system seen in FIGS. 1-2 and described in detail above. FIGS. 3A-3B provide additional detail about the system described in FIGS. 1-2. Specifically, FIG. 3A demonstrates any combination of servers 112 and/or databases 110 communicatively coupled to network 120. This combination may include the software logic and/or instructions that execute the method steps disclosed herein, as well as the data used to personalize the user experience as described below. The system may further include client devices 106, communicatively coupled to network 120 and configured to display the administrator 320, instructor 340, learner 360, and parent GUI/control panels 365 respectively, as described in detail below.

FIG. 3B demonstrates a non-limiting and highly distributed example embodiment representing the four central components of the disclosed embodiments. In this highly distributed environment, each of the intake and preliminary assessment software module(s) 380, the learning plan generator software module(s) 385, the progress tracking software module(s) 390, and the relevant achievement software module(s) 395, run on separate servers as demonstrated in FIG. 3B. However, other embodiments (not shown) may be envisioned, in which any combination of these software modules 380, 385, 390, 395 are hosted on a single server 112, or are distributed among any combination of servers 112. Each of these software modules 380, 385, 390, 395 may execute according to the method steps described in detail below.

Software modules 380, 385, 390, 395 may include any independent elements combined together to create a personalized course profile for each user's career path development. Software modules 380, 385, 390, 395 may therefore include any resources needed, and the relationships between the data modules 380, 385, 390, 395 and resources, and may be associated with any job description or occupation. The data modules 380, 385, 390, 395 may therefore be used for any associated job description or occupation within any career path for a user. For example, logic or materials within data modules 380, 385, 390, 395 defining a user's ability to organize and run a meeting may be associated with both a Junior Marketing Manager job description, or a Senior Marketing Manager job description.

As non-limiting examples, individual data modules 380, 385, 390, 395 may include and define any combination of: one or more learning objectives (also referred to as "can do" statements, e.g., "can organize and run a meeting"); a GSE or other competency score associated with the one or more learning objectives; one or more assets or other resources needed for the user to complete the one or more learning objectives (e.g., instructional video, assessment questions); one or more skills improved through the one or more learning objectives (e.g., reading, writing, speaking, listening); one or more career based tasks (e.g., "socializing with foreigners") associated with the one or more learning objectives; one or more job descriptions/occupations associated with the one or more tasks (e.g., Jr. Marketing Manager), and a means of course delivery (e.g., individual independent learning activities, peer-to-peer independent learning games, and/or teacher facilitated group learning).

Returning now to FIG. 3A, in some embodiments, a system administrator or other user may access the system via a client 120 and input software logic and/or one or more data records defining the GSE framework 300.

The GSE software logic and/or data records 300 input by the user may include, as non-limiting examples: the logical structure of the GSE; a scoring paradigm; a number of skill categories and/or learning objectives (e.g., listening, understanding, reading, speaking, writing, vocabulary, grammar, etc.). The GSE software logic and/or data records 300 may be associated with one another within the system to define the structure of the GSE and a learning path, including the tasks, learning objectives, and functional skills required to achieve a specific GSE level/score.

Because organizations and potential employees may benefit from a better understanding of the specific English skills required to perform a particular job and the current skill level of those who seek to do that job, the disclosed system may include access to a system that provides a consistent and precise method for understanding and assessing the English language skills needed for a particular job. Specifically, job seekers would benefit from a system that evaluates the career goals of particular employees and candidates, and generated a personalized course profile defining a series of learning objectives, skills and/or tasks that the employees or candidates must master to qualify for a job matching a job description for the employee or candidate's defined career goals. The disclosed system, therefore, includes certification, badge, or other rating data available to the relevant achievement software module(s) 395. This data may be associated in database 110 with the GSE framework 300, allowing users of the disclosed system to identify specific GSE scores with specific certifications, badges, ratings, possible employment opportunities, etc., as described in greater detail below.

It should be therefore understood that there can be many aspects that may need to be stored in the data store 110, such as user, access rights, mapping, language score, learning objective, information derived via job processing of GSE related data, map/reduce, or other forms of generated intelligence about the GSE, as non-limiting examples, which can be stored in any appropriate mechanisms in the data store 110. The data store 110 may include multiple databases or other resources. For example, the data store may include databases for the GSE (a granular scale to measure progress of language learning described above), and for the O*NET database, mapping the GSE to a database structured around job families and job titles. In some embodiments, like modules are grouped within separate databases or groupings within the databases (e.g., data records in data tables). For example, the GSE scale/score data may be stored in a GSE level database 300, the mapping of a GSE score to positions in specific industries in another database (e.g., the O*NET database), and the tasks, learning objectives, and/or skills in yet another database.

In embodiments where the job description, job-related tasks, learning objectives, and GSE skill level for each learning objective has not been integrated within the database 110, server 112 may generate integrated data (e.g., integrated data records) from two or more data sources. The first data source, possibly a job profile database, data table, data record, etc., may include one or more job profiles containing one or more job descriptions. Each job profile/description may also include one or more required competencies including tasks required for competence in the associated job profile. As a non-limiting example, this profile may be populated using data from the O*Net database provided by the United States Bureau of Labor and Statistics, which provides thousands of job profiles that have already been created. Server 112 may access the profile data such as the O*Net database using any technology known in the art (e.g., web crawl, API access, database interface, etc.), and download the data to populate the first data source.

The second data source may include, or access data defining, a scoring framework 300 (e.g., GSE level) defining a range of competency scores. The second data source may further include one or more proficiency requirements (e.g., skill-based learning objectives), each of which is associated within the data store with a competency score in the scoring framework 300 (GSE score). Each user must be proficient in the learning objective (e.g., has taken a test, has completed assignments, etc.) in order to achieve the competency score. Thus, in embodiments where the job description, job-related tasks, learning objectives, and GSE level for each learning objective has not been integrated within database 110, server 112 may generate data (e.g., data records) integrating data from each of the two data sources.

If server 112 determines that no integrated data records exist in database 110, server 112 may require user input to aggregate the job profile data from the first data source with the learning objective and GSE level data 300 in the second data source. To aggregate this data, server 112 may therefore render a GUI (not shown), displayed to a system administrator or other user on a GUI of a client computer 106, providing GUI controls for the user to associate one or more learning objectives in the second data source with one or more tasks in the first data source. The user may input the data associating one or more learning objectives with one or more job-related tasks, and submit the data to server 112.

Server 112 may receive and aggregate the input data as integrated data within database 110. For example, server 112 may generate one or more data records including, or joining, data fields including the task from the job profile, an importance of the task, the learning objective(s) associated with the task, and a skill and GSE score associated with each learning objective, as demonstrated in the table above.

Server 112 may also aggregate the data from the two data sources by identifying keywords that are common between data within the first data source and data within the second data source. Server 112 may identify these common keywords by tokenizing or otherwise identifying keywords within each of the data entries in the first data source and the second data source. For each learning objective data in the second data source sharing common tokens or other keywords with the task data in the first data source, server 112 may generate an integrated data record, associating and/or integrating the identified learning objective data, including the GSE score and associated skills, into the task data sharing the common tokens or keywords. In some embodiments, the integrated data may be presented to the user for confirmation of its correctness.

Server 112 may also aggregate the data from the two data sources by accessing a talent management system (TMS) accessible to server 112, and identifying a GSE skill level associated with a job description. The identified job description may be equivalent within the TMS to the job description input by the user in association with the user's career goals. In these embodiments, an organization has previously associated one or more GSE scores with one or more job descriptions, including the tasks and learning objectives associated in database 110 with each job description. Server 112 may access the TMS, identify one or more job descriptions within the TMS matching or equivalent to the user's input job description, and identify the GSE score associated with the matching job description in the TMS. Server 102 may then aggregate all data record(s) associated with the identified job description, tasks, learning objectives and GSE skill levels. In some embodiments, the integrated data may be presented to the user for confirmation of its correctness.

Server 112 and/or database 110 may further receive input from the system administrator or other user, and store the input as a plurality of curriculum content 305 including: assessments (e.g., quizzes and tests), learning materials (e.g., worksheets or other assignments), multimedia (e.g., video, games, virtual reality interaction, etc.), or other materials, each of which may be associated within the system with one or more elements within the GSE structure 300 defined herein.

As the curriculum content 305 is received, server 112 and/or database 110 may designate the curriculum content 305 within the disclosed system as core curriculum content 310 that must be learned and completed by all learners to achieve the desired GSE score, or as supplemental or remedial curriculum content 315, which is not required for all learners, but may be helpful to learners requiring additional learning or practice in order to complete the learning modules associated with the desired GSE score. Thus, server 112 and/or database 110 may designate the learning materials within the system as either core curriculum content 310, or supplemental/remedial curriculum content 315.

Server 112 and/or database 110 may further receive, possibly from a system administrator, a plurality of advertising materials for the disclosed system (e.g., website or other media advertising such as multimedia ads, business to business sales materials, etc.). These advertising materials may highlight the more effective teaching and learning of the English language through the disclosed system, or the ability of an administrator to assess and improve institutional performance at a broad and very granular level, or may emphasize that the administrator may use the disclosed system for cheaper than the current traditional portfolio, etc. Server 112 may store these advertising materials, and display them on one or more clients 106, possibly a client 106 for an administrator.

In response to these advertising materials, the administrator may create an administrator profile or account. The administrator may access an administrator GUI 320, and input school or administrator data 325, possibly including the administrator's username, password, school details, contact data, school faculty/instructor data 330, learner enrollment data 335, etc. In response to the administrator authenticating to the disclosed system (e.g., via username and password within the profile/account), server 112 may generate a control panel for the administrator GUI 320 to be displayed on the administrator's client 106.

Figure 4A:
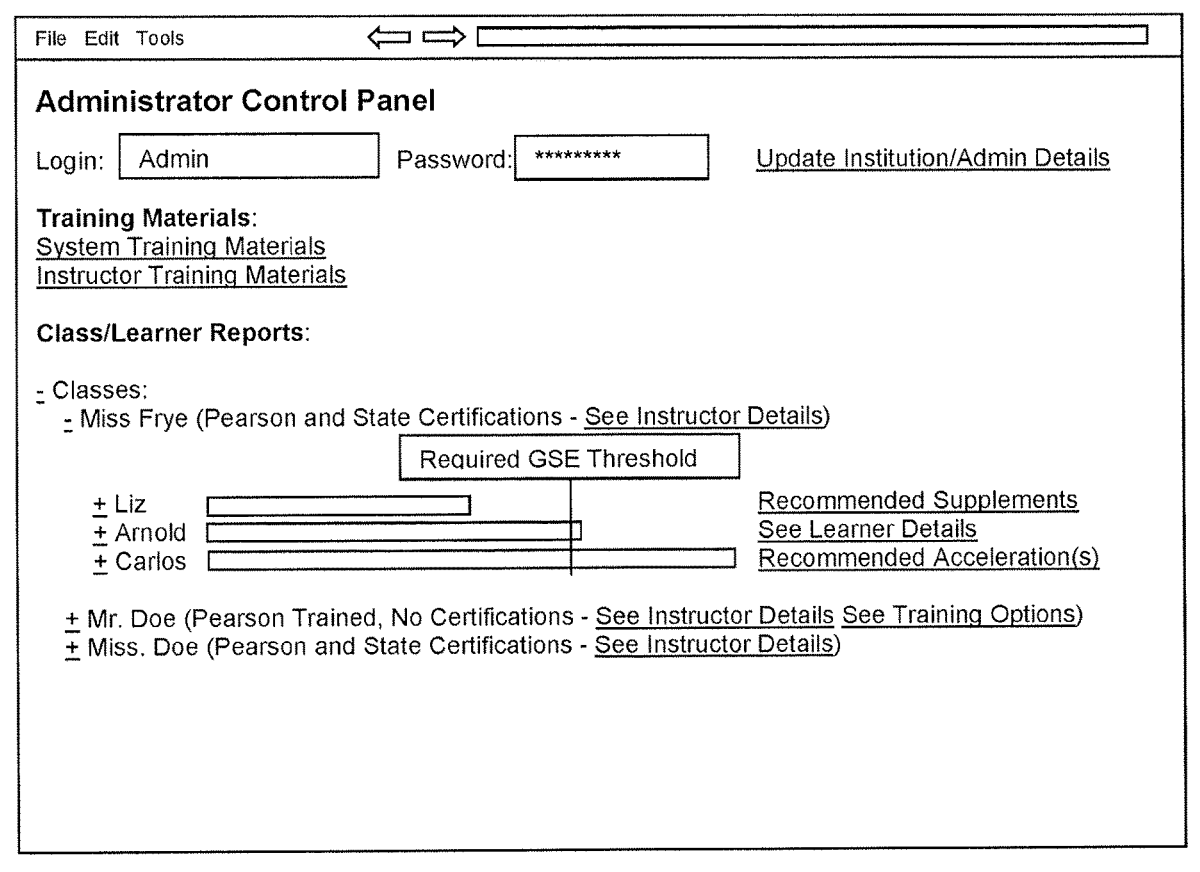

As seen in the non-limiting example administrator GUI in FIG. 4A, initially, this control panel 320 may display: instructional and/or training materials for operating the disclosed system; instructor training materials; instructor profile data 330, including details about each of the instructors within the institution; learner data 335 including details about each of the learners within the institution; etc. The disclosed system may further include tools for assessing and training instructors within the administrator's school, and to assess each learner and create a customized learning curriculum personalized to each learner 375.

Figure 4B:
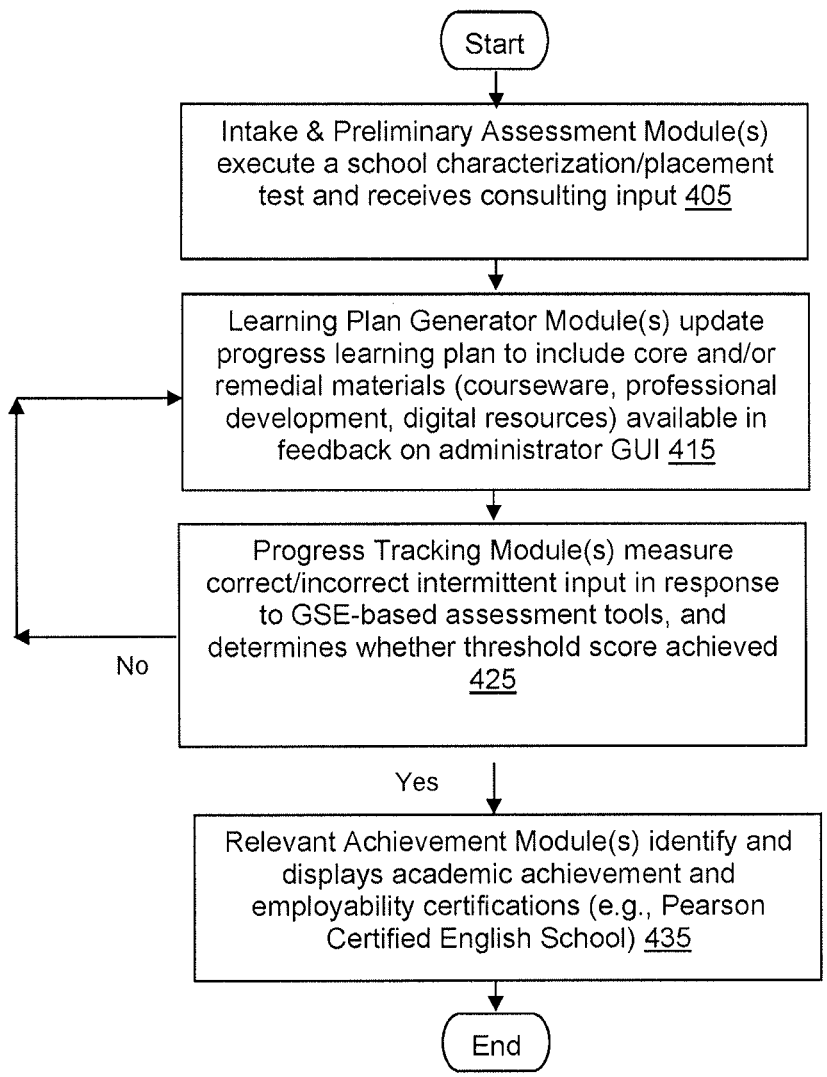
FIG. 4B illustrates a more detailed system level block diagram representing a highly distributed software environment for an assessment-based measurable progress learning system.

A flow diagram in FIG. 4B demonstrates a process wherein each of four steps of efficacy consulting and placement, establishing a progress learning plan, measuring progress, and generating relevant achievement for the institution/ school is respectively executed by one or more associated software modules. In step 405, one or more intake & preliminary assessment module(s) 380 execute instructions evaluating an institution or school through the use of a characterization/placement test, and may additionally receive additional consulting input. In step 415, one or more learning plan generator software modules 385 update a progress learning plan to include core and/or remedial materials (e.g., courseware, professional development, digital resources, etc.) available within feedback displayed on an administrator GUI 320. In step 425, one or more progress tracking modules measure correct and incorrect intermittent input in response to one or more GSE based assessment tools, and determines whether a threshold score has been achieved. If not, the process returns to step 415 and updates the progress learning plan according to the input for the GSE assessment based tools. If the threshold score has been achieved, in step 435, a relevant achievement module identifies and displays academic achievement and employability certifications for the school (e.g., Pearson Certified English School).

Turning now to the non-limiting example GUI shown in FIG. 5, server 112 may generate the resources needed to perform an assessment of instructors and learners using the disclosed system. The assessment may reflect a youth or adult level placement test as appropriate. Server 112 may identify the user's English speaking skills level at a starting point of the assessment using any techniques known in the art for assessing the user's current overall and individual language skill from competency scores within a scoring framework (e.g., the user's current GSE score within the GSE). For example, in some embodiments, server 112 may utilize the functionality provided by Pearson's GSE PROGRESS to perform the assessment of the instructors and/or learners within a particular school.

Server 112 may generate the user's competency score from the assessment described below. For example, database 110 may store, in association with the user profile described above, one or more previous competency scores, such as a GSE score representing the user's results from a previous GSE assessment, or determined from current use of systems that determine a GSE score. After the user is authenticated to the system, server 112 may query database 110 to determine the user's most recent or average assessment score, and this score may be used as the starting point of the user's personalized course, or may represent a baseline score if the user engages with the assessment described below.

In embodiments where no previous assessment data is found in association with the user, server 112 may generate an assessment for the user as described below. Database 110 may store a collection of assessment questions used to determine a user's language skill, such as the user's GSE level. Thus, a GSE score representing an appropriate GSE level may be stored in association with each assessment question within database 110. The GSE score for each question may be determined by presenting the question to a group of users, preferably language speakers of a variety of different languages and associated with different GSE levels, and scoring their responses. Questions correctly answered by most users may be calibrated as a low skill assessment item while questions answered only by advanced users may be calibrated as a high skill assessment item. In some embodiments, each question may also be associated with a skill (grammar skill, reading comprehension, vocabulary, etc.), and a GSE score assigned to each associated skill. Each question may also be associated in database 110 with a question type, including, for example, true or false, multiple choice, reading comprehension, or fill in the blank.

Each question may also be associated in database 110 with a difficulty level (e.g., reading comprehension is more difficult than true false). Database 110 may also associate multiple weighted scores for questions including multiple possible responses. For example, each answer for a multiple choice question may be weighted to reflect a best answer, a second best answer, and so forth.

In response to the user logging in and beginning the assessment, server 112 may generate a dynamic structure for the assessment questions including a number of questions, and a randomly assigned question type for each of the questions. For example, server 112 may create a structure for a 4-question assessment including a fill in the blank question, a multiple choice question, a fill in the blank question, and a true or false question. In some embodiments, the logic in the software instructions executed by server 112, or database 110, may define rules for server 112 to generate the structure for the assessment questions.

Server 112 may execute a query to select a first assessment question 225 from database 110. The query may specify that the question match the question type defined in the dynamic structure generated by server 112, and further is associated with a GSE score matching the user's identified baseline GSE score from previous assessments. If server 112 cannot identify a baseline GSE score from previous assessments, server 112 may select a random question of the proper question type to establish the baseline.

Server 112 may generate a GUI for the user including the first assessment question and transmit the GUI to the user's client 106 for display. The user may input a response for the question and submit the GUI for transmission to server 112. Server 112 may receive and score the response. Scores may be weighted according to the type of question. For example, a multiple choice question may carry greater weight in scoring the user's answer than a true false question. Furthermore, a multiple choice may be made up of a best answer, second best answer, third best answer, etc. The weight of the score for a multiple choice question may be scored accordingly. Server 112 may update the user's GSE score to reflect weighted score from their response to the question. The user's overall GSE score may be increased for correct questions, and decreased for incorrect questions.

The disclosed process may also calculate a skill level for one or more different skills during the testing. As non-limiting examples, a skill level for grammar and a skill level for vocabulary may be individually presented, scored and tracked, with scores saved in database 110. Server 112 may then select the next assessment question for the user according to the user's updated GSE and/or skill score. This process may continue until all of the questions in the generated structure are complete.

The assessment process may be repeated until the user's GSE score is defined. The user's score may be more completely defined by selecting questions based on the highest current CSE and skill scores for the user to determine the user's highest skill level. For example, users having a low overall language skill may be given true or false questions (an easy question type), users having an intermediate overall language skill may be given multiple choice questions (an intermediate question type) and users having an advance overall language skill may be given fill in the blank questions (a hard question type).

In some embodiments, the assessment may be divided into stages. The rules in database 110 or defined in the software instructions may define a number of questions and/or time limit for each stage. In some embodiments, the stages may include stages to assess listening, speaking, and writing stages of the assessment.

Stages may include listening, speaking and writing assessments for the user. The listening assessment may include the user hearing a spoken word, phrase or sentence in a language, and typing the word, phrase or sentence into the user interface on the client device 106. The speaking portion of the assessment may include the user, after reading a word, phrase or sentence, responding by speaking the word, phrase or sentence into a microphone on the client device 106. The writing portion of the assessment may include the user, after hearing a word, phrase or sentence, responding by writing the word, phrase or sentence into a field or area in the GUI. The response of the user may be recorded, scored and stored in database 110.

Using the assessment structure described above, the disclosed system may evaluate instructor proficiency and determine if instructors need additional support to improve their language or English methodology teaching to improve the learning experience for each learner. The instructor assessment may therefore include one or more software modules (e.g., Pearson's GSE Placement Test For Instructors, Progress Test For Instructors On GSE, Progress Examination on Teaching Skills/Methodology, etc.) configured to generate a control panel displayed within a GUI on a client 106, such as the administrator 320 or instructor GUI 340, and may be configured to assess and score various skills and qualifications for each instructor within the institution. For example, the instructor assessment software modules may determine a GSE score for each instructor within the school by accessing and presenting each instructor with a number of questions or other assessment materials stored within the system, possibly using the assessment described above. The instructor may input their responses and/or other input, and the software modules may compare the input with correct answers stored within the system, and calculate a score or other instructor assessment data 345, according to a total correct input by the instructor. This instructor assessment data 345, as well as the resulting reporting data described below, may be stored in database 110 in association with one or more instructor profile data 330.

Server 112 and/or database 110 may store software logic or data records defining a threshold 350 for one or more instructor skills, qualifications, badges, and/or certifications. (e.g., PTE Academic, General Certification of Completion or Recognized Labor Certification on Methodology & Pedagogy from Hunter College from PDI, GSE Instructor Certification by Pearson for Results Deliveries, General International Certification of English; Certification on PD, etc.) If server 112 analyzes the instructor's assessment input and determines that a percentage of correct instructor assessment input is beyond this threshold 350, server 112 may update the instructor profile or account data 330 within the system, associating it with one or more specific skill levels, qualifications, certifications, etc. 355 stored within the disclosed system.

However, if server 112 analyzes the instructor's assessment input and determines that a percentage of correct assessment input is below the defined threshold 350 for the one or more instructor skills, qualifications, certifications, etc., server 112 may identify the assessment skills and/or topics for which the instructor scored low (e.g., input an incorrect answer), and identify and access one or more stored training or other supplemental resource materials 315 identified within the system for improving the identified skills or topics. These training materials may be stored as software modules and/or data records within database 110.

Figure 6:
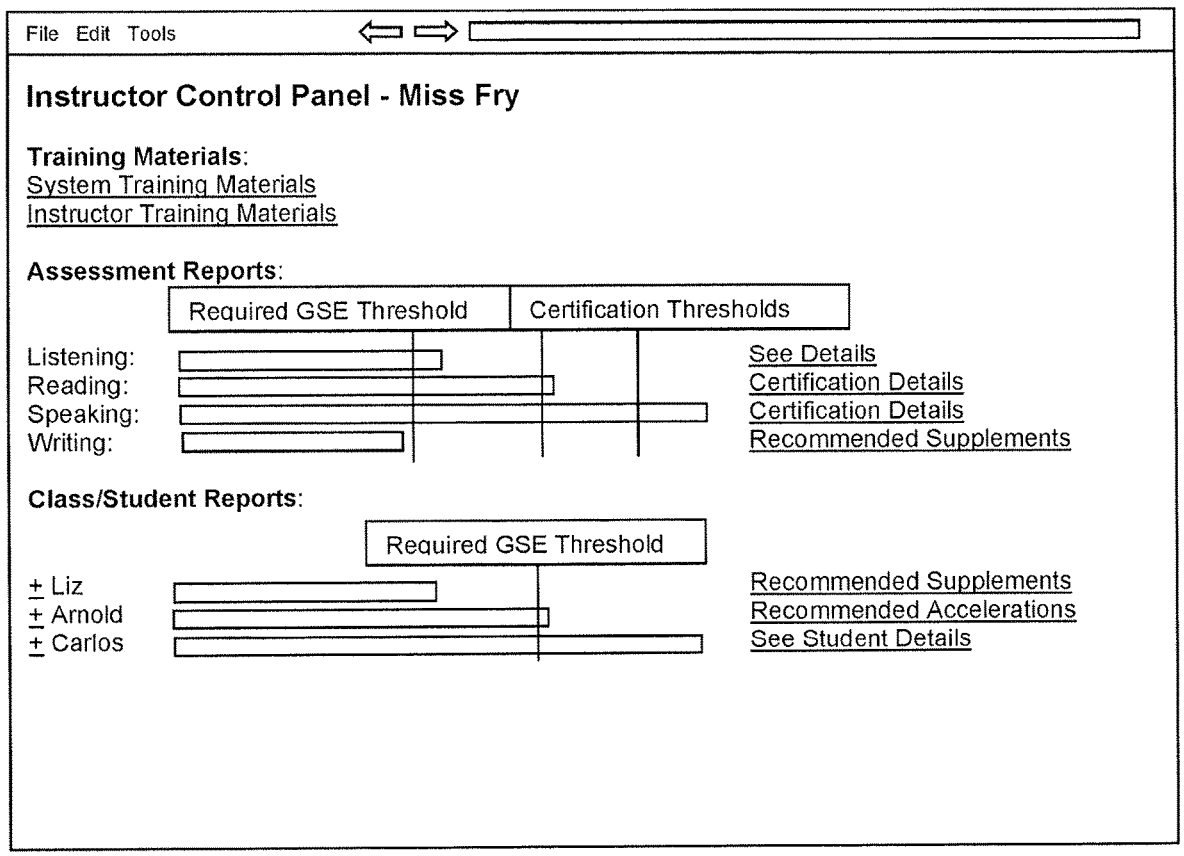
FIG. 6 illustrates a non-limiting example GUI for an instructor using the assessment-based measurable progress learning system.

Server 112 may then generate a report, to be displayed on the instructor 340 and/or administrator GUI 320, based on the instructor's score, as seen in FIG. 6. If an analysis of the stored instructor profile data records 330 shows that the instructor performed beyond the threshold 350, the report may include the instructor's qualifications for specific certifications, etc. If the analysis shows that the instructor performed below the threshold 350, server 112 may generate means (e.g. links), included in the report for accessing the stored training or other supplemental resources 315. Server 112 may then transmit the instructor GUI 340, including the reporting data, to the instructor and/or administrator client 106 for display as seen in FIGS. 4 and 6. The instructor may then access, complete, and be assessed on these training or other resources, and repeat the process until the instructor reaches or exceeds the desired threshold level 350. The results of this process may be displayed on the instructor 340 and/or administrator GUI 320. As seen in FIGS. 4 and 6, the instructor GUI 340 may further include access to training resources for the disclosed system and the functionality disclosed herein.

Figure 7A:
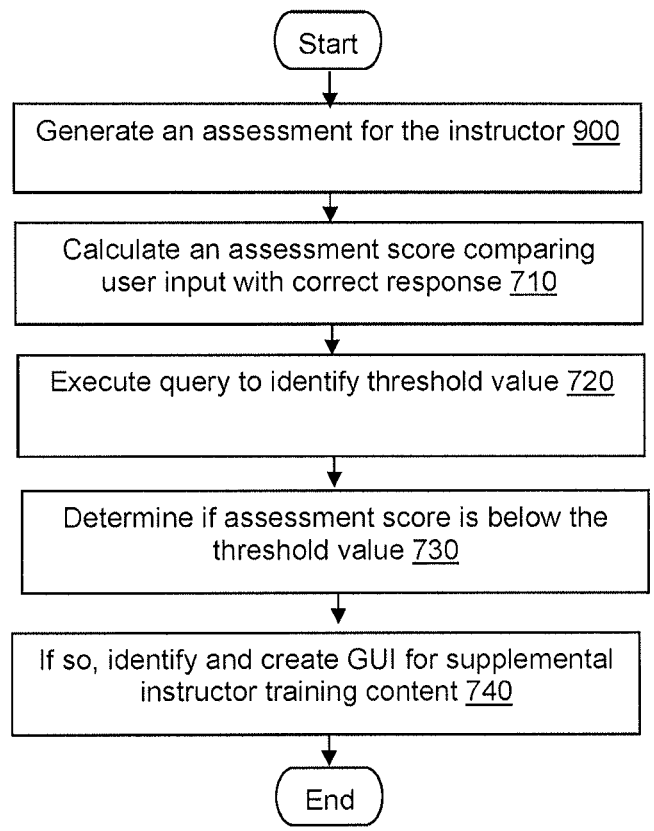
FIG. 7A illustrates a non-limiting example flow chart for method steps executed by the assessment-based measurable progress learning system.

A flow diagram of this process is shown in FIG. 7A. In step 700, a server generates an assessment for the instructor. In step 710, the server then calculates an assessment score for the instructor assessment comprising a comparison of at least one assessment user input with a correct assessment response within a data logic or at least one database record within the system, and in step 720 executes a query identifying, within the data logic or the at least one database record, a threshold value. In step 730, the server determines whether the assessment score is below the threshold value, and responsive to a determination that the assessment score is below the threshold value, in step 740, the server executes a query identifying a supplemental instructor training content stored within the system, and encodes, for display on a graphical user interface (GUI) on a client hardware computing device operated by the instructor, the assessment score, and the supplemental instructor training content.

Figure 7B:
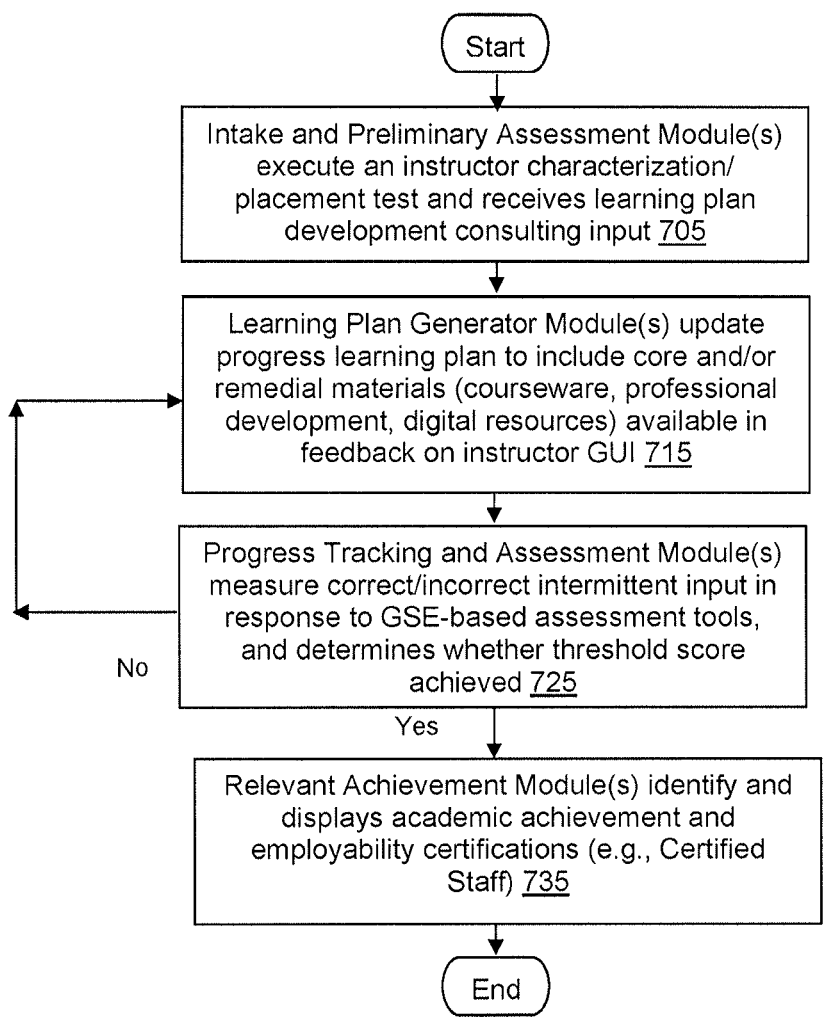
FIG. 7B illustrates a more detailed non-limiting example flow chart for method steps executed by the assessment-based measurable progress learning system.

A flow diagram in FIG. 7B demonstrates a process wherein each of four steps of efficacy consulting and placement, establishing a progress learning plan, measuring progress, and generating relevant achievement for the instructor is respectively executed by one or more associated software modules. In step 705, one or more intake & preliminary assessment software module(s) 380 execute instructions evaluating an instructor through the use of a characterization/placement test, and may additionally receive additional learning plan development consulting input. In step 715, one or more learning plan generator software modules 385 update a progress learning plan to include core and/or remedial materials (e.g., courseware, professional development, digital resources, etc.) available within feedback displayed on an instructor GUI 340. In step 725, one or more progress tracking modules measure correct and incorrect intermittent input in response to one or more GSE based assessment tools, and determines whether a threshold score has been achieved. If not, the process returns to step 715 and updates the progress learning plan according to the input for the GSE assessment based tools. If the threshold score has been achieved, in step 735, a relevant achievement module identifies and displays academic achievement and employability certifications for the instructor (e.g., Certified Staff).

Server 112 may further generate a learner assessment, for each learner in one or more classes within the institution. For example, one or more software modules running on server 112 may generate the learner assessment, accessible via a GUI (e.g., the administrator, instructor and/or learner GUI), and configured to determine and generate a GSE score, and an appropriate associated personalized learning curriculum 375 for each learner taking the assessment, including learning modules or other curriculum content 305 for a desired GSE level or score. The learner assessment software modules may determine a GSE score for each learner by accessing and presenting each learner with a number of questions or other assessment materials stored within software logic on server 112 or within database 110, the assessment material being associated in the system with a specific area or category (e.g., listening, understanding, reading, speaking, writing, vocabulary, grammar, etc.), as well as learning objectives defined within the GSE framework 300. Server 112 may receive input from the learner including their responses or other input, and server 112 may compare the input with correct answers stored within the data logic or within database 110, and calculate a GSE score according to the total correct learner input for each of the areas, categories, and learning objectives. This assessment data 370, as well as the resulting reporting data described below, may be stored within data storage 110 in association with one or more learner profile data 335 within database 110.

After calculating the GSE score for a learner after completion of the assessment, server 112 may generate a report of the learner's assessment data 370 to be displayed on a GUI for the learner's administrator 320, instructor 340, parent 365, and/or the learners themselves 360. Server 112 may then receive, from the GUI 320, 340, 365, or 360 a desired GSE score to be achieved within a specific time period (e.g., moving from a 3rd grade level score to a 4th grade level score within the next school year).

Server 112 may further receive user input including, for example, a current job description or associated skill set, as well as a desired job description or skill set that they would like to achieve in order to complete career goals. The user input may also specify and emphasize or deemphasize the relative importance of specific skill areas (e.g., reading, writing, speaking, hearing/understanding, etc.), possibly via a numerical weight assigned to each skill. However, any means of emphasizing or deemphasizing specific skills may be employed. For example, a user may select a ranking of each of the listed skills, or respond to a generated survey to determine the importance of each skill to the user, etc. Each user may also define a duration of time over which the user would like to achieve their professional goals. In other embodiments, the user may, as non-limiting examples, identify an amount of time available during a typical month or week to dedicate to achieving their professional goals, or number of weeks or month, etc., by which they would like to accomplish all identified learning objectives to achieve their professional goals.

Server 112 may determine specific skills, areas, categories, and/or learning objectives for which the learner scored low (e.g., input an incorrect answer for the associated assessment materials), and generate a personalized learner curriculum 375 comprising core curriculum content 310 including practice learning modules (e.g., practice exercises, reading comprehension assignments, speaking interaction practice, videos, virtual reality (VR) interactions, quizzes/tests, etc.) identified by server 112 as being associated with, and for improving, the identified skills or topics, which must be completed in the designated time frame to achieve the desired GSE score. These learning modules may be stored as software modules and/or data records within database 110. Server 112 may then generate a report, to be displayed on GUI 320, 340, 365, 360 including the learner's GSE score, the desired GSE score to be completed within the time frame, and access (e.g., hyperlinks) to the learner's personalized curriculum 375.

Server 112 may further create a course profile personalized to each user and including a collection of learning modules specifying learning objectives required for the user to achieve their professional goals. Each personalized course profile may include one or more learning objectives teaching the user one or more skills which the user must master to fulfill one or more tasks required in order to be proficient in the job description the user has identified to achieve their professional goals. For example, in some embodiments, server 112 may utilize the functionality provided by Pearson's JOB TOOLKIT.

Specifically, using the job description provided by the user to identify the user's career goals, server 112 may execute a database query to access the tasks within the integrated data associated with the identified job description. The query may further access the learning objectives associated in the integrated data with the identified tasks, and the GSE level associated with each learning objective. Server 112 may then analyze the GSE level for each of the learning objectives associated with the tasks and the job description, and calculate an overall GSE score required to achieve the user's career goals. Server may calculate the overall GSE score from all GSE scores returned from the data query, for the job description associated with the user's career goals. Server may then identify the overall GSE score as the endpoint of the course length continuum, and store the endpoint in data storage in association with the user profile, and/or a personalized course associated with the user profile 330, 335.

Figure 8:
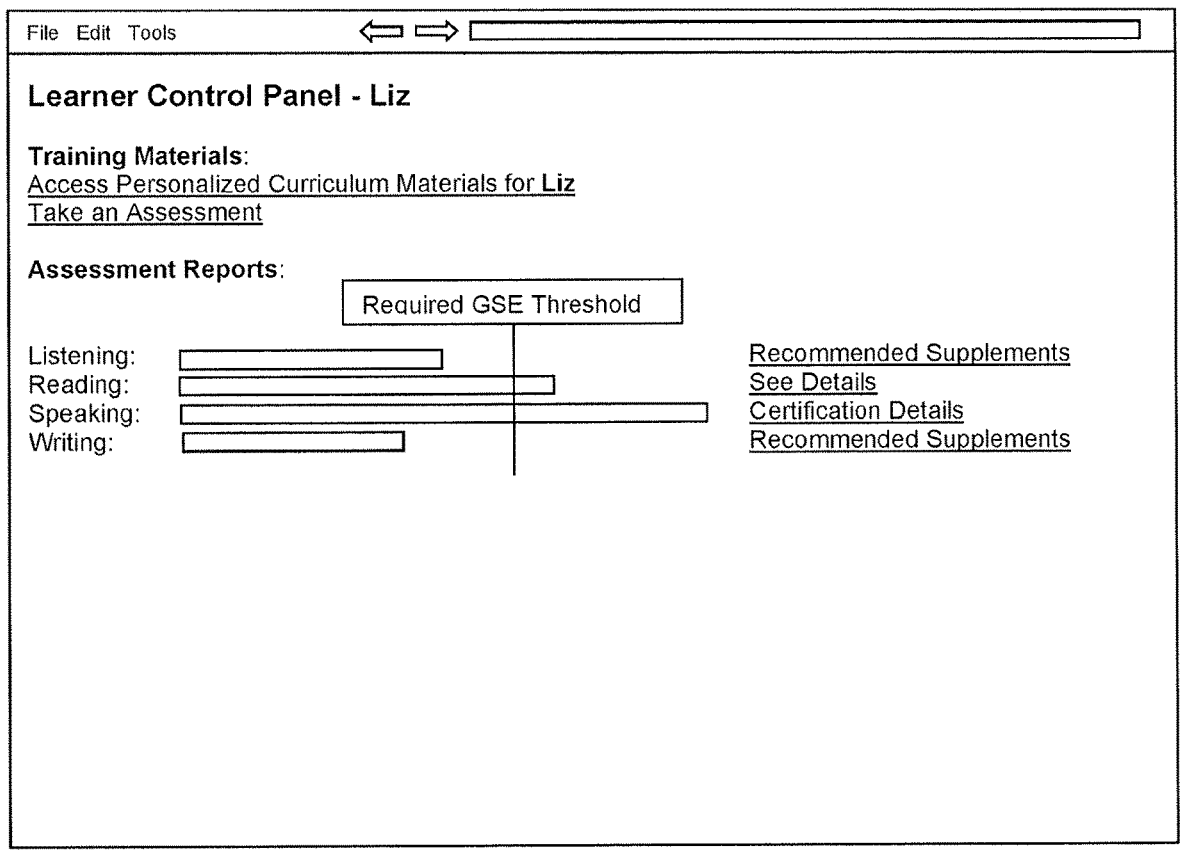
FIG. 8 illustrates a non-limiting example GUI for a learner using the assessment-based measurable progress learning system.

Server 112 may generate a learner GUI 360, providing access to the reporting data from the assessment, as well as the personalized curriculum 375 generated by server 112 for the learner. Specifically, as seen in FIG. 8, the learner GUI may include an online performance dashboard that includes a formative and summative assessment of the report generated from the assessment data 370, as well as access to the curriculum content 305, including at least core content 310.

Once server 112 determines a GSE score for each learner, and receives a desired GSE score to be achieved within a specific time period, server 112 may generate a personalized curriculum 375 including core content 310 from the curriculum content 305 including, one or more learning modules, data content, etc. customized to the learner according to the learner's assessment score and identified GSE level, in order to improve the learner's skill set and to progress to the desired higher GSE score.

Initially, the learning modules within the personalized curriculum 375 may be associated with a core curriculum 310, which all learners are required to complete to improve their GSE score and move to a higher curriculum level. This personalized curriculum 375 may include electronic books or other publications available to the learner online or offline, at school and/or at home, reading assignments, practice exercises, speaking practice, video, virtual reality interaction, quizzes, etc. (e.g., Pearson's Poptropica, Speakout, etc.) Each learner's online performance dashboard and/or Learner GUI 360 may then display the assessment results, informing the learner of strengths and weaknesses for the assessed skills, as well as the learner's customized core curriculum content 310, as seen in FIG. 8.

Thus, the online performance dashboard, as well as the learning modules within the core curriculum content 310 may include a learning digital platform that can measure skills based on the GSE framework 300 to help each learner to understand their own performance and the areas in which the learner should focus their efforts. The learner GUI 360 may therefore delivers content to provide learner performance, and progress reports, as well as a personalized curriculum 375/learning plan, courseware, professional development resources, content methodology, rewards for high performance, and/or any other digital resources used to improve the learner's overall GSE score.

Server 112 may then receive input from each learner's GUI 360 as they complete each learning module. This received input may include learner input for any learning content available through the core curriculum 310 of the personalized curriculum 375, such as adaptive homework exercises, practice pages, VR interaction within a selected experience, video interaction, exercises from homework in printed or electronic books or other publications, quizzes, or any of the other materials discussed above, which are configured for the server to measure the learner's skills according to the GSE framework 300.

The disclosed embodiments provide assessment and progress tests including ongoing evaluation of learning modules and other lessons and units, in order to evaluate skills acquired by the learners. To that end, the assessment methods described in detail above are not limited to a single assessment, but may include assessment and progress tests, including ongoing evaluation at the end of each learning module or unit.

Thus, as each learner completes each learning module, server 112 may access and present to the learner, possibly via learner GUI 360, an assessment for that learning module. The learner may complete the assessment, and the server may compare the learner's responses with the correct responses within the logic and/or database 110, and generate an average assessment score for the learner.

Similar to the assessment above, server 112 may generate and display one or more questions or other material for which the learner provides assessment response input (e.g., reading comprehension, speech interaction, virtual reality responses, etc.). Server 112 then compares this input with an identified correct response or input within the software logic or database 110. The learner may complete the assessment, and server 112 may compare the learner's completed assessment responses or input with the correct responses within the logic and/or database of the system, to generate an average assessment score for the learner. This assessment data 370, as well as the resulting reporting data, may be stored within data storage 110 in association with one or more learner profile data records 335 within the database 110.

In addition, the disclosed system may further define one or more threshold scores 350 for specific skills, areas, categories, and/or learning objectives tested within the assessment for each learning module in the personalized curriculum 375. If the analysis of the learner's assessment data 370 shows a percentage of correct assessment data 370 far beyond this threshold 350, the server may update the personalized learner curriculum 375 to eliminate curriculum materials associated in the system with skills, areas, categories, and/or learning objectives for which the learner has scored well beyond the threshold 350.

However, if the analysis of the learner's assessment data 370 shows a percentage of correct assessment input below the defined threshold 350 for the one or more specific skills, areas, categories, and/or learning objectives tested within the learning module, the disclosed system may automatically determine that additional curriculum materials are needed. The system may therefore identify and access the supplemental and/or remedial curriculum content 315 associated with, and for improving, the identified low score skills, areas, categories, and/or learning objectives within the learner assessment data 370. This supplemental or remedial curriculum content 315 may be stored as software modules and/or data records within database 110.

Server 112 may then generate a report, to be displayed on the learner 360, instructor 340, administrator 320, and/or parent GUI 365, based on the learner's assessment data 370 and personalized curriculum 375. If an analysis of the stored learner profile data records 335 shows that the learner performed beyond the threshold 350, the report may include an update to the control panel for the learner's GUI 360 providing access (e.g., links) to the accelerated personalized curriculum materials 375. If the analysis shows that the learner performed below the threshold 350, server 112 may update the control panel on the learner's GUI 360 providing access to the supplemental or remedial resources 315. Server 112 may then transmit the GUI, including the reporting data and control panel, to client(s) 106 for display. The learner may then access and complete the updated control panel, as well as the updated accelerated or remedial resources, and repeat the assessment process. This process may be repeated until the learner reaches the threshold level to advance to their desired GSE level, and ultimately achieve their desired GSE score.

Figure 9A:
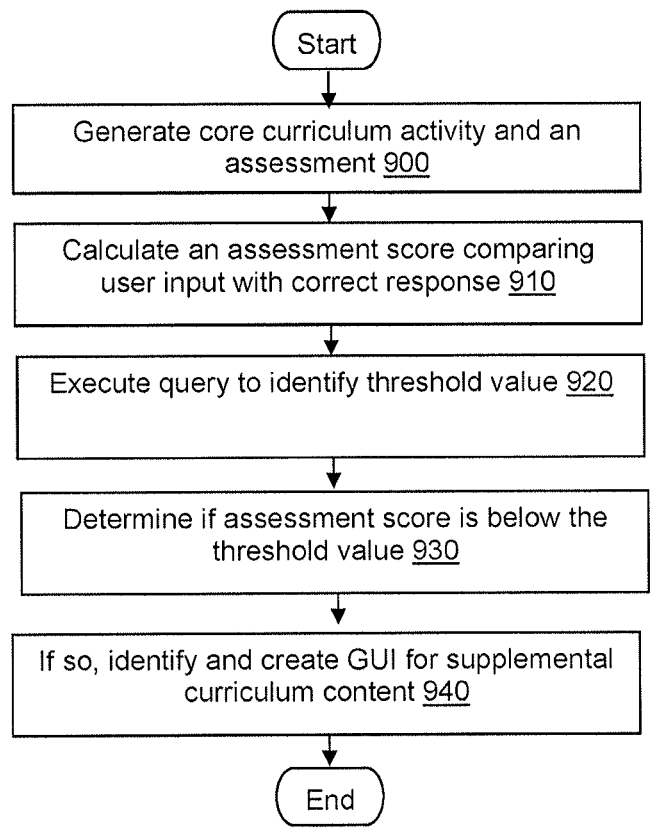
FIG. 9A illustrates a non-limiting example flow chart for method steps executed by the assessment-based measurable progress learning system.

A flow diagram of this process is shown in FIG. 9A. In step 900, a server generates: at least one core curriculum activity identified within the system as being associated with a global scale of English (GSE) level, and an assessment of the at least one core curriculum activity. In step 910, the server then calculates an assessment score for the assessment comprising a comparison of at least one assessment user input with a correct assessment response within a data logic or at least one database record within the system, and in step 920 executes a query identifying, within the data logic or the at least one database record, a threshold value. In step 930, the server determines whether the assessment score is below the threshold value, and responsive to a determination that the assessment score is below the threshold value, in step 940, the server executes a query identifying a supplemental curriculum content stored within the system and associated with the GSE level, and encodes, for display on a graphical user interface (GUI) on a client hardware computing device, the assessment score, the at least one core curriculum activity, and the supplemental curriculum content.

Figure 9B:
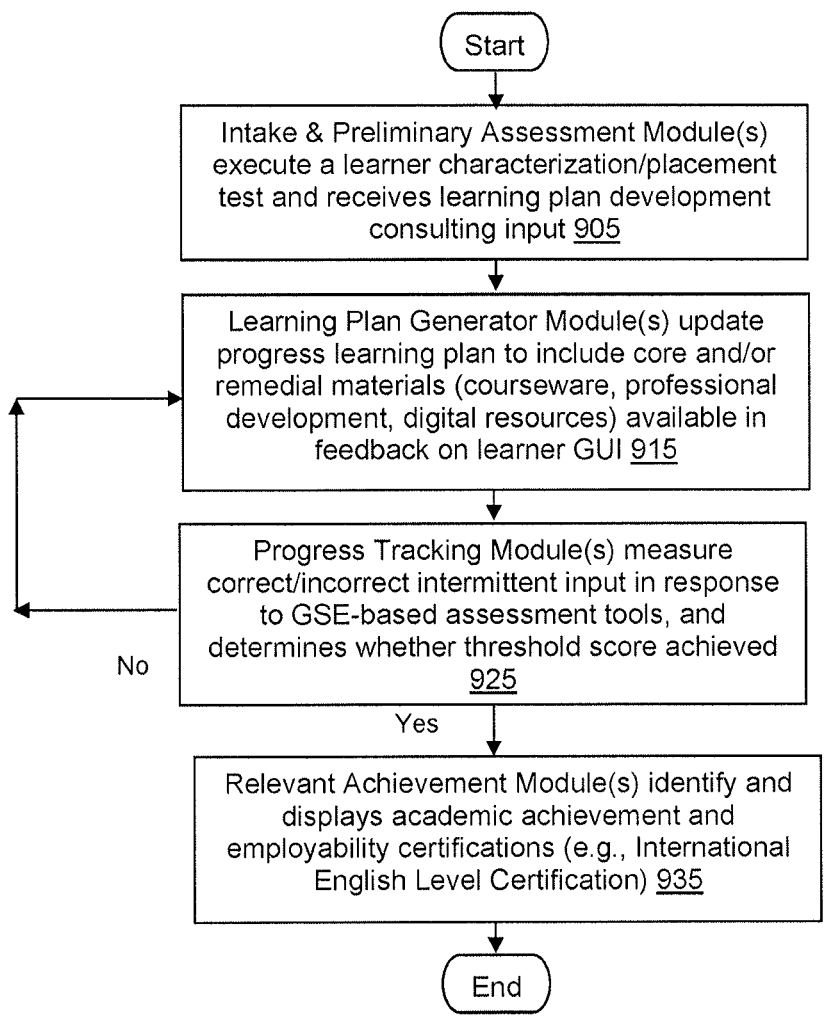
FIG. 9B illustrates a non-limiting example flow chart for method steps executed by the assessment-based measurable progress learning system.
Figure 10:
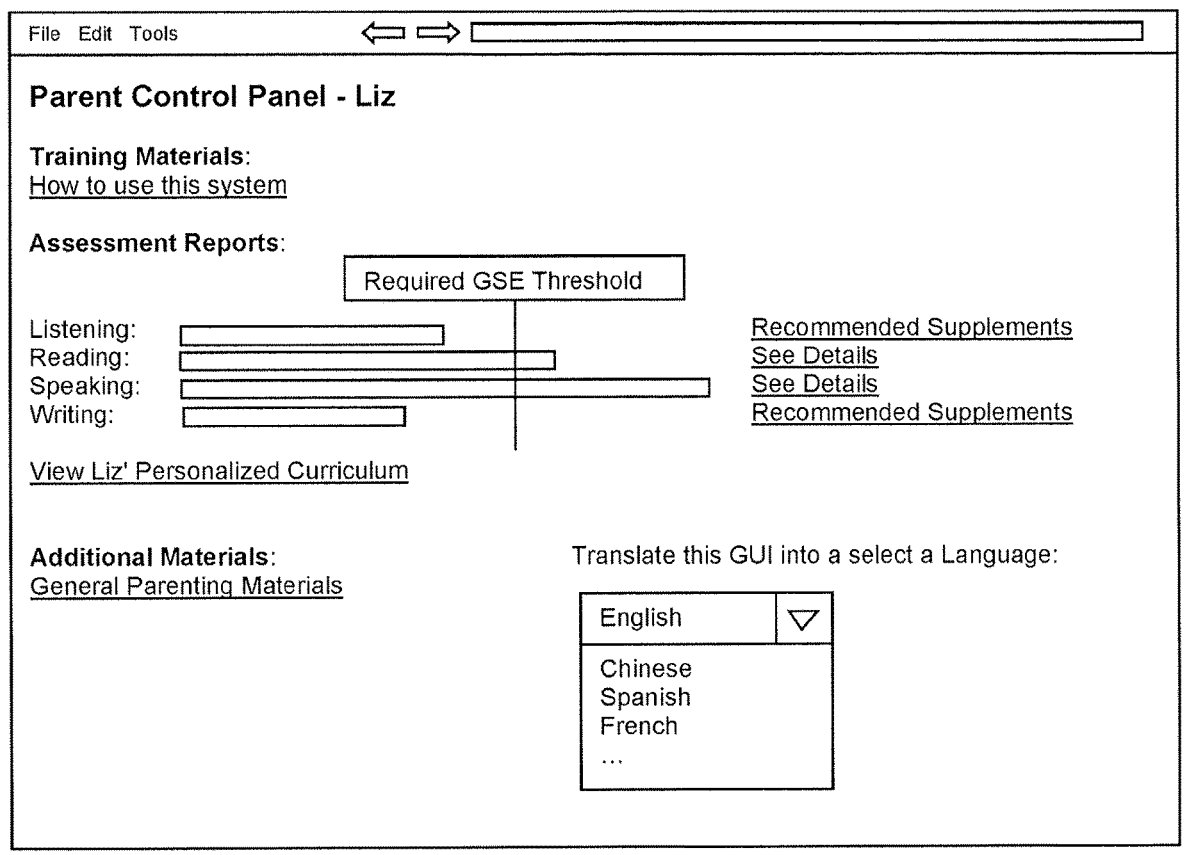
FIG. 10 illustrates a non-limiting example GUI for a parent of a learner using the assessment-based measurable progress learning system.

A flow diagram in FIG. 9B demonstrates a process wherein each of four steps of efficacy consulting and placement, establishing a progress learning plan, measuring progress, and generating relevant achievement for the learner is respectively executed by one or more associated software modules. In step 905, one or more intake & preliminary assessment software module(s) 380 execute instructions evaluating a learner through the use of a characterization/placement test, and may additionally receive additional learning plan development consulting input. In step 915, one or more learning plan generator software modules 385 update a progress learning plan to include core and/or remedial materials (e.g., courseware, professional development, digital resources, etc.) available within feedback displayed on a learner GUI 360. In step 925, one or more progress tracking modules measure correct and incorrect intermittent input in response to one or more GSE based assessment tools, and determines whether a threshold score has been achieved. If not, the process returns to step 915 and updates the progress learning plan according to the input for the GSE assessment based tools. If the threshold score has been achieved, in step 935, a relevant achievement module identifies and displays academic achievement and employability certifications for the learner (e.g., International English Level Certification).

The reporting data for each learner may be displayed on learner 360, instructor 340, and/or administrator GUI 320, providing access to performance reporting data at various levels (e.g., learner, class, instructor, school, etc.). The reporting data may include each learner's assessment data 370, and a comparison of each score in the assessment data 370 with the relevant score thresholds 350 for advancing to a higher GSE level within the GSE framework 300. Reports may be skills based, so learners or other reviewers are able to understand their own performance, providing clarity of learning objectives, progress, strengths and weaknesses.

For example, using the instructor GUI 340, instructors may access and view reporting data on a class, and may drill down through the navigation on the control panel to access individual learner data 335, and recommend a personalized curriculum 375 for each learner, including the accelerated or supplemental/remedial curriculum content 315 for each learner, which will improve their skills to move to the desired GSE level and/or score.

In other words, in some embodiments, rather than server 112 generating a control panel for a personalized curriculum 375 on the learner GUI 360, server 112 may generate recommendations for each learner's personalized curriculum 375 displayed on the instructor GUI 340, which the instructor may then recommend to the learner.

The instructor GUI 340 may further include a learner and class performance dashboard, providing instructors with access to learner assessment data 370 on an individual or class level, in order for the instructor to know the strengths and weaknesses within the class, or for each individual learner's skills, similar to a gradebook. Using this data, instructors may adapt classes according to class and individual learner performance.

Using the administrator GUI, an administrator may access, view, and/or navigate through the control panel to drill down through reporting data including details at a school, instructor, class, or individual learner level, and may recommend instructor training or learner curriculum updates accordingly.

Thus, the administrator GUI 320 may allow administrators to track lesson plans and the progress of each class. The administrator GUI may include reporting data for an overall report for the school, and to drill down to view details about each instructor assessment data 345, learner's assessment data 370, and/or any supplemental activities associated in the database with each instructor, class, and/or learner.

In addition, a control panel on a parent GUI 365, displayed on a parent client 106 (e.g., as a downloaded software app, viewed on a website) may provide access to any of the learner reporting data described herein (e.g., current assessment scores, GSE level/score, core, accelerated, or remedial assignments and assessments in the personalized curriculum 375, strengths or weaknesses of skills, etc.).

The parent GUI 365 may further include training materials for the parents to use the disclosed embodiments (e.g., training, videos, etc.), as well as access to analytics of learner data 335 within a profile for their learner. The parent GUI 365 may further include learning involvement and engagement tools, providing for better parenting and coaching.

The parent GUI may also include a translation software module providing instructions for the learner's assignments, supplemental materials, and/or reports, translated into the parent's native language, allowing the parent to understand the learner's progress, and assist them where needed, as well as improve their own English skills.

Thus, the disclosed embodiments empower parents that are not fluent or confident enough in their English so they can be a relevant part of their children's progress. Parents can change the language of texts inside the app to their native language, and communication tools may enable parents to get in contact with school or tutors. The parents may also access skill based reports in their native language so parents are able to understand their children's performance.

To accomplish this, parents will have an online translator to help them understand in their native language what their kids are learning in English to be able to give kids context and support. The more the parents help the more learners can learn, and help their kids in school homework and activities.

FIGS. 11-15 demonstrate a more detailed view of the instructor 340, learner 360, parent 365, and school administrator GUIs 320.

Figure 11A:
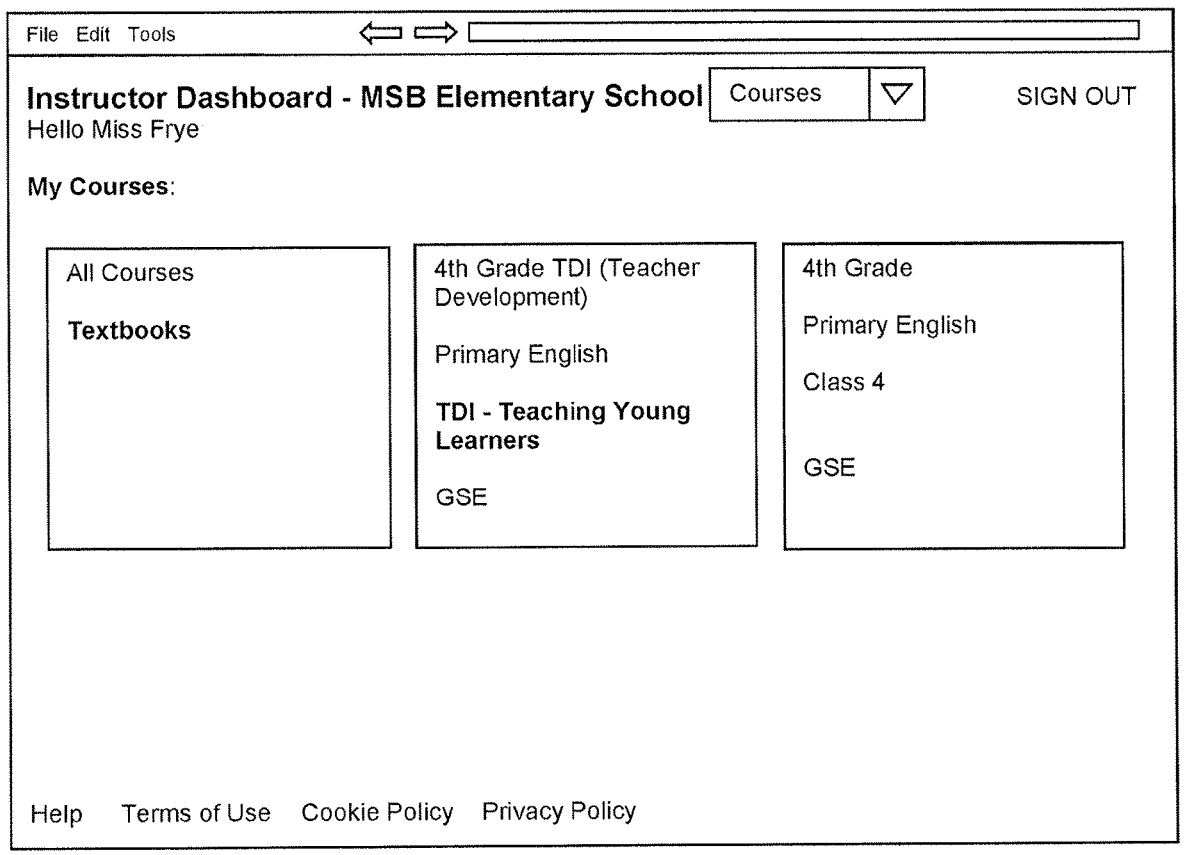
FIG. 11A illustrates a non-limiting example GUI for an instructor using the assessment-based measurable progress learning system.

Turning now to FIG. 11A, the instructor GUI 340 may include an instructor view, which may further include the instructor's courses, a section for teacher development, and a primary dashboard for the measurable progress learning system. As seen below, this primary dashboard may include data from a list of all learners within a class, which was gathered prior to the beginning of the course or presenting courseware for the instructor's courses, thereby allowing the instructor to focus on the learner placement data.

Figure 11B:
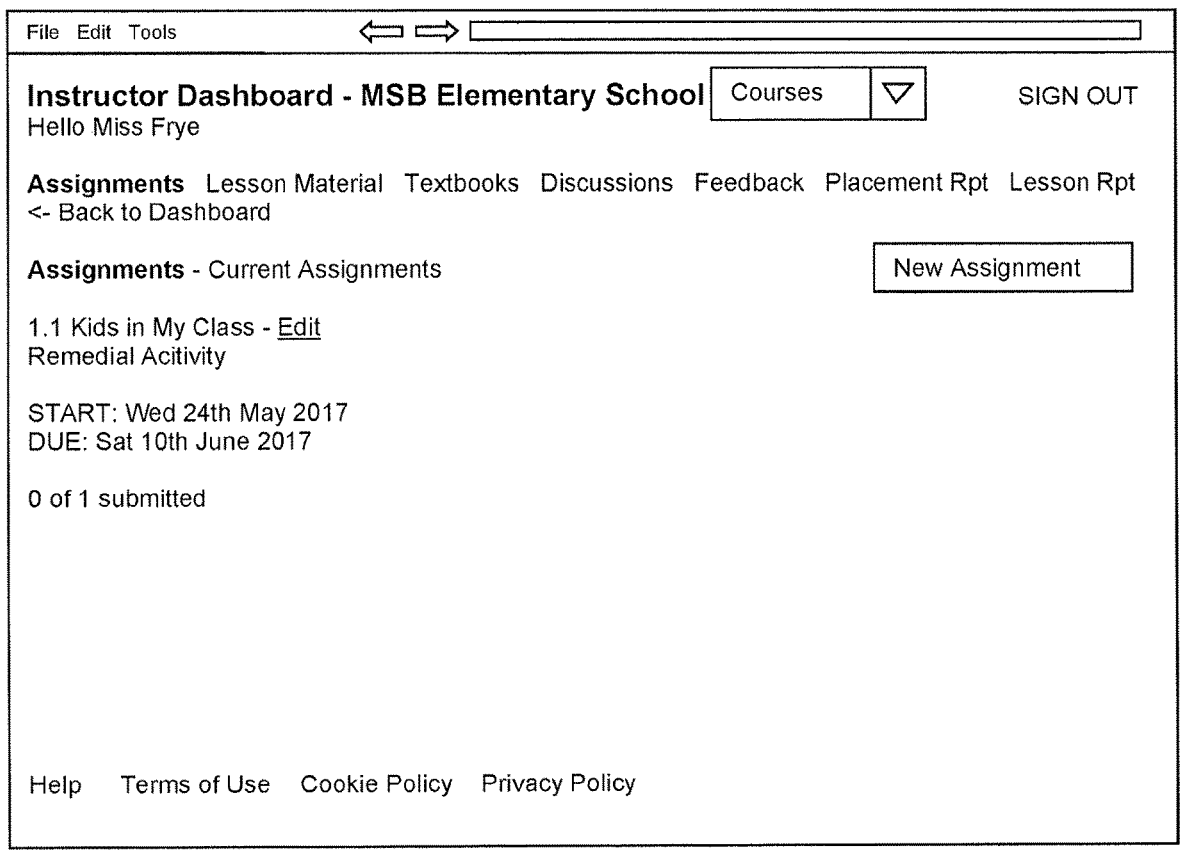
FIG. 11B illustrates a non-limiting example GUI for an instructor using the assessment-based measurable progress learning system.
Figure 11C:
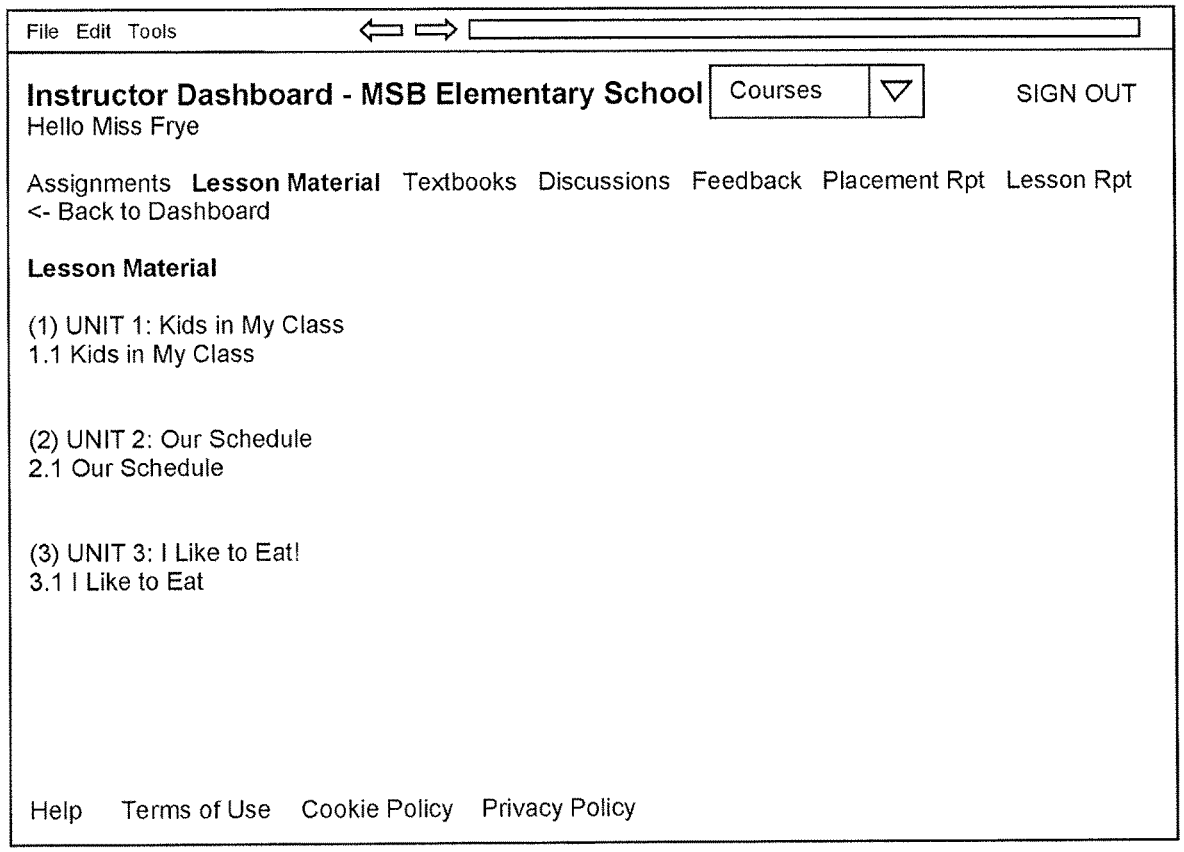
FIG. 11C illustrates a non-limiting example GUI for an instructor using the assessment-based measurable progress learning system.

Depending on the model of the school that the instructor is involved with, the instructor may redefine, for each of the learners in the instructor's class, a flexibility allowing the instructor to define different scopes for teaching, as seen in FIGS. 11B and 11C. For example, the instructor may pair learners differently so that they can support each other. If one student knows a lot of English, that learner may teach their peers, which would improve the learner's skill, and focus on and develop the skills of other learners.

The instructor therefore uses the disclosed embodiments to analyze the class, as well as the instructor's own personal information, in order to define the class and plan it in a different way. To accomplish this, the learner placement data described above, and shown in FIG. 11D, may include information on the analysis of each student's standing on the GSE scale. Students with a higher GSE score will be higher on the scale, with more proficiency and more possibility of dominating the English language. Each of the learners is at a different level of English dominance. Students with a lower GSE score may be capable of saying a hello, while students with a higher GSE score may be capable of telling different jokes, for example. As previously noted, the GSE is a very granular scale, wherein every one of several points has a specific "can do statement" that defines what a learner can do: e.g., I can do say hello, I can have a conversation, I can ask for food in a restaurant, etc.

Figure 11E:
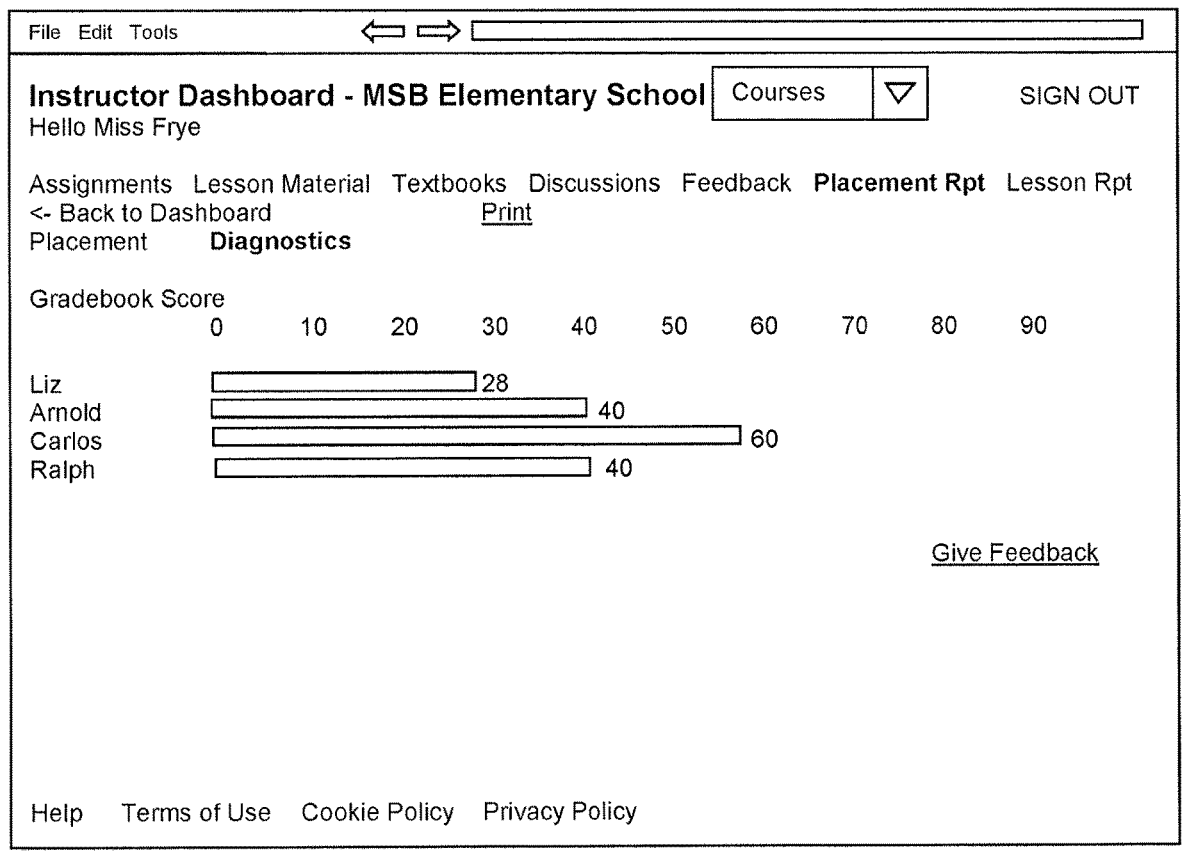
FIG. 11E illustrates a non-limiting example GUI for an instructor using the assessment-based measurable progress learning system.
Figure 11F:
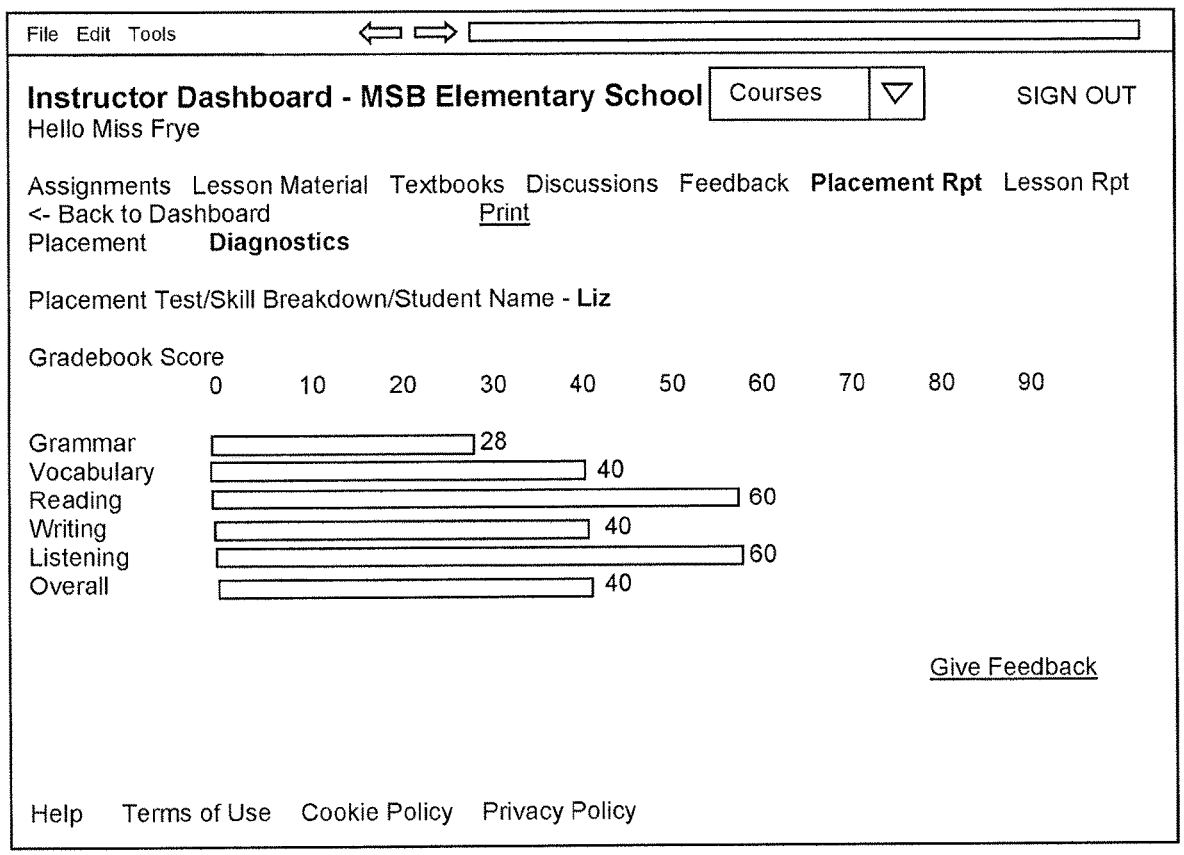
FIG. 11F illustrates a non-limiting example GUI for an instructor using the assessment-based measurable progress learning system.
Figure 12A:
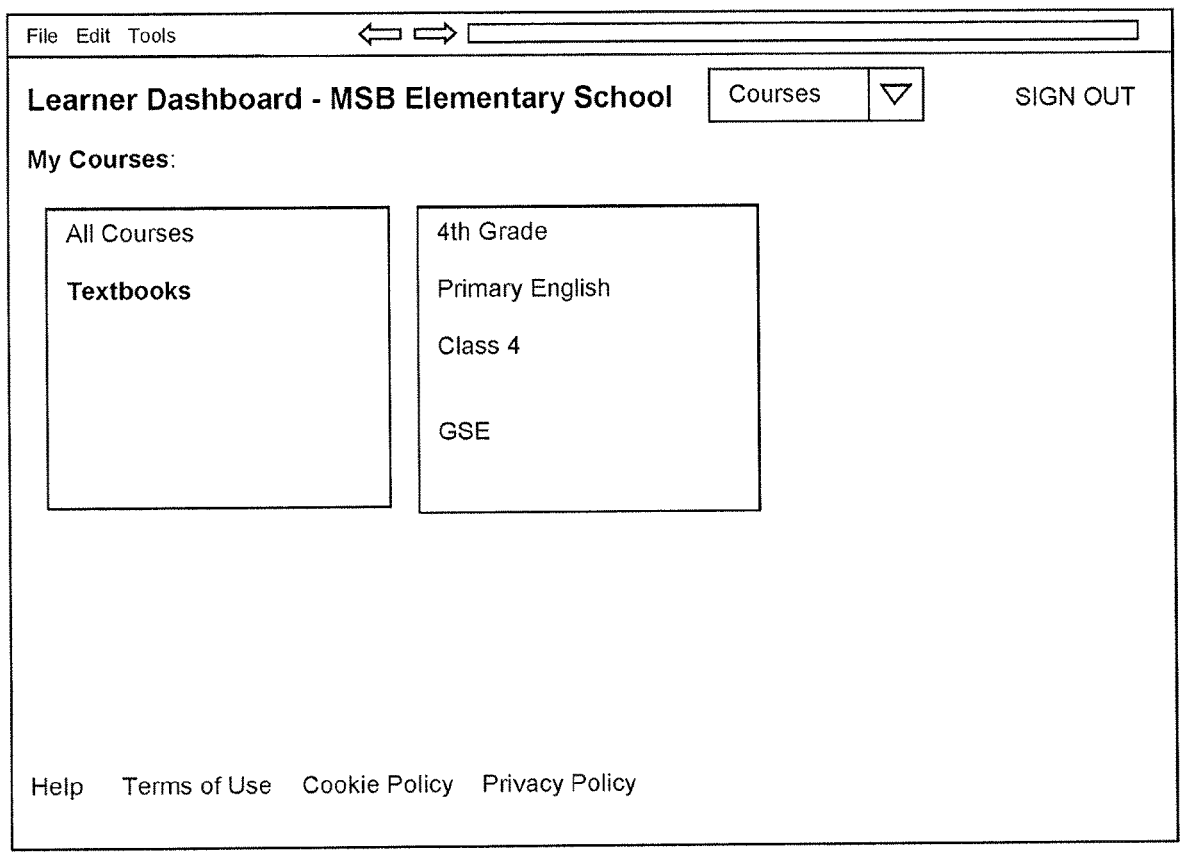
FIG. 12A illustrates a non-limiting example GUI for a learner using the assessment-based measurable progress learning system.
Figure 12B:
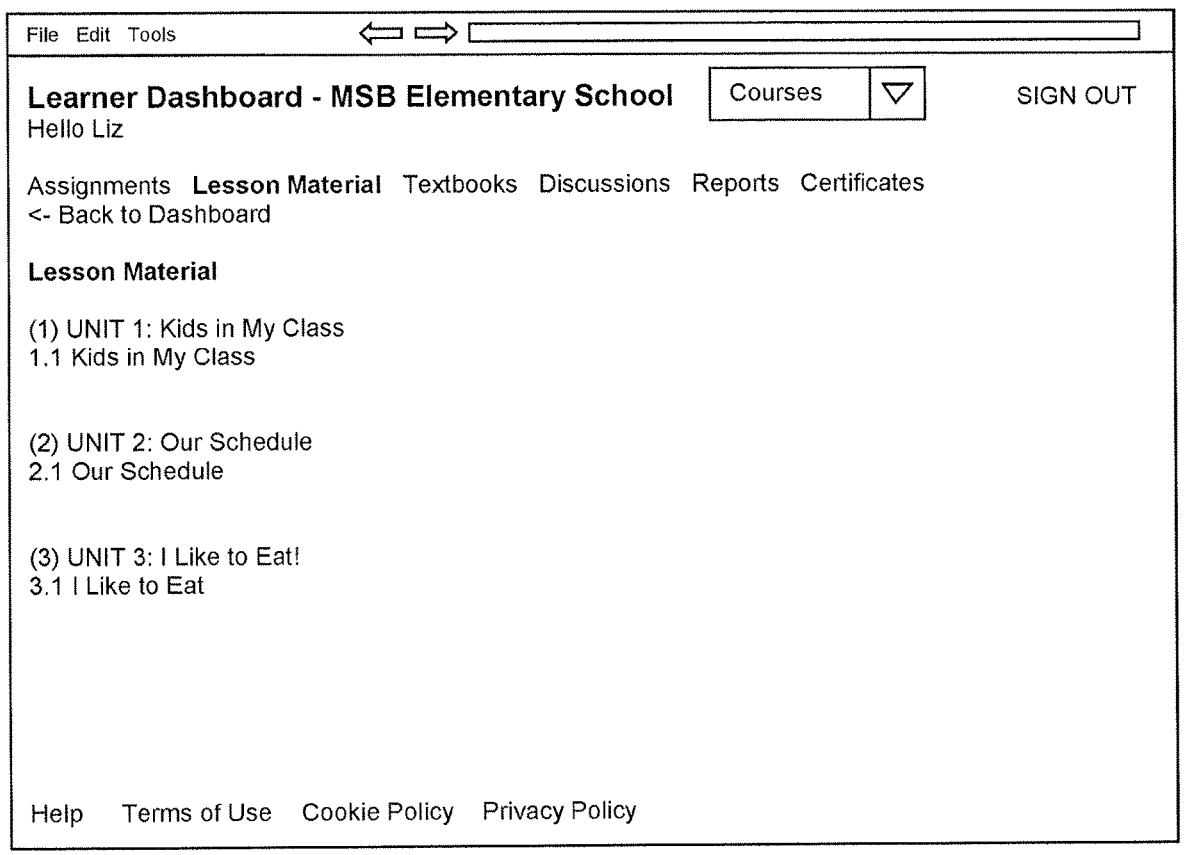
FIG. 12B illustrates a non-limiting example GUI for a learner using the assessment-based measurable progress learning system.
Figure 12G:
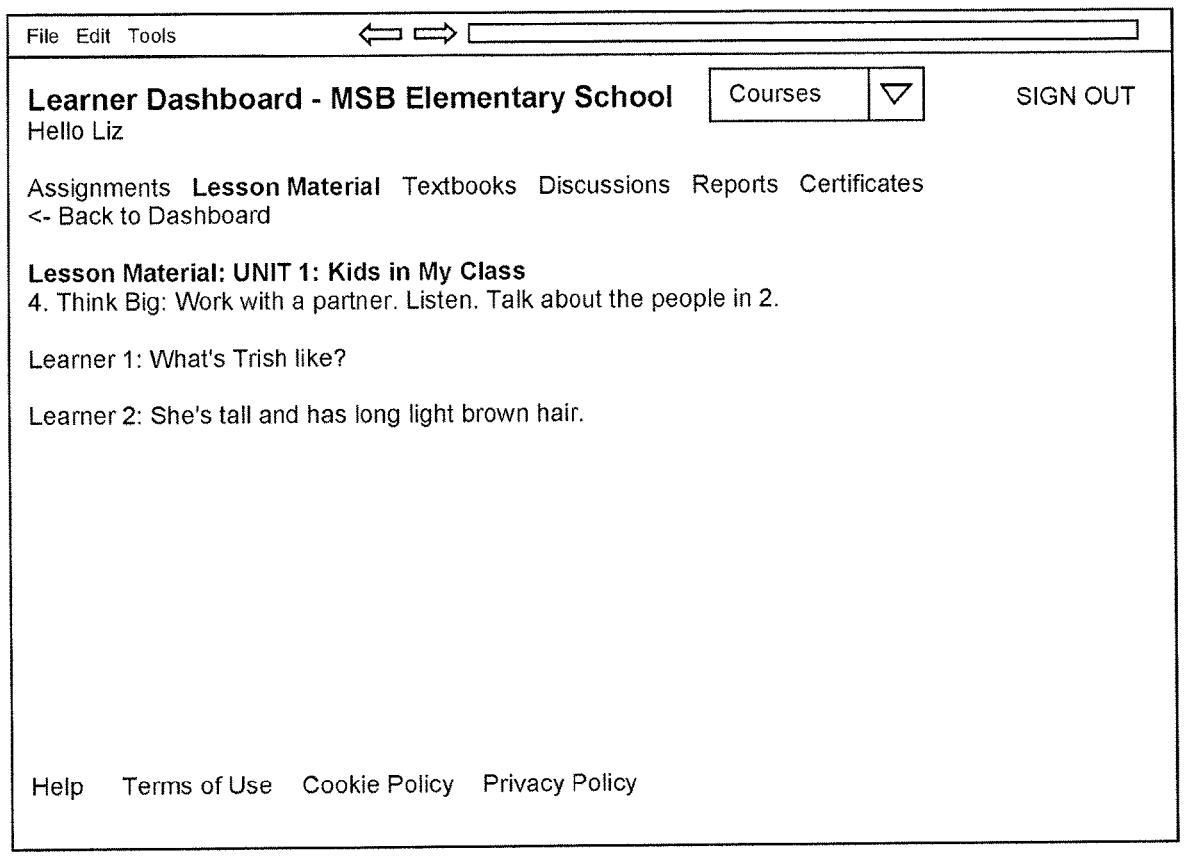
FIG. 12G illustrates a non-limiting example GUI for a learner using the assessment-based measurable progress learning system.

The data from the placement tests may provide additional information, and as seen in FIG. 11E, the diagnostics that the disclosed system derives from the placement data may provide additional information, received specifically from each of the skills. For example, in FIGS. 11E and 11 F, the instructor may view a gradebook score GUI presenting an overall GSE score for each of the learners. In FIG. 11F, the instructor may have selected one of the listed learners, and the system may display an evaluation on every one of the skills associated with the selected learner. Using this analytic data, the system, or the instructor, may begin planning the course for the class by predefining what kind of assignments may be delivered to each one of the learners in the class, allowing the class to transform, even from the beginning before the class starts, into something different and more personalized for each student.

Turning now to FIGS. 12A-12G, each of the learners may access a learner dashboard presenting a learner view. Using the diagnostic data disclosed above, the disclosed system, or the instructor may define immediate next steps. The instructor may access the learner view available to each of the students in the class, and create the core courseware for the class, using a robust developed courseware, such as is available from Pearson Education. Prior to developing the class, the courseware may be defined and mapped to the GSE, then converted into interactive multimedia resources, mixing the physical with the digital, since digital is highly engaging for learners. As non-limiting examples, this courseware may include interactive eBooks, interactive songs, videos, VR resources etc. When learners engage in this kind of content, they may view it as entertaining, rather than just exercises, and get more engaged, even if they're doing an assessment or part of their homework or class work. In some embodiments, this content may be presented in a mobile device environment, as a vertical design, so that it can be shown on a mobile device, or projected within a classroom (e.g., shown as a video).

Figure 13B:
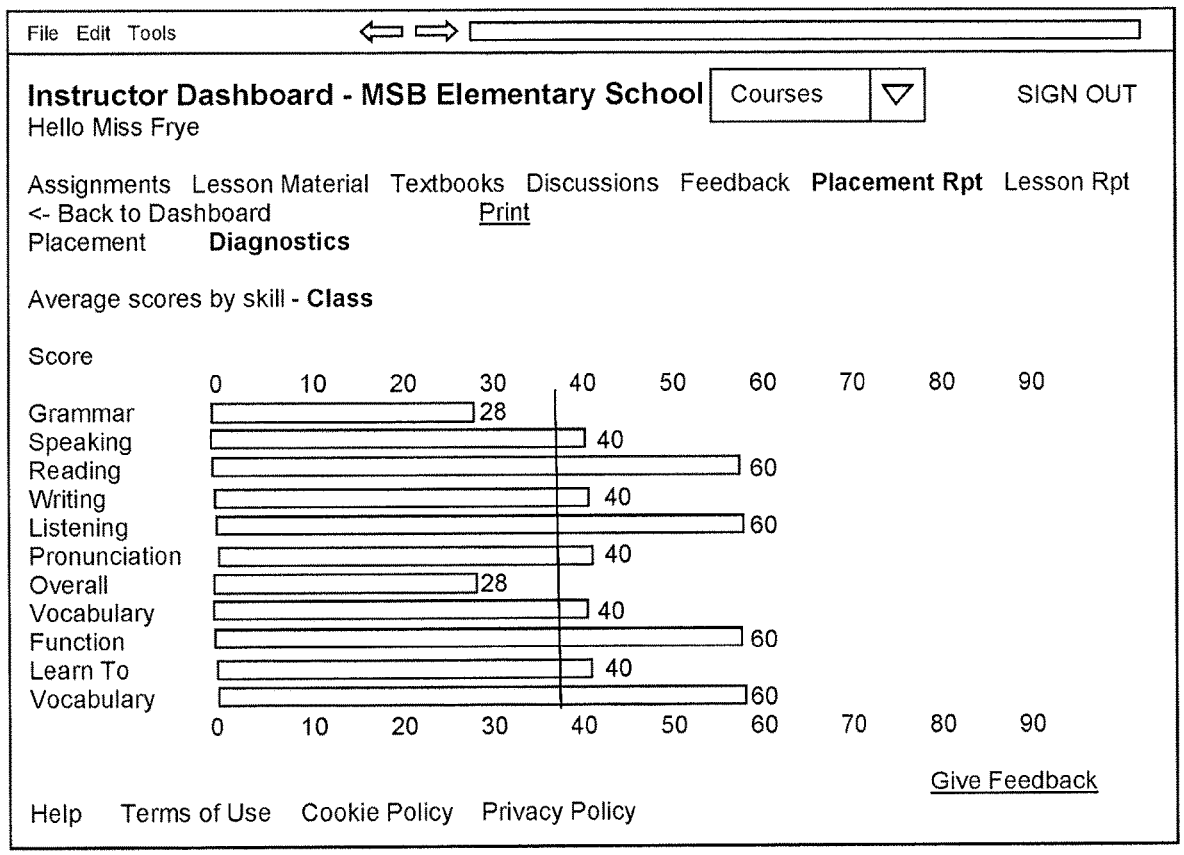
FIG. 13B illustrates a non-limiting example GUI for an instructor using the assessment-based measurable progress learning system.
Figure 13C:
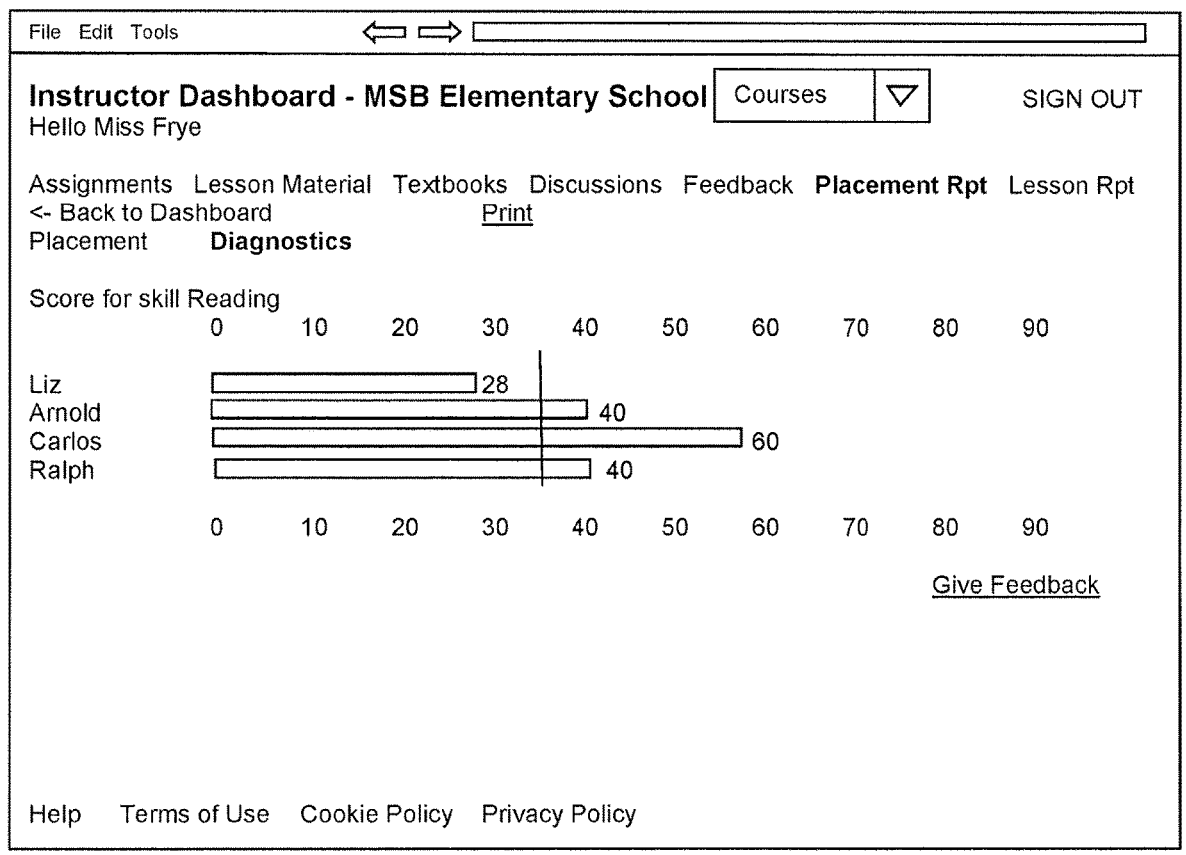
FIG. 13C illustrates a non-limiting example GUI for an instructor using the assessment-based measurable progress learning system.

Turning now to FIGS. 13A-13C, the instructor may determine if a learner is moving forward by capturing the learners' data and information in order to link each learner's progress through the course components to a GSE statement. For example, if a learner is answering a question, the disclosed system may determine whether they're learning certain content that was predesigned in the coursework. When the learner is asked certain questions, and they start responding, this goes into an assessment bank, and as they keep responding on a daily or weekly basis, the system generates information to consolidate the learner information and make better decisions.

In FIG. 13A, the assessment is not the original assessment used to determine the overall dominance of the language, but understanding whether the learners have dominated or learned the specific statements that are inside each of the units in each of the lessons for the class curriculum. In FIG. 13A, the information for each learner is presented, showing how much each learner is advancing for each specific assignment.

In FIG. 13B, more information may be presented, including more information on time spent, etc. However, in FIG. 13B, each of the skills integrated into the lesson for the learner is presented. In FIG. 13B, the entire class may be analyzed according to how the class is doing in grammar, reading, writing, or listening. The instructor may use this or similar information to determine if the learners in the class are actually learning what they are supposed to learn in a certain period of time.

In FIG. 13C, an analysis of the class is presented according to one of the areas analyzed in FIG. 13B. In FIG. 13B, some of the learners have an opportunity for growth and improvement, while some learners do not need these opportunities. The instructor may then have a perspective on knowing which learners may require remedial content, while other learners may be accelerated in the content. The instructor may analyze this information for professional development purposes, and determine how to proceed with the class and specific learners, and how to personalize the class and curriculum accordingly.

The disclosed system may include a full bank of remedial content. This remedial content is developed by skills and additionally, is again aligned to the GSE can do statements that need to be covered. In the example instructor GUI seen in FIG. 14A, the instructor may select from available remedial content, for example, the reading remedial content available on FIG. 14A. As seen in FIG. 14B, the instructor may then define the remedial assignment (or any assignment), and choose the learners that need the remedial content. For opportunities including the whole class, they instructor may select all of the learners, or they can assign specific remedial content for specific students to personalize the assignments for the class and for each learner, and these assignments may be transmitted directly to the learners. The learners may then accomplish the specific objectives defined in the courseware.

Figure 15A:
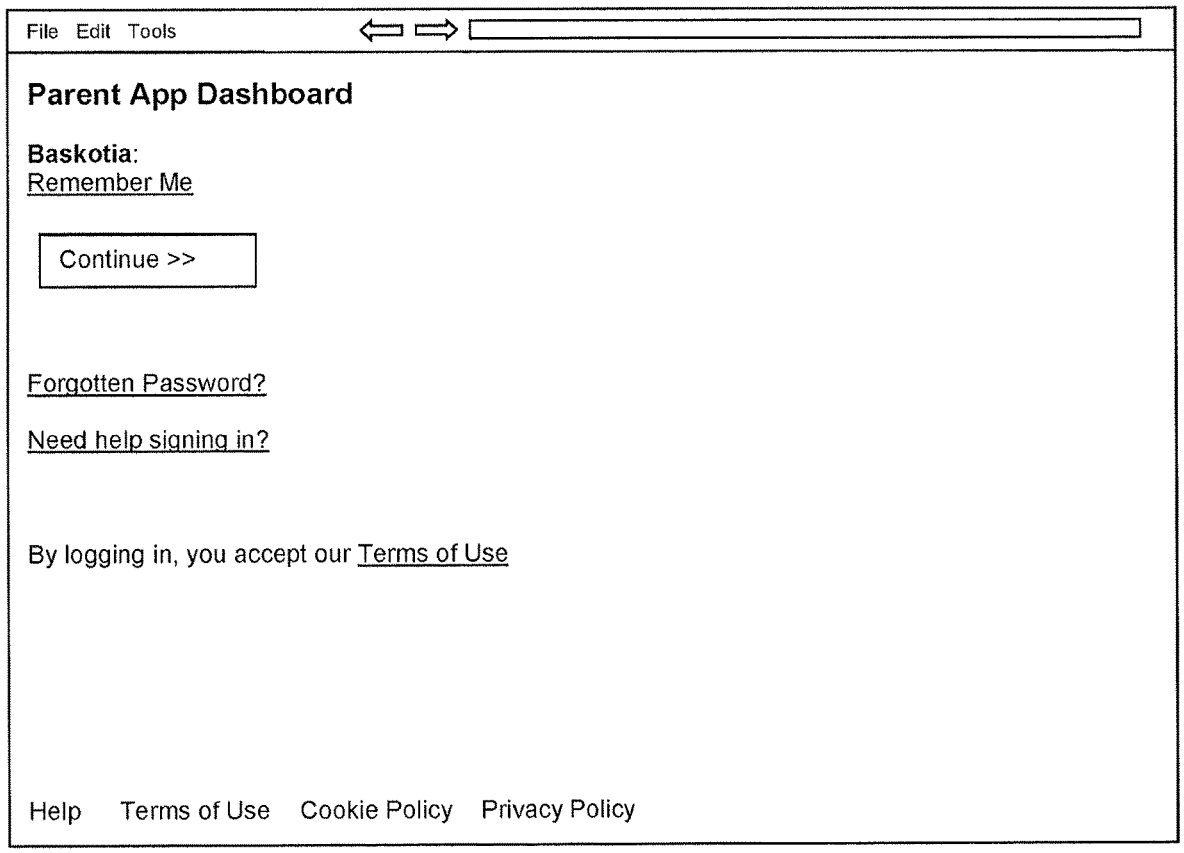
FIG. 15A illustrates a non-limiting example GUI for a parent using the assessment-based measurable progress learning system.
Figure 15B:
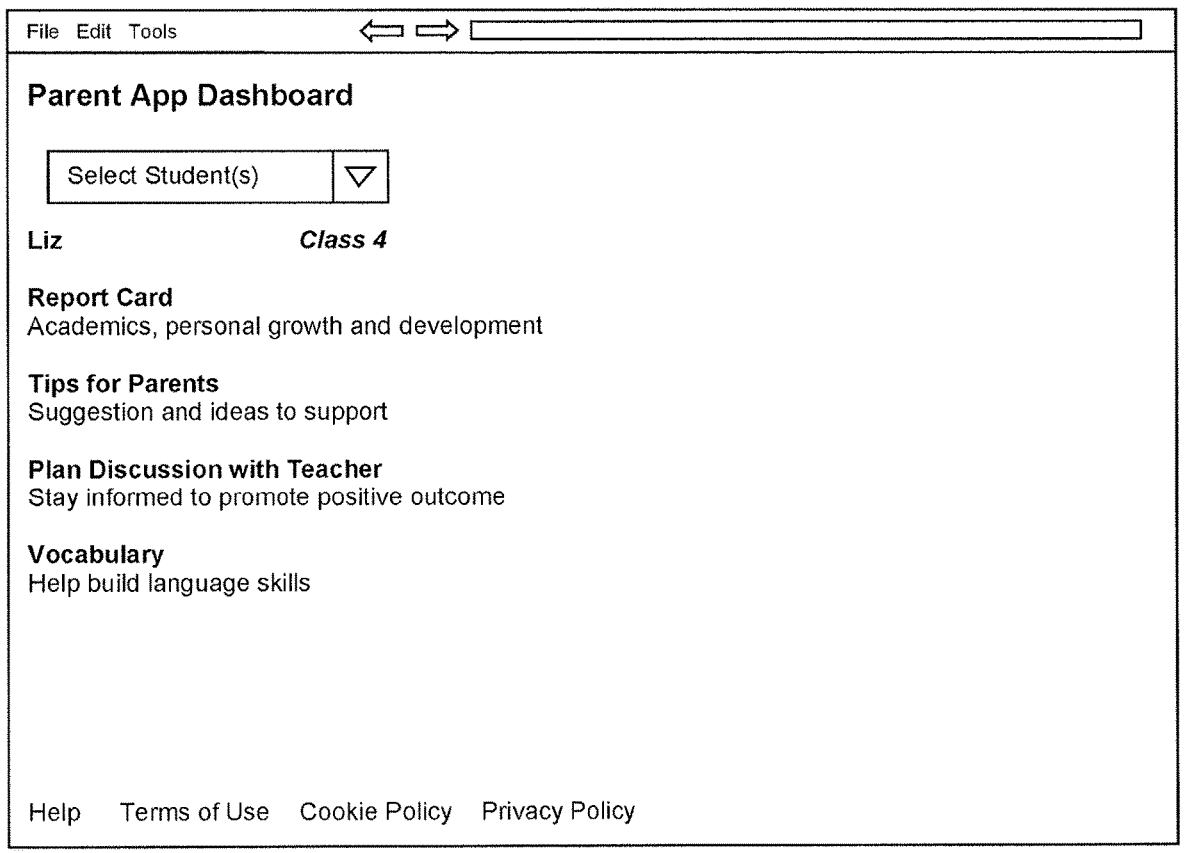
FIG. 15B illustrates a non-limiting example GUI for a parent using the assessment-based measurable progress learning system.
Figure 15C:
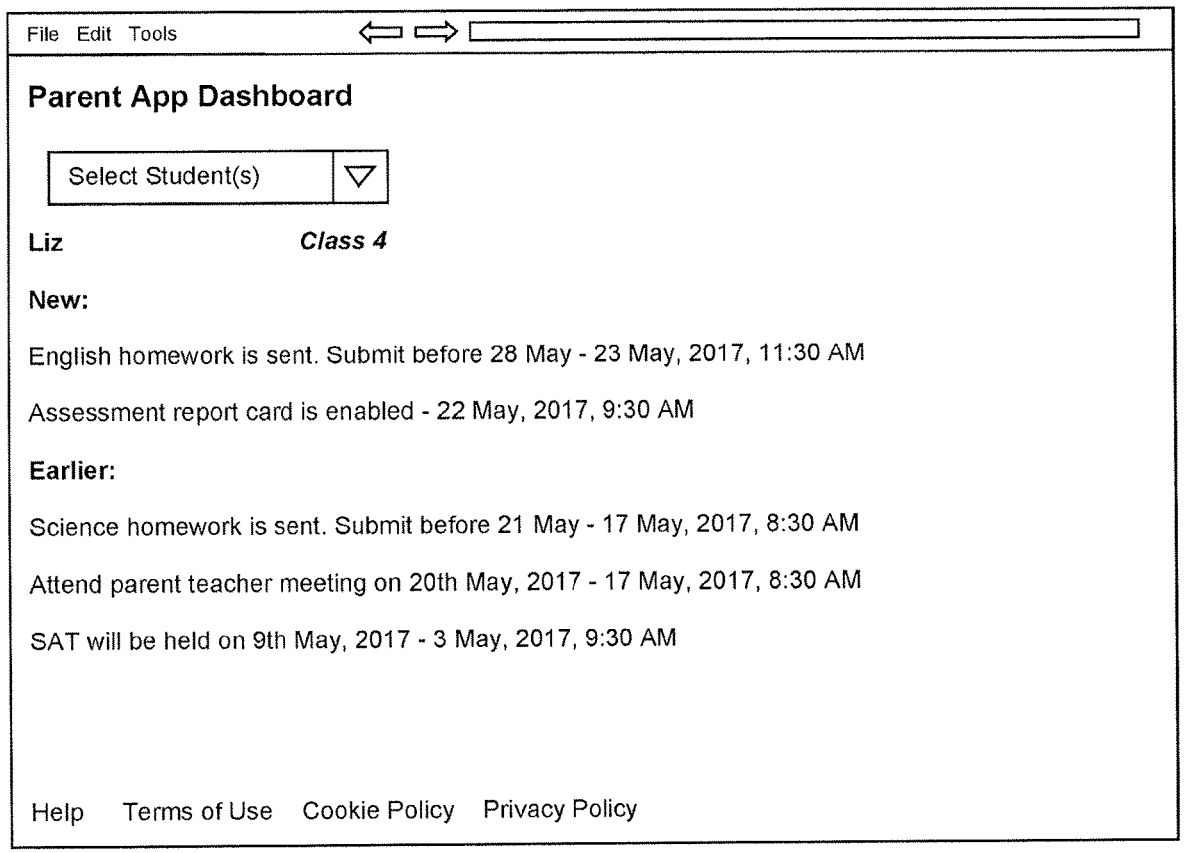
FIG. 15C illustrates a non-limiting example GUI for a parent using the assessment-based measurable progress learning system.

Turning now to FIGS. 15A-15D, the learner's parents may be interested in the learner's progress. These figures may therefore demonstrate some tools that are very relevant for the parents. An application, possibly a mobile application, may be available to parents. In some embodiments, the parent may be able to access and choose information for more than one learner. Once the instructor sends an assignment to the learners, the parent may be alerted to the incoming assignment. For each of the learners available to the parent via the application, the parent may access lists of assignments available, as seen in FIG. 15C, available from a menu view in FIG. 15B.

Figure 15D:
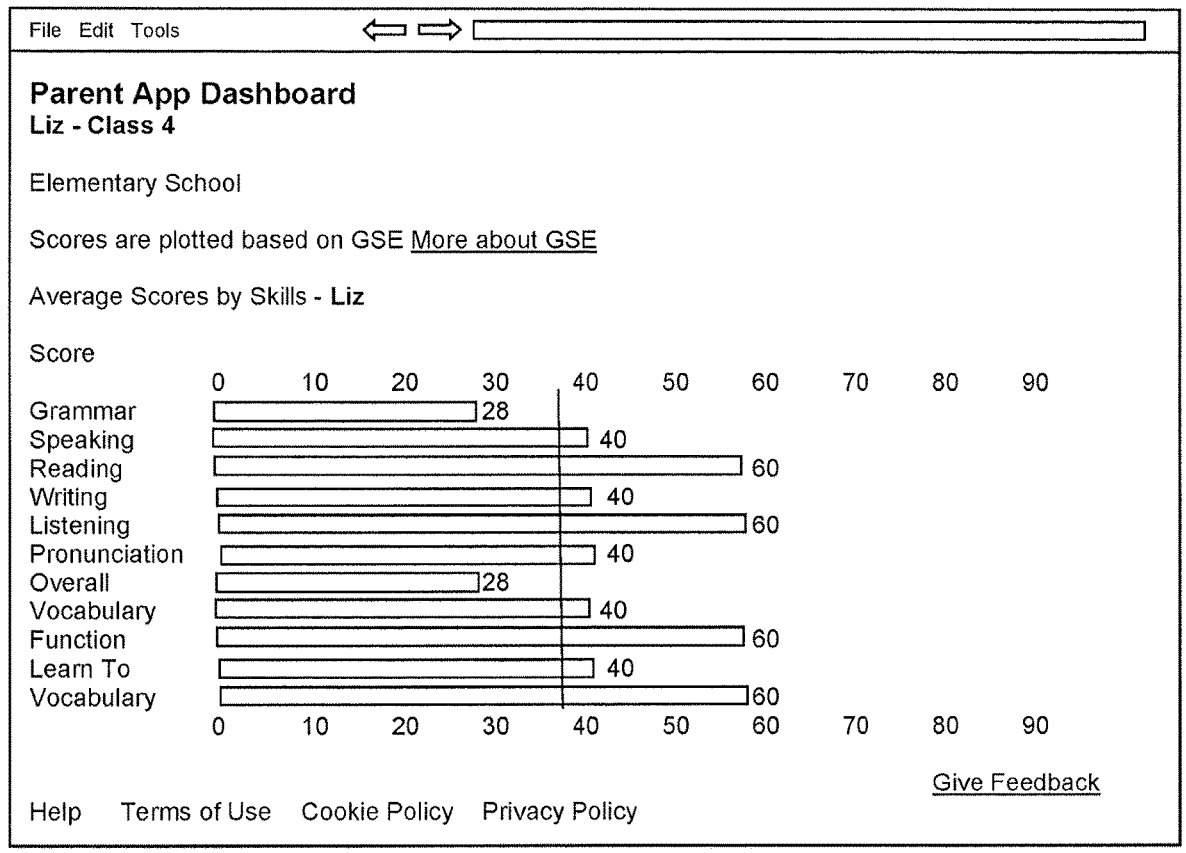
FIG. 15D illustrates a non-limiting example GUI for a parent using the assessment-based measurable progress learning system.
Figure 15F:
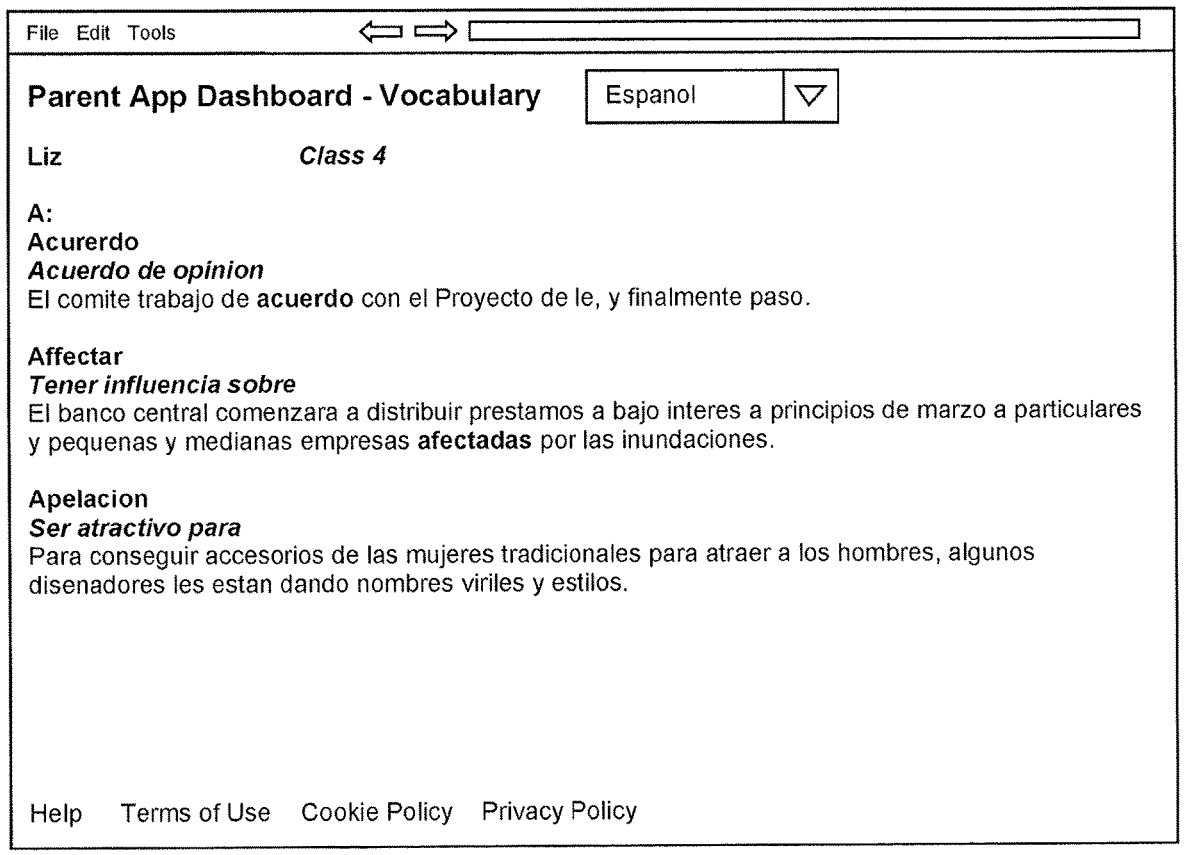
FIG. 15F illustrates a non-limiting example GUI for a parent using the assessment-based measurable progress learning system.

Returning to FIG. 15B, the parent may further access a report card for each learner. As seen in FIG. 15D, the parent may access and view data from the report card, which may reflect how the learner is doing on any of the skills and better understand why their learner is doing certain types of assignments, and not just homework to support the personalized needs of the learner.

Returning to FIG. 15B, the learner's parents may not have English as their native language. The parents may not dominate the English they want their learners to learn, but may want to offer the best possible education in English for their learner. In order to allow parents to help their learners, the parents may have access to a vocabulary for each one of the lessons, which the parent may select in their native language, which helps the parent to develop the context of what is being covered in a specific unit or chapter. The system may automatically translate everything into the parent's selected language. For example in FIGS. 15E and 15F, the system has automatically translated the vocabulary section of the application into Spanish, pursuant to the selection of Spanish by the user. Any other portion of the application could likewise be translated to improve the learning of the learner and parent.

Figure 15G:
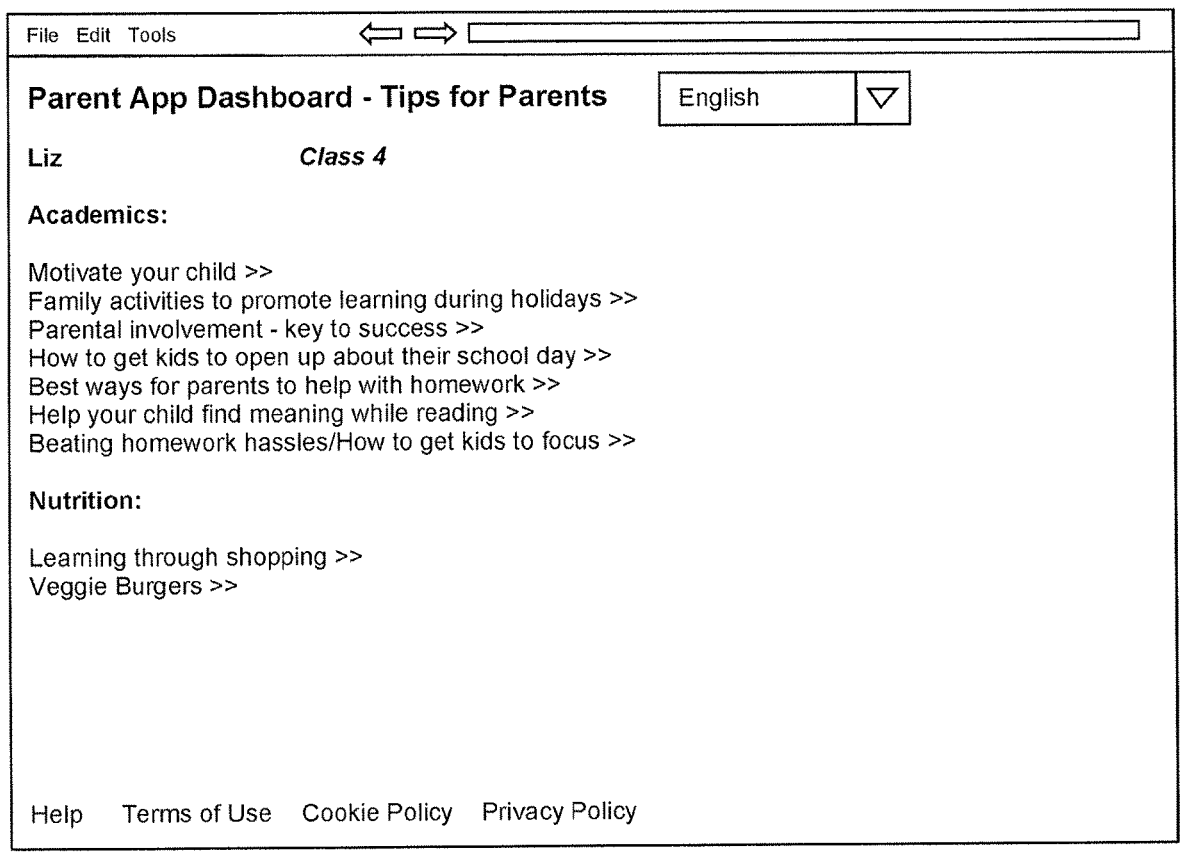
FIG. 15G illustrates a non-limiting example GUI for a parent using the assessment-based measurable progress learning system.

In FIG. 15G, the learner's parent may access a section of the application titled Tips for Parents, which provides advice to parents for better parenting in the learning process of these tools, so there is a series of contents and videos that could be automatically changed into the selected language.

Returning to FIG. 4A, the last persona is the school administrator. The school administrator may use this tool to assess the competitive landscape. The director may view any of the grades individually in relation to the GSE, or may drill down to view details of the school, as seen in FIG. 4A to view teacher or student activities. The school administrator may use this data to determine whether to expand the school or scaling projects.

In various implementations, the present system may be operated to continuously monitor the progress of learners as the learners undertake a series of curriculum activities. The curriculum activities may include a single course or learning activity, for example, that is directed towards the learning of a particular learning objective, which may, in turn, be associated with a particular level of the GSE. Or, alternatively, the curriculum activities may include a larger sequence of courses or activities that cumulative are arranged to teach the learner a particular new skill or set of skills.

As the learner works through the curriculum activities, the learner's proficiency in a particular activity can be evaluated so as to monitor the learner's progress through the activities. In embodiments, a learner's progress may be evaluated by an automated system configured to evaluate the learner's responses to a series of questions associated with those activities by comparing those responses to expected correct answers. Based upon that evaluation, the learner can be allocated a score indicative of the learner's performance on that activity. Typically, the score may be expressed as a percentage indicative of the percentage of questions that were correctly answered by the learner for a particular activity.

In a particular class of learners, it is likely that some learners are performing better than others. In fact, within a typical class, some learners are likely to be struggling with the course materials, while other learners may be excelling. For students that are struggling, it may be advantageous for those students to undertake additional remediation curriculum activities so as to have additional practice with and exposure to the materials with which the learner is struggling. Such remediation activities may operate to reinforce particular concepts or skills that were found in the original curriculum activities and provide the learner with an opportunity for additional practice and study. By undertaking such remediation activities, the struggling learner can raise his or her performance or level of proficiency with certain materials so as to achieve a satisfactory level of mastery of the materials. This additional exposure and practice can operate to help prevent the struggling learners from falling behind the remainder of the class, which may further compound the difficulties experienced by the struggling learner.

In a somewhat similar fashion, learners that demonstrate mastery of a particular curriculum activity with wish to undertake additional related curriculum activities so as to extend their mastery of that activity. Such "stretch" or enhancement activities may operate to extend the learner's knowledge or mastery of the subject that is the focused of the activity with which the learner demonstrated mastery. Typically, these enhancement activities would not be particularly helpful for learners that are already struggling with the initial curriculum activity and so would only be offered to or presented to learners who, through having a sufficiently high score, demonstrated mastery of the materials.

On any particular curriculum activity, a class may have a number of students that are struggling, a number of students who demonstrated satisfactory performance, and a number of students who are excelling. The present system provides a user interface enabling an instructor to automatically identify students that fall within the various groups (struggling, satisfactory, and excelling) and to modify the lesson plans associated with each learner to assign struggling learners remediation activities, excelling learners enhancement activities, and to optionally assign the satisfactory learners either remediation or enhancement activities according to the instructor's judgment.

Figure 16:
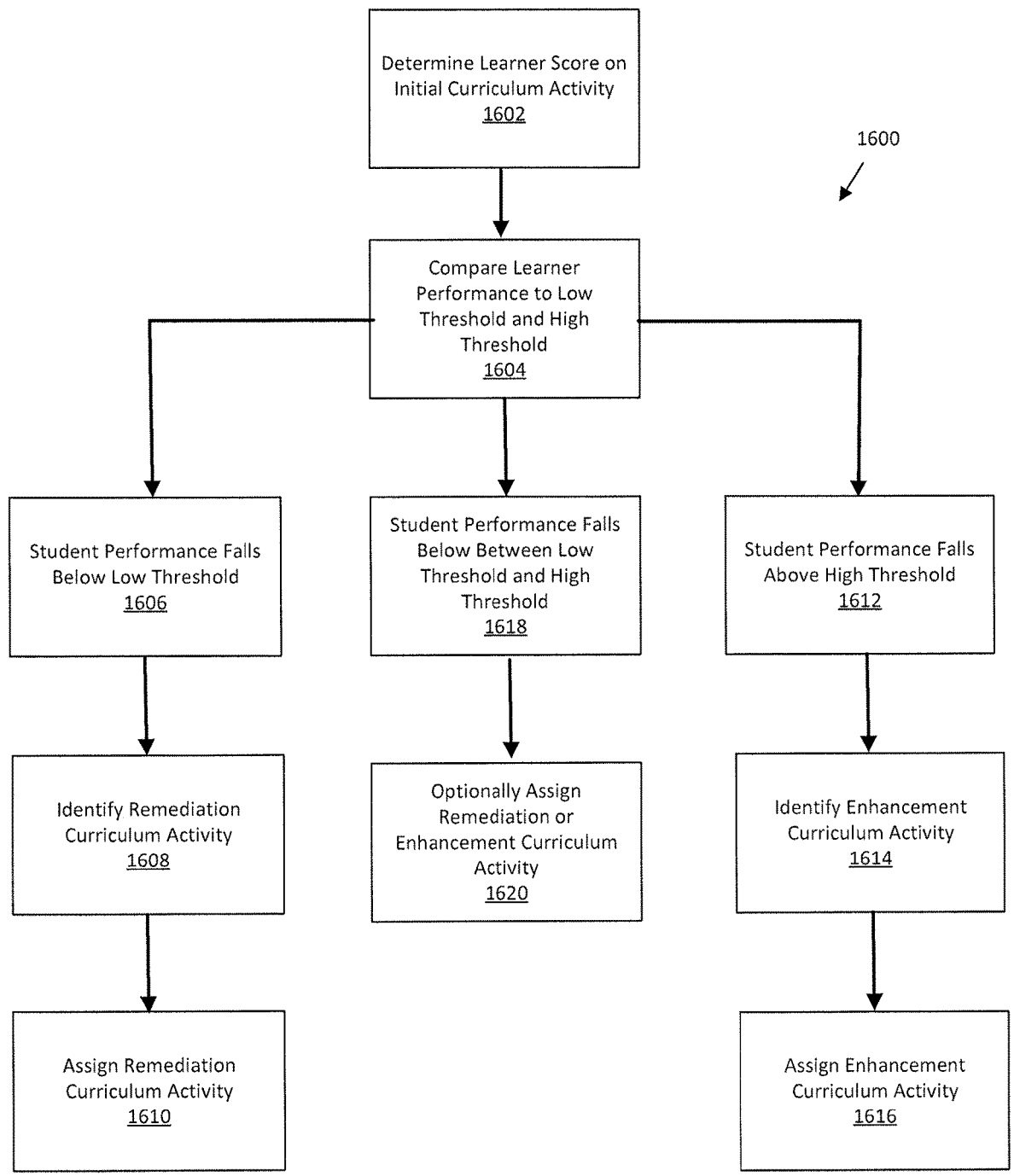
FIG. 16 is a flowchart depicting a method implemented by the present system to automatically evaluate learners and to modify lesson plans of the learners to incorporate remediation or enhancement curriculum activities as necessary.

FIG. 16 is a flowchart depicting a method 1600 implemented by the present system to automatically evaluate learners and to modify lesson plans of the learners to incorporate remediation or enhancement curriculum activities as necessary. Typically method 1600 is implemented by a system (e.g., the system of FIG. 3A) to, as needed, assign remediation or enhancement activities for a number of learners that may belong to a particular class. Method 1600 as illustrated in FIG. 16 depicts an appropriate logical flow for the assignment of a remediation or enhancement curriculum activity to a single learner. But it should be understood that in a class environment, in which a class includes a number of different learners, method 1600 may be executed iteratively for each learner in the class, so as to potentially assign supplemental curriculum activities to each learner within a class environment.

In step 1602 the performance of a learner is evaluated for a current or initial curriculum activity. As discussed, the curriculum activity may include prompting the learner to respond to a number of questions. The learner's responses to the prompted questions can then be evaluated—potentially automatically—to generate a score for that activity. Typically the score is a numerical value (e.g., a percentage) that can be compared with various thresholds to determine whether the learner performed satisfactorily on the activity.

For example, FIG. 17A depicts an example user interface that an instructor may use to evaluate learner performance on a current or initial curriculum activity. The interface includes a listing of current learners 1702 that have undertaken the current activity, as well as a listing of scores 1704 for each learner. In this example, the scores are expressed as percentage scores for the learners.

Returning to FIG. 16, in step 1604 the learner's score for the initial curriculum activity is compared to a number of different thresholds to determine whether the learner has struggled with the activity and requires remediation, whether the learner has performed satisfactorily, or whether the learner has performed strongly and should be assigned an enhancement activity.

In embodiments where the learner's performance is expressed as a numerical value, the thresholds may also be expressed numerically. For example, where activity performance is scored using a percentage value, the thresholds may also be percentages. In some embodiments of the present system, the thresholds may be fixed, so that any scored under a lower threshold (e.g., 20%, 30%, 40%, or % 50) indicates that a student achieving the score should be assigned a remediation activity and any scored over an upper threshold (e.g., 70%, 80%, or 90%) indicates that a student achieving the score should be assigned an enhancement activity. Scores falling between the lower and upper thresholds may be associated with satisfactory performance on the activity.

The various thresholds may be fixed system-wide so that the same thresholds are used for the evaluation of all scores for all curriculum activities. In some other embodiments, though, the thresholds may be fine-tuned so that different activities are allocated different thresholds. Different thresholds could be allocated, for example, to different subjects or to activities associated with different levels of expertise. In some cases, different thresholds could be established for different teachers, or different learners may be allocated different thresholds. In some cases, instructors may be able to modify or adjust the threshold values, perhaps depending upon their experience with a particular class. If a class is struggling, for example, the lower threshold (which is associated with the assignment of remediation activities) could be raised so that on a given activity, a greater number of learners will likely be assigned remediation curriculum activities.

With thresholds established (either via selection by a particular instructor or by system-wide or course-wide predefined values), the scores achieved by each learner in the class on the initial curriculum activity are compared to the thresholds to determine whether each learner requires additional remediation or enhancement activities.

Referring to FIG. 16, therefore, if the learner's initial score falls below the lower threshold (step 1606), the learner will be assigned a remediation curriculum activity. Accordingly, in step 1608 a suitable remediation curriculum activity is identified. Typically, the remediation curriculum activity is associated with a particular learning object that is the same as the learning objective associated with the initial curriculum activity. For example, if the initial curriculum activity is focused on a learning objective of learning grammar, the learning objective of the remediation curriculum activity is the same.

In an embodiment, each curriculum activity implemented by the present system will be associated with a particular remediation curriculum activity. The association could be defined in a look-up table, such as Table 1, below, stored in a suitable system memory, such as in storage subsystem 210 of system 200.

TABLE 1

| Initial (Core) Curriculum Activity | Remediation Curriculum Activity | Enhancement Curriculum Activity |
|---|---|---|
| Grammar 1.1 | Grammar 1.1 - Remediation | Grammar 1.1 - Enhancement |
| Learning objective - Using want to/wants to with all persons sing | Learning objective - same as 'core' activity | Learning objective - same as 'core' activity |
| Activity type Fill in the blank by typing the correct form of want/wants to based on visual prompts | Activity type Choose the correct form of want/wants to in given sentences, based on visual prompts | Activity type Create full sentences with want/wants to by dragging and dropping words in the correct |

Having identified the remediation curriculum activity in step 1608, in step 1610 the remediation curriculum activity is assigned to the learner. This may involve the system modifying the learner's lesson plan, which sets forth a series of curriculum activities to be undertaken by the learner, to include the remediation curriculum activity. With the assignment executed, the remediation curriculum activity is scheduled so that the learner must complete the activity by a particular due date specified by the instructor.

Referring to FIG. 16, steps 1606, 1608, and 1610 may be executed for each learner within a class whose performance on the initial curriculum activity fell below the lower threshold. By executing the steps for each learner simultaneous, multiple learners may be assigned a remediation curriculum activity simultaneously.

Accordingly, with reference to FIG. 17A, the system, having determined that a number of learners 1702 received scores on the initial curriculum activity that fell below the lower threshold (indicating that the learners should be assigned a remediation activity), the user interface generates a notification 1706 indicating that at least one student may require a remediation activity. Notification 1706 further identifies the number 1708 of students that require the remediation activity.

Figure 17B:
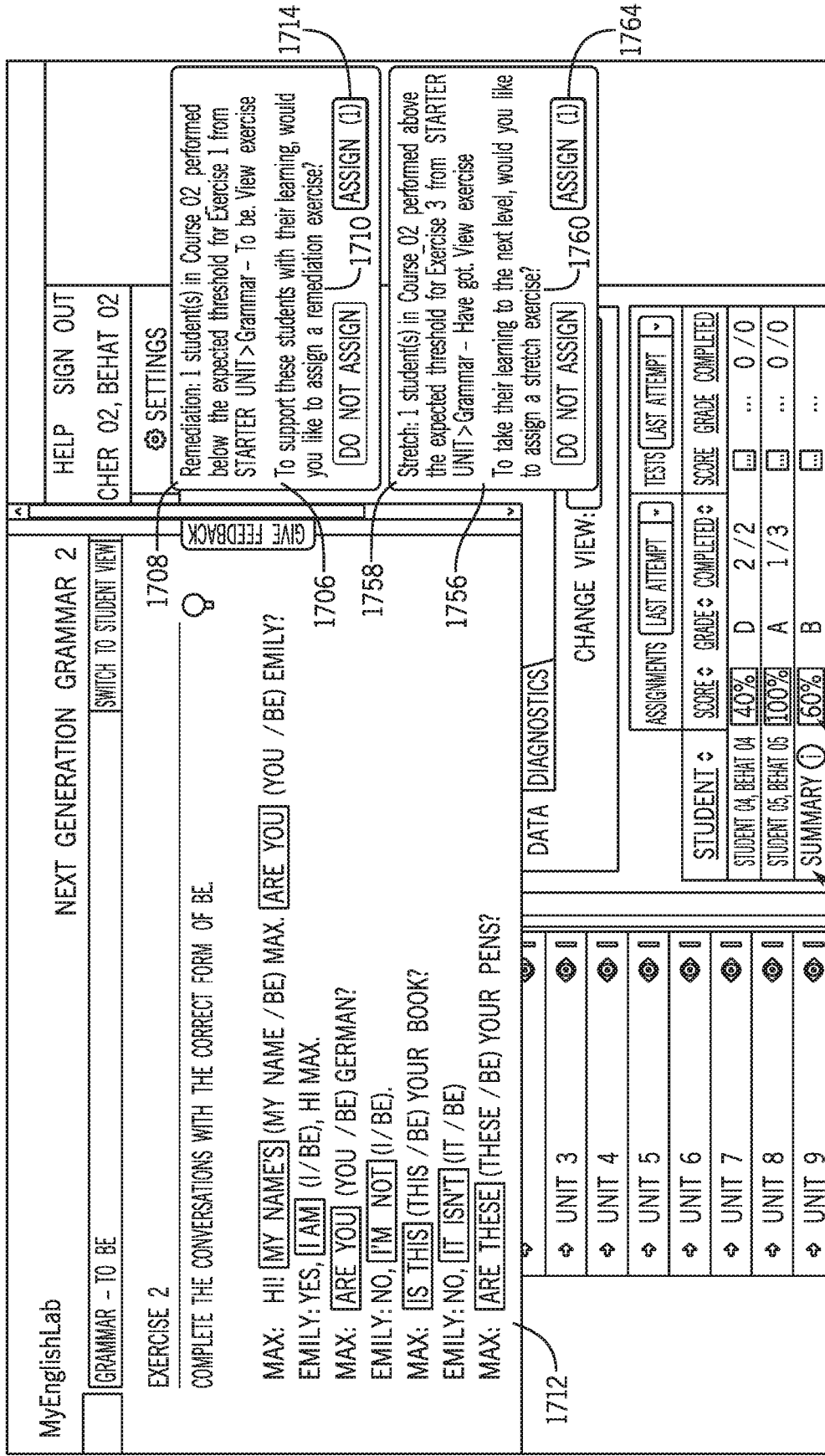

To assist the instructor in determining how to assign the remediation curriculum activity, notification 1706 includes a link 1710 that, when executed, will pop-up a window depicting the remediation curriculum activity. For example, FIG. 17B depicts the user interface of FIG. 17A after the instructor has activated link 1710. As shown in FIG. 17B, window 1712 has popped up depicting the content of the remediation curriculum activity. As described above, the remediation curriculum activity for the initial curriculum activity may be identified in a look-up table, such as Table 1 above.

Having reviewed the remediation curriculum activity, the instructor may activate button 1714 to assign the remediation curriculum activity to learners that did not score more than the lower threshold (e.g., as determined in step 1606 of method 1600).

Figure 17C:
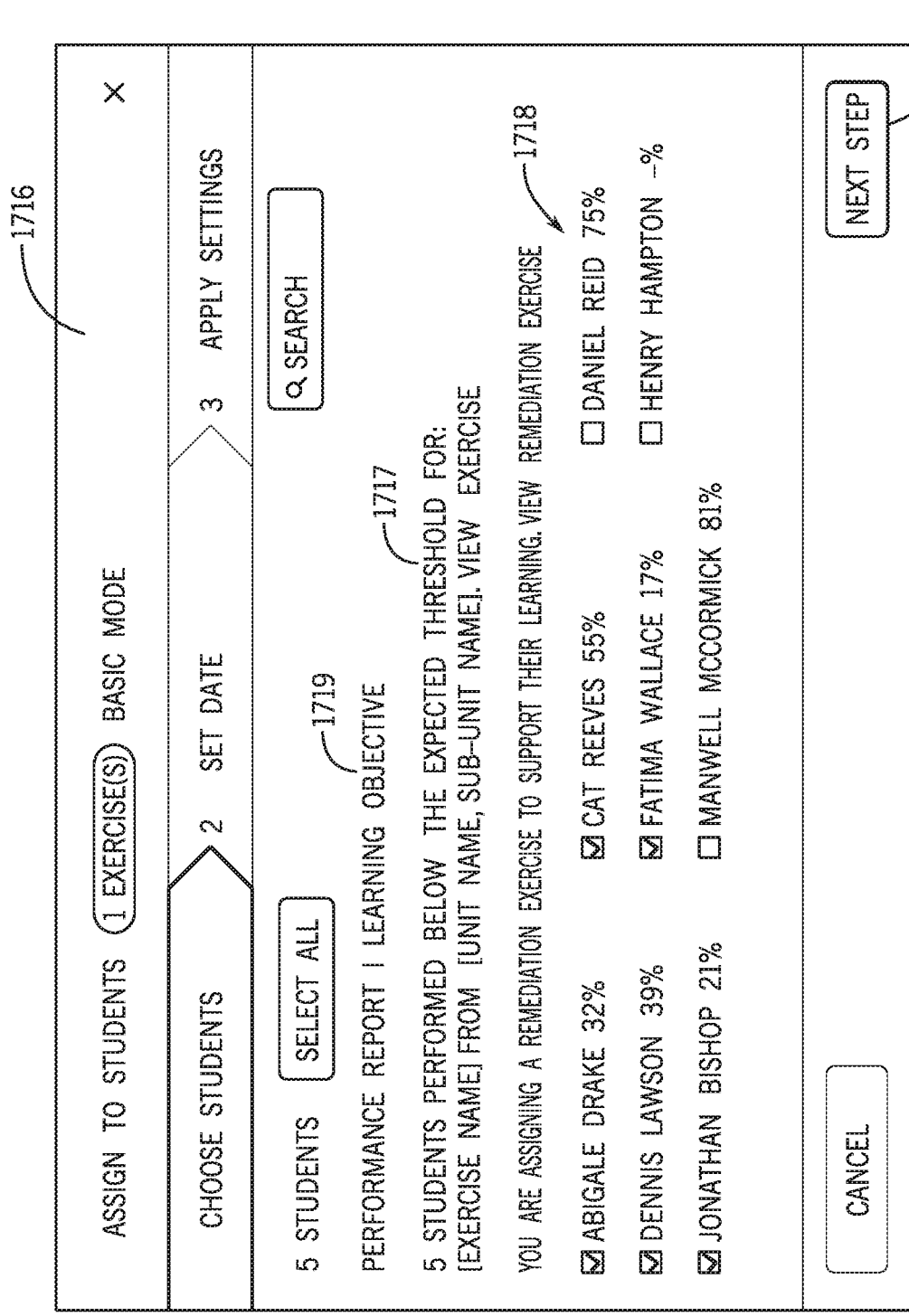

Upon activating button 1714, the user interface opens a window enabling the remediation curriculum activity to be assigned to various learners. An example of such a window is depicted in FIG. 17C. Window 1716 includes a description 1717 of the class performance and a summary of the number of students that did not meet the lower threshold for performance of the initial curriculum activity and may require the remediation curriculum activity. Link 1719, when activated, causes a message to be displayed within window 1716 summarizing the learning objective associated with the remediation curriculum activity currently being assigned.

Window 1716 includes a listing of learners 1718 associated with the current class. Window 1716 also includes, for each learner 1718, an indication of their score on the initial curriculum activity (e.g., as determined in step 1602 of method 1600). Blank scores indicated that the user has not taken the initial curriculum activity. When window 1716 is first loaded by the system, learners with scores that fall below the lower threshold are automatically selected (via the checkbox user interface) for assignment of the remediation curriculum activity. As depicted, the instructor can select the checkbox next to various learners whose scores did not fall below the lower threshold to add those learners to the group of learners that will be assigned the remediation curriculum activity. With the group of learners selected (via their respective checkboxes) to receive the remediation curriculum activity the instructor selects button 1720 to initiate the assignment process.

Figure 17D:
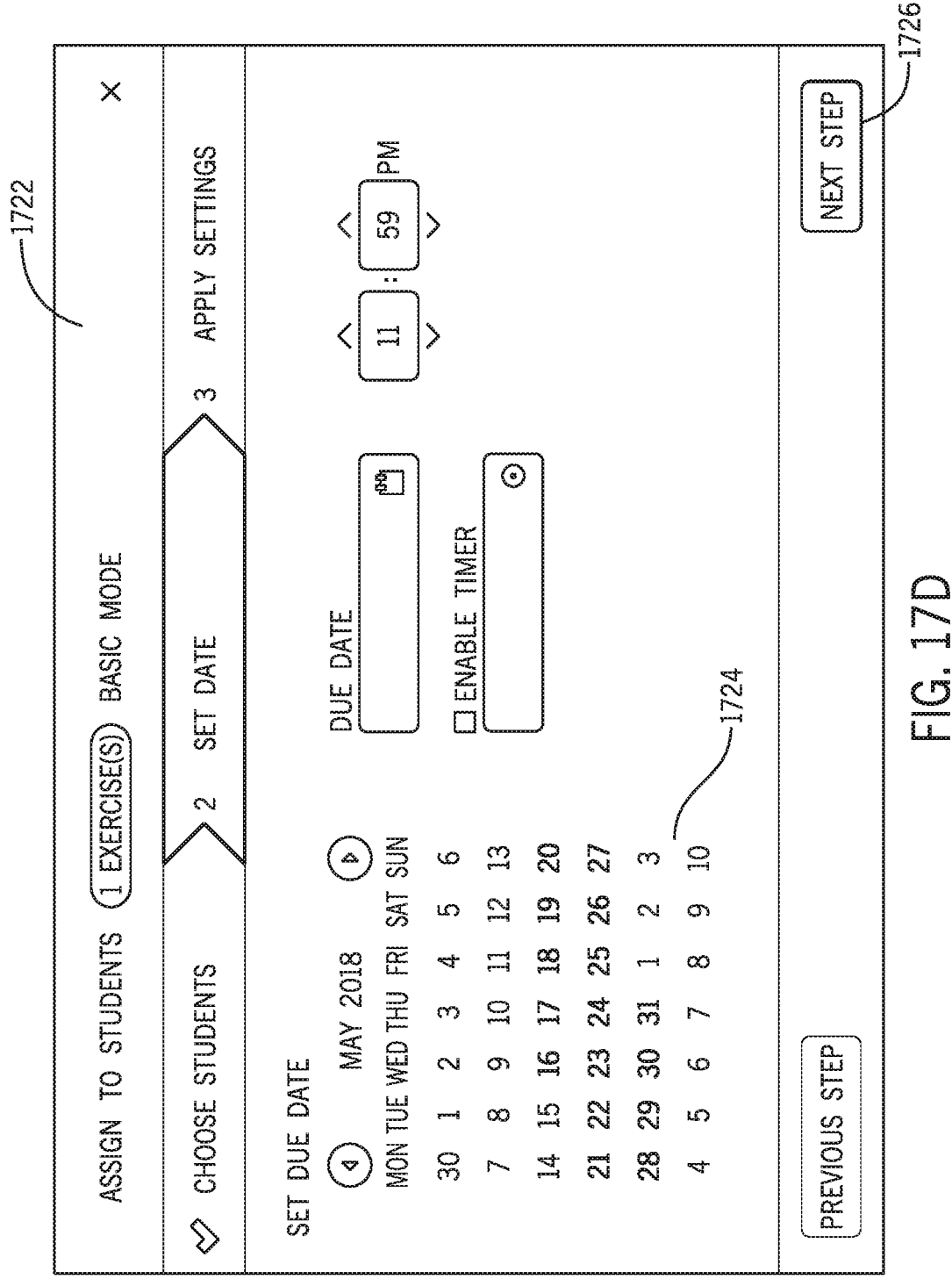

Upon selecting button 1720, the system outputs a new window, as depicted in FIG. 17D enabling the instructor to schedule the remediation curriculum activity. Window 1722 enables the instructor to select a due date and, optionally, a time at which the activity is due on the due date for the remediation curriculum activity via interface element 1724. Having selected a due date, the instructor activates button 1726 to continue the assignment process.

Figure 17E:
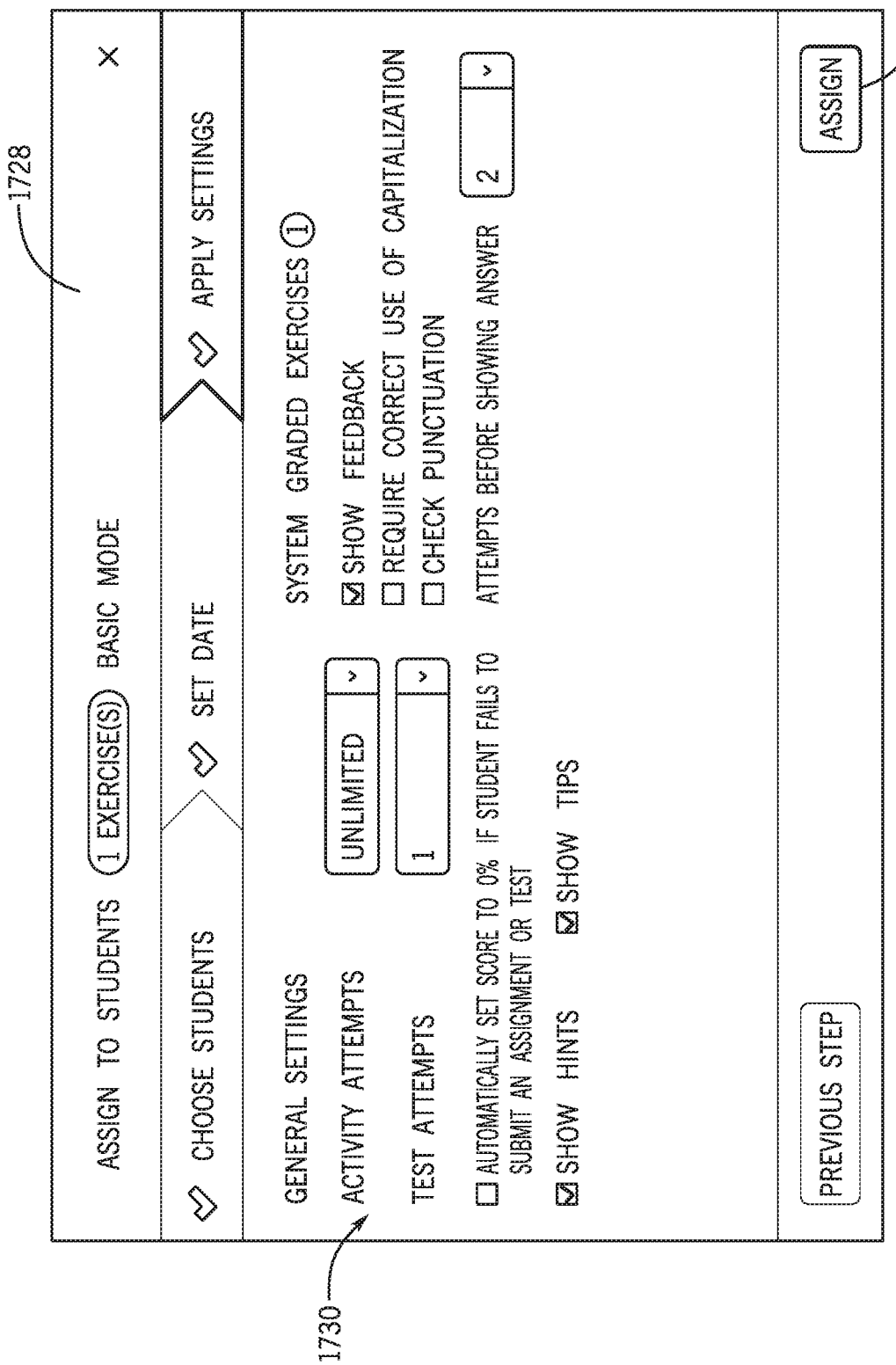

Upon selecting button 1726, the system outputs a new window, as depicted in FIG. 17E enabling the instructor to designate settings associated with the remediation curriculum activity and complete the assignment process. Within window 1728 user interface element 1730 allows the instructor to set limits on the number of the time the remediation curriculum activity can be attempted. Controls regarding how hints are displayed and when correct answers are provided to the learner undertaking the remediation curriculum activity can also be specified.

The remediation curriculum activity assignment is completed by the instructor activating button 1732. Upon activating button 1732, the system modifies the lessons plans associated with each learner selected in interface 1718 to include the remediation curriculum activity with the associated due date and settings specified by the instructor. The learners can then undertake the remediation curriculum activity, with the results being displayed to the instructor via the original user interface of FIG. 17A. This enables the instructor to review the learner's performance on the remediation curriculum activity.

Returning to FIG. 16 and method 1600, if the learner's initial score falls above the upper threshold (step 1612), the learner can be assigned an enhancement curriculum activity. Accordingly, in step 1614 a suitable enhancement curriculum activity is identified. Typically, the enhancement curriculum activity is associated with a particular learning object that is the same as the learning object associated with the initial curriculum activity. For example, if the initial curriculum activity is focused on a learning objective of learning grammar, the learning objective of the enhancement curriculum activity is the same.

In an embodiment, each curriculum activity implemented by the present system will be associated with a particular enhancement curriculum activity. The association could be defined in a look-up table, such as Table 1, above, stored in a suitable system memory, such as in storage subsystem 210 of system 200.

Having identified the enhancement curriculum activity in step 1614, in step 1616 the enhancement curriculum activity is assigned to the learner. This may involve the system modifying the learner's lesson plan, which sets forth a series of curriculum activities to be undertaken by the learner, to include the enhancement curriculum activity. With the assignment, the enhancement curriculum activity is scheduled so that the learner must complete the activity by a particular due date specified by the instructor.

Referring to FIG. 16, steps 1612, 1614, and 1616 may be executed for each learner within a class whose performance on the initial curriculum activity fell above the upper threshold. By executing the steps for each learner simultaneous, multiple learners may be assigned an enhancement curriculum activity simultaneously.

Accordingly, with reference to FIG. 17A, the system, having determined that a number of learners 1702 received scores on the initial curriculum activity that fell above the upper threshold (indicating that the learners should be assigned an enhancement activity), the user interface generates a notification 1756 indicating that at least one student may require an enhancement activity. Notification 1756 further identifies the number 1758 of students that may require the additional activity.

Figure 17F:
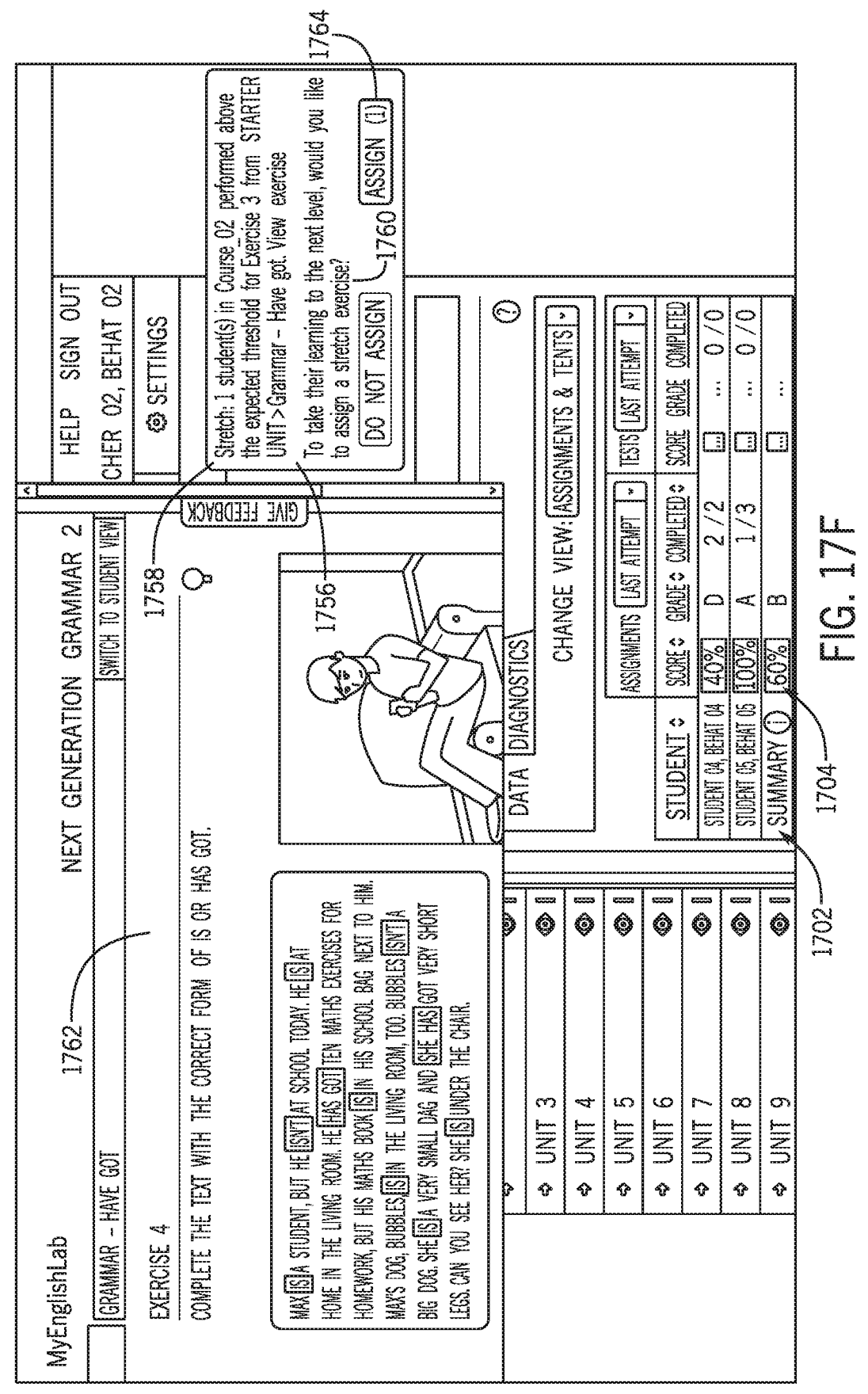

To assist the instructor in determining how to assign the enhancement curriculum activity, notification 1756 includes a link 1760 that, when executed, will pop-up a window depicting the enhancement curriculum activity. For example, FIG. 17F depicts the user interface of FIG. 17A after the instructor has activated link 1760. As shown in FIG. 17F, window 1762 has popped up depicted the content of the enhancement activity. As described above, the enhancement curriculum activity for the initial curriculum activity may be identified in a look-up table, such as Table 1 above.

Having reviewed the enhancement curriculum activity, the instructor may activate button 1764 to assign the enhancement curriculum activity to learners that scored higher than the upper threshold (e.g., as determined in step 1612 of method 1600).

Figure 17G:
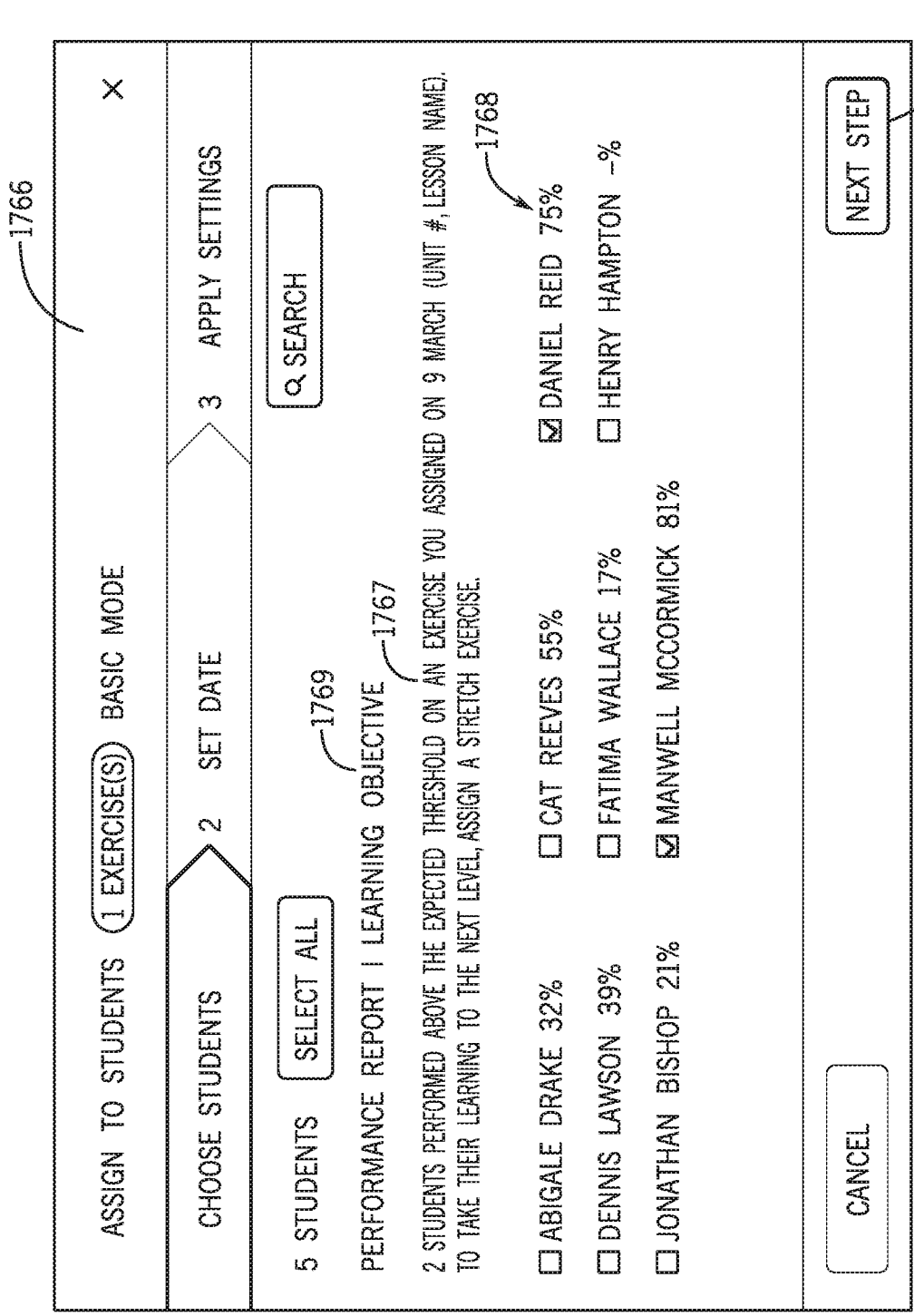

Upon activating button 1764, the user interface opens a window enabling the enhancement curriculum activity to be assigned to various learners. An example of such a window is depicted in FIG. 17G. Window 1616 includes a description 1767 of the class performance and a summary of the number of students that exceeded the upper threshold for performance of the initial curriculum activity and may be provided the enhancement curriculum activity. Link 1769, when activated, causes a message to be displayed within window 1766 summarizing the learning objective associated with the enhancement curriculum activity currently being assigned.

Window 1766 includes a listing of learners 1768 associated with the current class. Window 1766 also includes, for each learner 1768, an indication of their score on the initial curriculum activity (e.g., as determined in step 1602 of method 1600). Blank scores indicated that the learner did not attempt the initial curriculum activity. When window 1766 is first loaded by the system, learners with scores that fall above the upper threshold are automatically selected (via the checkbox user interface). As depicted, the instructor can select the checkbox next to various learners whose scores did not fall above the upper threshold to add those learners to the group of learners that will be assigned the enhancement curriculum activity. With the group of learners selected (via their respective checkboxes) to receive the enhancement curriculum activity the instructor selects button 1770 to initiate the assignment process.

Figure 17H:
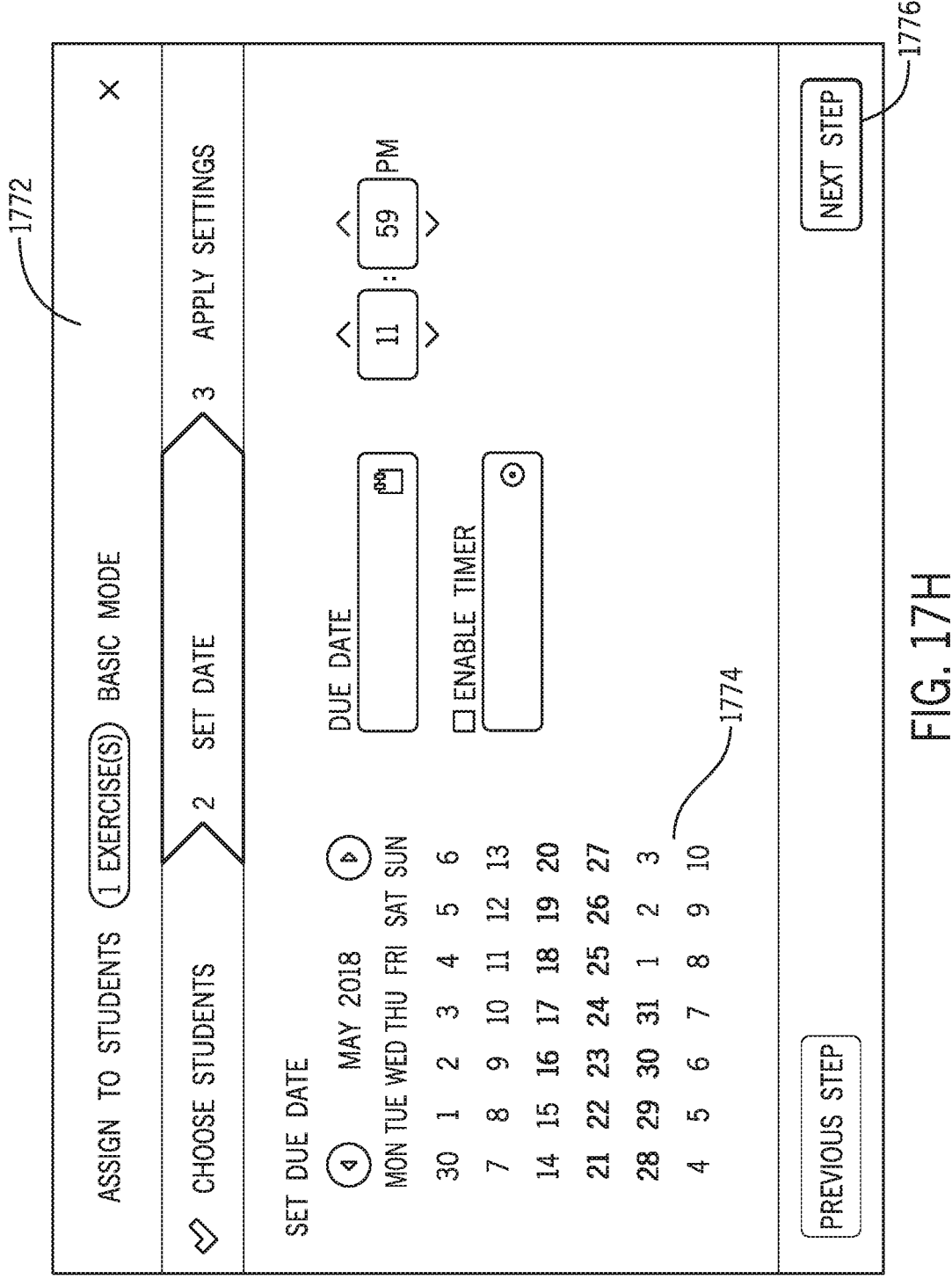

Upon selecting button 1770, the system outputs a new window, as depicted in FIG. 17H enabling the instructor to schedule the enhancement curriculum activity. Window 1772 enables the instructor to select a due date and, optionally, a time at which the activity is due on the due date for the enhancement curriculum activity via interface element 1774. Having selected a due date, the instructor activates button 1776 to continue the assignment process.

Figure 17I:
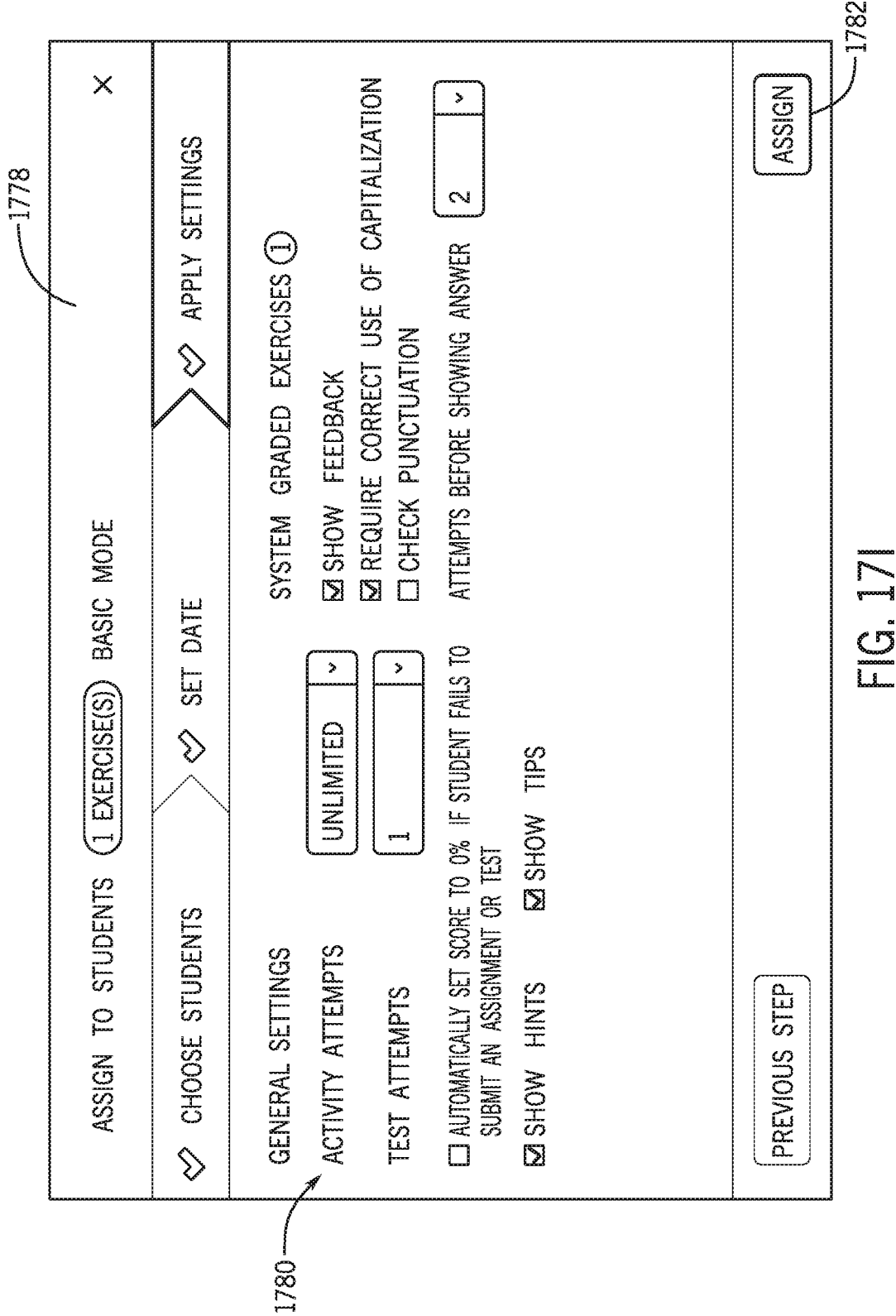

Upon selecting button 1776, the system outputs a new window, as depicted in FIG. 17I enabling the instructor to designate settings associated with the enhancement curriculum activity and complete the assignment process. Within window 1778 user interface element 1780 allows the instructor to set limits on the number of the time the enhancement curriculum activity can be attempted. Controls regarding how hints are displayed and when correct answers are provided to the learner undertaking the enhancement curriculum activity can also be specified.

The enhancement curriculum activity assignment is completed by the instructor activating button 1782. Upon activating button 1782, the system modifies the lessons plans associated with each learner selected in interface 1768 to include the enhancement curriculum activity with the associated due date and settings specified by the instructor. The learners can then undertake the enhancement curriculum activity, with the results being display via the original user interface of FIG. 17A. This enables the instructor to review the learner's performance on the enhancement curriculum activity.

Return to method 1600 depicted in FIG. 16, if the learner's score on the initial curriculum activity fell between the lower threshold and upper threshold (as determined in step 1618), indicating that the learner performed satisfactorily on the initial curriculum activity, the instructor may, in step 1620 arbitrarily assign the learner either a remediation or an enhancement curriculum activity. Step 1620 takes into consideration the potential that an instructor may use his or her judgment to determine that a particular learner may benefit for either remediation or enhancement activities. An instructor can add the remediation or enhancement content for a learner who has performed satisfactorily by selecting the learner in either interface 1728 (to add remediation content to the learner's lesson plan) or interface 1768 (to add enhancement content to the learner's lesson plan).

In an embodiment a method includes determining, by a server hardware computing device coupled to a network and comprising at least one processor executing specific computer-executable instructions within a memory, for each learner in a group of learners, an initial assessment score for an initial curriculum activity and executing, by the server hardware computing device, a query identifying, within a data logic or at least one database record, a lower threshold value and an upper threshold value. The method includes identifying, by the server hardware computing device, a first group of learners, wherein the initial assessment score associated with each learner in the first group of learners is less than the lower threshold value, identifying, by the server hardware computing device, a second group of learners, wherein the initial assessment score associated with each learner in the second group of learners is greater than the upper threshold value, and executing, by the server hardware computing device, a query identifying a remediation curriculum activity associated with the initial curriculum activity. The method includes executing, by the server hardware computing device, a query identifying an enhancement curriculum activity associated with the initial curriculum activity, and encoding, by the server hardware computing device, for display on a client hardware computing device, a graphical user interface including an identification of the first group of learners, an identification of the second group of learners, a first user interface element configured to cause the server hardware computing device to modify lesson plans associated with each learner in the first group of learners to include the remediation curriculum activity, and a second user interface element configured to cause the server hardware computing device to modify lesson plans associated with each learner in the second group of learners to include the enhancement curriculum activity. The method includes transmitting, by the server hardware computing device, the graphical user interface to the client hardware computing device.

In another embodiment, a method includes determining, by a server hardware computing device coupled to a network and comprising at least one processor executing specific computer-executable instructions within a memory, an initial assessment score for an initial curriculum activity for a learner, executing, by the server hardware computing device, a query identifying, within a data logic or at least one database record, a lower threshold value, and responsive to determining that the initial assessment score is less than the lower threshold value executing, by the server hardware computing device, a query identifying a remediation curriculum activity associated with the initial curriculum activity, encoding, by the server hardware computing device, for display on a client hardware computing device, a first graphical user interface including an identification of the learner and a first user interface element configured to cause the server hardware computing device to modify a lesson plan of the learner to include the remediation curriculum activity, and transmitting, by the server hardware computing device, the first graphical user interface to the client hardware computing device.

In another embodiment, a system includes a server hardware computing device coupled to a network and comprising at least one processor executing specific computer-executable instructions within a memory that, when executed, cause the system to determine an initial assessment score for an initial curriculum activity for a learner, identify, within a data logic or at least one database record, a lower threshold value, and responsive to determining that the initial assessment score is less than the lower threshold value identify a remediation curriculum activity associated with the initial curriculum activity, encode for display on a client hardware computing device, a first graphical user interface including an identification of the learner and a first user interface element configured to cause the server hardware computing device to modify a lesson plan of the learner to include the remediation curriculum activity, and transmit the first graphical user interface to the client hardware computing device.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method, comprising:
    executing, by a server comprising a hardware computing device coupled to a network and comprising at least one processor executing instructions within a memory, a first database command selecting a learner profile data record, from within a database coupled to the network, for each learner in a group of learners, each learner profile data record comprising an initial assessment score for an initial curriculum activity associated with a learning objective, the initial curriculum activity being associated with a skill level within a global scale of English (GSE) framework, the GSE framework including a standardized, granular scale measuring at least one proficiency for at least one functional skill and further indicating a stage at which a learning objective associated with the at least one functional skill should be understood by a learner user;
    executing, by the server, at least one software module comprising the instructions to cause the server to:
        identify, within a logic within the instructions or at least one database record, a first threshold value and a second threshold value, defined within the GSE framework, within the logic or the database,
        measure a proficiency of a plurality of tasks and learning objectives including the initial curriculum activity, and
        indicate a stage at which the initial curriculum activity should be understood by a learner, wherein the first threshold value comprises a lower threshold value relative to the second threshold value, and the second threshold value comprises an upper threshold value relative to the first threshold value;
    automatically determining, by the server:
        a first group of learners, wherein the initial assessment score associated within the data record selected for each learner in the first group of learners is less than the lower threshold value, and
        a second group of learners, wherein the initial assessment score associated within the data record selected for each learner in the second group of learners is greater than the upper threshold value;
    executing, by the server:
        a second database command selecting, from within the database, a remediation curriculum activity data record including a set of remediation curriculum activities associated, in the database or the logic, with the initial curriculum activity, and
        a third database command identifying, within the database, an enhancement curriculum activity data record including a set of enhancement curriculum activities associated, in the database or the logic, with the initial curriculum activity;
    generating, by the server, for display on a client device coupled to the network, a graphical user interface (GUI) including:
        a first GUI component displaying the first group of learners, automatically selected, and
        a second GUI component displaying the second group of learners, automatically selected;
    modifying, by the server via the logic within the at least one software module, lesson plans associated with:
        each learner in the first group of learners to include at least one remediation curriculum activity from the set of remediation curriculum activities, and
        each learner in the second group of learners to include at least one enhancement curriculum activity from the set of enhancement curriculum activities,
        wherein a first modified lesson plan, of the lesson plans modified by the server, that is associated with a first learner in the first group of learners includes a different remediation curriculum activity from the set of remediation curriculum activities than a second modified lesson plan, of the lesson plans modified by the server, that is associated with a second learner in the first group of learners;
    activating and providing, by the server, for the first group of learners, a first electronic interactive link configured to provide, when activated, access to the at least one remediation curriculum activity;
    activating and providing, by the server, for the second group of learners, a second electronic interactive link configured to provide, when activated, access to the at least one enhancement curriculum activity corresponding to the upper threshold value;
    in response to detecting interaction with the first electronic interactive link, automatically transmitting, by the server, the at least one remediation curriculum activity to at least one learner included in the first group of learners; and
    in response to detecting interaction with the second electronic interactive link, automatically transmitting, by the server, the at least one enhancement curriculum activity corresponding to the upper threshold value to at least one learner included in the second group of learners.

2. The method of claim 1, further comprising:
receiving, by the server, a first communication including a first date, wherein modifying, by the server, the lesson plans associated with each learner in the first group of learners further includes setting a due date for completion of each of the at least one remediation curriculum activity to the first date; and
receiving, by the server, a second communication including a second date, wherein modifying, by the server, the lesson plans associated with each learner in the second group of learners further includes setting a due date for completion of each of the at least one enhancement curriculum activity to the second date.

3. The method of claim 1, further comprising:
receiving, by the server, a selection of an additional learner; and
responsive to receiving the selection of the additional learner, adding, by the server, the additional learner to:
the first group of learners,
the second group of learners; or
a third group of learners, wherein the initial assessment score associated within the data record selected for each learner in the third group of learners is greater than the lower threshold value and less than the upper threshold value.

4. The method of claim 1,
wherein each of the at least one remediation curriculum activity is associated with the learning objective, and
wherein each of the at least one enhancement curriculum activity is associated with the learning objective.

5. The method of claim 1,
wherein the GUI is operated by an instructor, and
wherein the method further comprises:
receiving, by the server, the lower threshold value and the upper threshold value from the GUI.

6. A method, comprising:
executing, by a server comprising a hardware computing device coupled to a network and comprising at least one processor executing instructions within a memory, a first database command selecting a set of learner profile data records, from within a database coupled to the network, each learner profile data record comprising an initial assessment score for an initial curriculum activity for a first learner associated with a learning objective, the initial curriculum activity being associated with a skill level within a GSE framework, the GSE framework including a standardized, granular scale measuring at least one proficiency for at least one functional skill and further indicating a stage at which a learning objective associated with the at least one functional skill should be understood by a learner user;
executing, by the server, at least one software module to cause the server to identify, within a logic within the instructions or at least one database record, a first threshold value, defined within the GSE framework, within the logic or the database, wherein the first threshold value comprises a lower threshold value relative to an upper threshold value, defined within the GSE framework, within the logic or the database, wherein the upper threshold value and the lower threshold value correspond to the initial curriculum activity; and
responsive to a determination, by the logic, that the initial assessment score is less than the lower threshold value:
executing, by the server, a second database command selecting, from within the database, a remediation curriculum activity data record including a set of remediation curriculum activities, wherein each remediation curriculum activity is associated, in the logic or the database, with the initial curriculum activity,
generating, by the server, for display on a client device coupled to the network, a first graphical user interface (GUI) including a first GUI component displaying a first group of learners, automatically selected and including the first learner, and
modifying, by the server via the logic within the at least one software module, lesson plans for each learner included in the first group of learners to include at least one remediation curriculum activity from the set of remediation curriculum activities,
wherein a first modified lesson plan, of the lesson plans modified by the server, that is associated with the first learner includes a first remediation curriculum activity from the set of remediation curriculum activities, the first remediation curriculum activity is different than a second remediation curriculum activity included in a second modified lesson plan, of the lesson plans modified by the server, that is associated with a second learner in the first group of learners;
activating and providing, by the server, for the first learner of the first group of learners, a first electronic interactive link configured to provide the first learner, when activated, access to the first remediation curriculum activity from the set of remediation curriculum activities;
activating and providing, by the server, for the second learner of the first group of learners, a second electronic interactive link configured to provide the second learner, when activated, access to the second remediation curriculum activity from the set of remediation curriculum activities;
in response to detecting interaction with the first electronic interactive link, automatically transmitting, by the server, the first remediation curriculum activity to the first learner of the first group of learners; and
in response to detecting interaction with the second electronic interactive link, automatically transmitting, by the server, the second remediation curriculum activity to the second learner of the first group of learners.

7. The method of claim 6,
wherein executing the at least one software module further comprises:
identifying a second threshold value distinct from the first threshold value, the second threshold value comprising the upper threshold value,
wherein the method further comprises:
responsive to a determination, by the logic, that the initial assessment score is greater than the upper threshold value:
executing, by the server, a third database command selecting, from within the database, an enhancement curriculum activity data record including a set of enhancement curriculum activities, wherein each enhancement curriculum activity is associated, in the logic or the database, with the initial curriculum activity,
generating, by the server, for display on the client device, a second GUI including a second GUI component displaying a second group of learners, automatically selected and including a third learner, and executing, by the server, the logic within the at least one software module, wherein, when executed, the logic is configured to modify the lesson plan of the third learner to include at least one enhancement curriculum activity from the set of enhancement curriculum activities, wherein the modified lesson plan, of the lesson plans modified by the server, that is associated with the third learner includes a different enhancement curriculum activity from the set of enhancement curriculum activities than another modified lesson plan, of the lesson plans modified by the server, that is associated with another learner included in the second group of learners.

8. The method of claim 7,
wherein each of the at least one remediation curriculum activity is associated with the learning objective, and
wherein each of the at least one enhancement curriculum activity is associated with the learning objective.

9. The method of claim 6, further comprising:
receiving, by the server, a first communication including a first date,
wherein modifying, by the server, the lesson plan of the first learner further includes setting a due date for completion of each of the first remediation curriculum activity to the first date.

10. The method of claim 6, further comprising:
receiving, by the server, a selection of a fourth learner; and
responsive to receiving the selection of the fourth learner, modifying a fourth lesson plan of the fourth learner to include the at least one remediation curriculum activity.

11. The method of claim 6,
wherein the first GUI is operated by an instructor, and
wherein the method further comprises:
receiving, by the server, the lower threshold value from the first GUI.

12. The method of claim 8,
wherein the GSE framework includes standardized, granular scale, measuring at least one English language proficiency in each of listening, reading, speaking and writing functional skills.

13. A system comprising:
a server comprising a hardware computing device coupled to a network and comprising at least one processor executing instructions within a memory that, when executed, cause the system to:
determine a learner profile data record, from within a database coupled to the network, each learner profile data record comprising an initial assessment score for an initial curriculum activity for a learner associated with a learning objective, the initial curriculum activity being associated with a skill level within a GSE framework, the GSE framework including a standardized, granular scale;
identify a first threshold value defined within the GSE framework, wherein the first threshold value comprises a lower threshold value relative to an upper threshold value, defined within the GSE framework, within a logic or the database, wherein the upper threshold value and the lower threshold value are configured to provide for:
measuring a proficiency of a plurality of tasks and learning objectives including the initial curriculum activity, and indicating a stage at which the initial curriculum activity should be understood by the learner;
responsive to a determination that the initial assessment score is less than the lower threshold value:
determine a remediation curriculum activity data record including a set of remediation curriculum activities associated, in the logic or the database, with the initial curriculum activity,
generate, for display on a client device coupled to the network, a first graphical user interface (GUI) including a first GUI component displaying a first group of learners, automatically selected and including the learner, and
modify a lesson plan of the learner to include at least one remediation curriculum activity from the set of remediation curriculum activities,
wherein the modified lesson plan, of the lesson plans modified by the server, that is associated with the learner includes a different remediation curriculum activity from the set of remediation curriculum activities than another modified lesson plan, of the lesson plans modified by the server, that is associated with another learner included in the first group of learners,
activate and provide, by the server, an electronic interactive link configured to provide the learner, when activated, access to the at least one remediation curriculum activity from the set of remediation curriculum activities corresponding to the first threshold value; and
in response to detecting interaction with the electronic interactive link, automatically transmitting, by the server, the at least one remediation curriculum activity to the learner.

14. The system of claim 13, wherein the server is further configured to:
responsive to a determination that the initial assessment score is greater than the upper threshold value:
determine an enhancement curriculum activity data record including a set of enhancement curriculum activities associated, in the logic or the database, with the initial curriculum activity,
generate, for display on the client device, a second GUI including a second GUI component displaying a second group of learners, automatically selected and including the learner, and
execute, by the server, the logic, wherein, when executed, the logic is configured to modify the lesson plan of the learner to include at least one enhancement curriculum activity from the set of enhancement curriculum activities,
wherein the modified lesson plan, of the lesson plans modified by the server, that is associated with the learner includes a different enhancement curriculum activity from the set of enhancement curriculum activities than another modified lesson plan, of the lesson plans modified by the server, that is associated with another learner included in the second group of learners.

15. The system of claim 14,
wherein the initial curriculum activity is associated with a learning objective in the plurality of tasks and learning objectives, and
wherein each of the at least one remediation curriculum activity is associated with the learning objective, and
wherein each of the at least one enhancement curriculum activity is associated with the learning objective.

16. The system of claim 13, wherein the server is further configured to:

receive a first communication including a first date,
wherein the server is configured to modify the lesson plan of the learner by setting a due date for completion of each of the at least one remediation curriculum activity to the first date.

17. The system of claim 13, wherein the server is further configured to:
receive a selection of a second learner; and
responsive to receiving the selection of the second learner, modify a second lesson plan of the second learner to include:
a remediation curriculum activity from the set of remediation curriculum activities.

18. The system of claim 13, wherein the plurality of tasks includes tasks associated with a job competency.

19. The system of claim 13, wherein each task included in the plurality of tasks is associated with at least one learning objective.

* * * * *